(12) United States Patent
Fujimoto et al.

(10) Patent No.: US 6,649,893 B2
(45) Date of Patent: Nov. 18, 2003

(54) FOCUS DETECTING DEVICE FOR AN OPTICAL APPARATUS

(75) Inventors: Yasushi Fujimoto, Hino (JP); Hideaki Endo, Hachioji (JP); Takashi Yoneyama, Sagamihara (JP); Yûsuke Amano, Ina (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/832,800

(22) Filed: Apr. 12, 2001

(65) Prior Publication Data

US 2001/0042816 A1 Nov. 22, 2001

(30) Foreign Application Priority Data

Apr. 13, 2000 (JP) ........................................ 2000-112388

(51) Int. Cl.[7] ................................................ G01J 21/26
(52) U.S. Cl. ................................ 250/201.2; 250/201.4; 359/383
(58) Field of Search ........................... 250/201.2, 201.3, 250/201.4; 359/385, 368, 382, 383

(56) References Cited

U.S. PATENT DOCUMENTS

| | | | | |
|---|---|---|---|---|
| 4,958,920 A | * | 9/1990 | Jorgens et al. | 359/392 |
| 5,149,978 A | * | 9/1992 | Opsal et al. | 250/559.19 |
| 5,239,170 A | * | 8/1993 | Hughlett | 250/201.3 |
| 5,288,987 A | * | 2/1994 | Vry et al. | 250/201.3 |
| 5,710,667 A | * | 1/1998 | Goto | 359/569 |
| 5,714,749 A | | 2/1998 | Yonezawa et al. | 250/201.2 |
| 5,809,000 A | * | 9/1998 | Choi | 369/112.05 |
| 5,889,276 A | * | 3/1999 | Yonezawa et al. | 250/201.3 |
| 5,892,622 A | | 4/1999 | Abe | 359/618 |
| 5,925,874 A | * | 7/1999 | Liegel et al. | 250/201.3 |
| 6,248,988 B1 | * | 6/2001 | Krantz | 250/201.3 |

FOREIGN PATENT DOCUMENTS

| | | |
|---|---|---|
| JP | 09-133856 | 5/1997 |
| JP | 11-218682 | 8/1999 |

* cited by examiner

*Primary Examiner*—Stephone Allen
(74) *Attorney, Agent, or Firm*—Pillsbury Winthrop LLP

(57) ABSTRACT

A focus detecting device includes a multi-beam producing member for emitting a plurality of light beams; a light-blocking member for blocking a part of the plurality of light beams; a beam splitting member having a surface for reflecting or transmitting an incident light beam; a light-condensing optical system for condensing the incident light beam; and a photodetector having at least two light-receiving sections. The multi-beam producing member and the light-blocking member are placed on a first optical path, and the light-condensing optical system and the photodetector are placed on a second optical path. The beam splitting member is located at the intersection of the optical axis of the first optical path with the optical axis of the second optical path, and the photodetector is located at a position where the light beam is condensed by the light-condensing optical system.

37 Claims, 40 Drawing Sheets

SCATTERED LIGHT

FOCAL PLANE

SCATTERED LIGHT

AVERAGE FOCAL PLANE

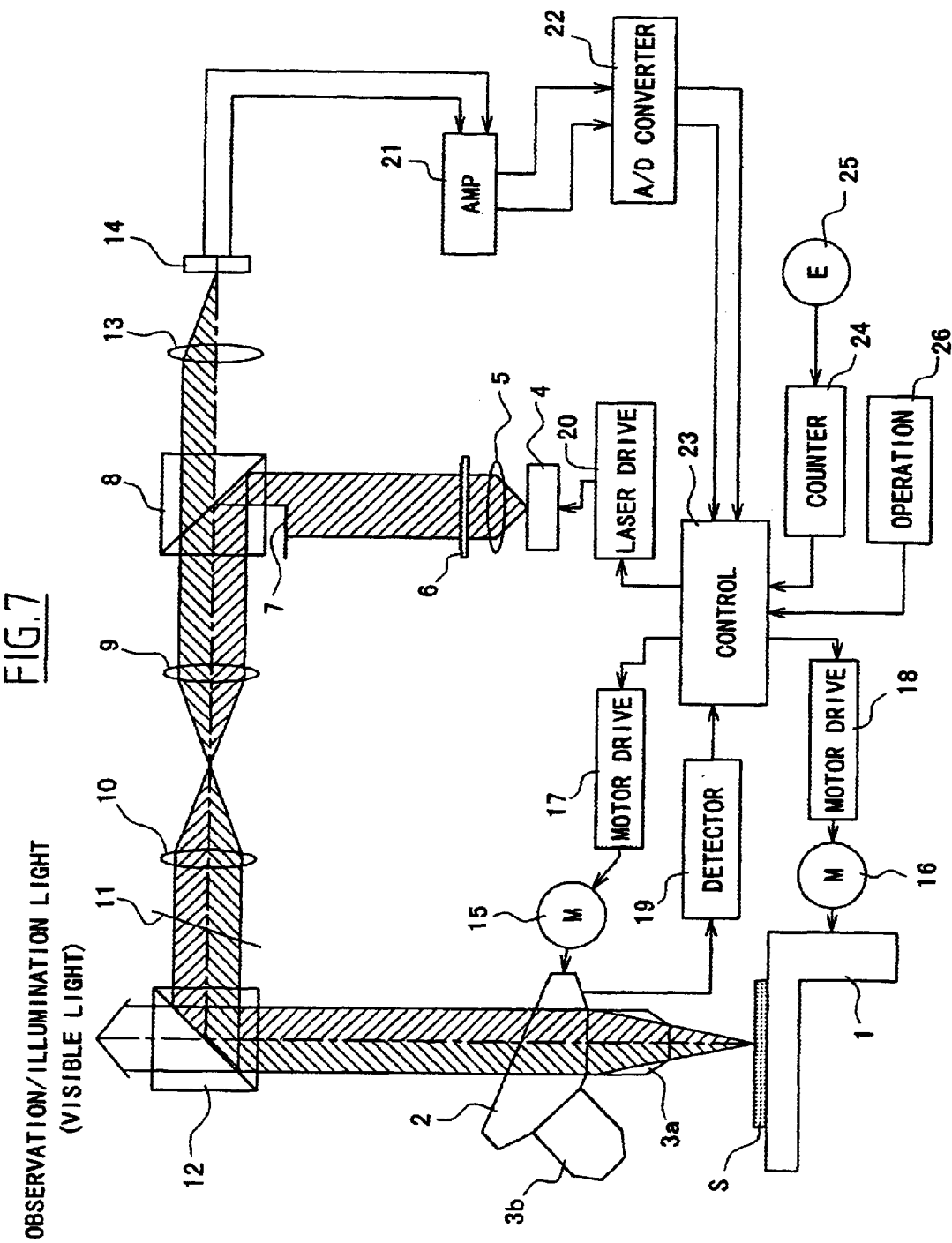

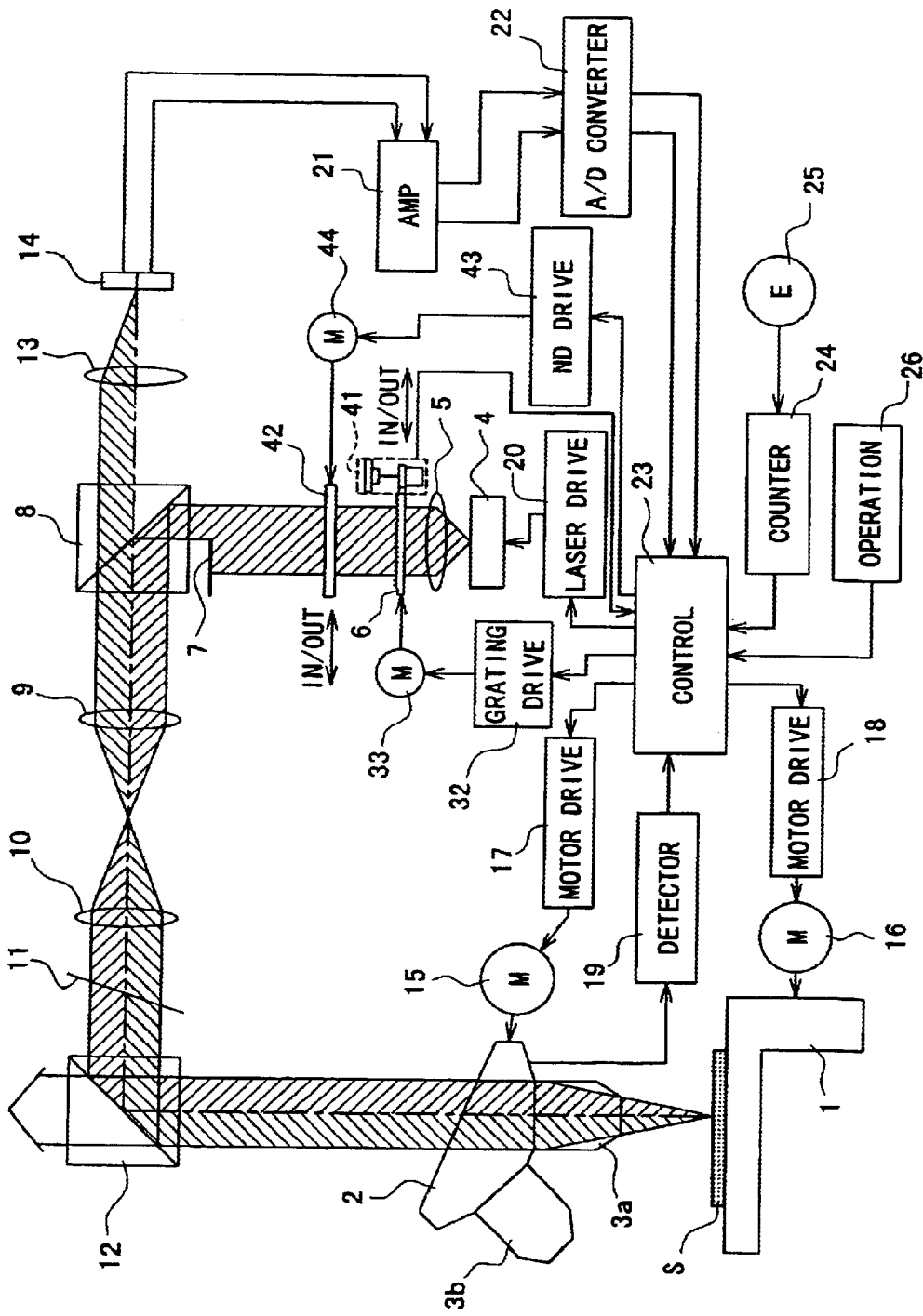

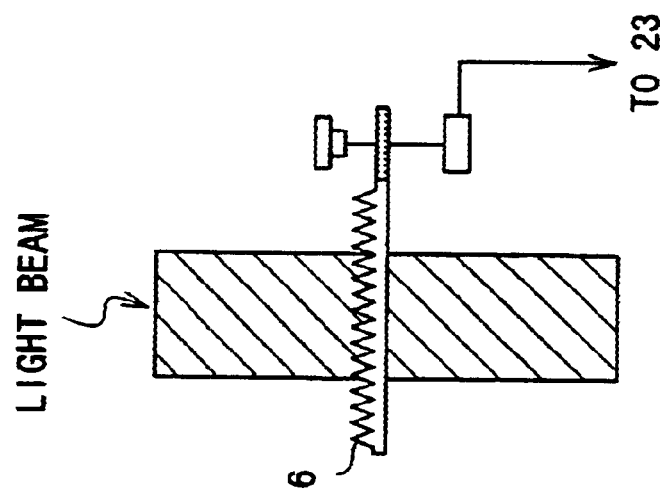
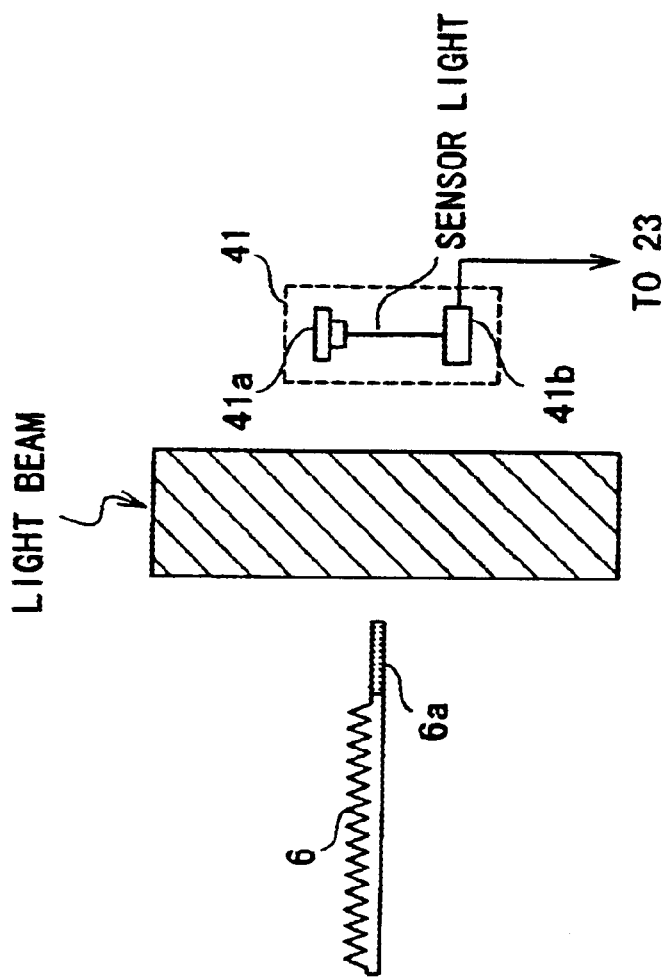
FIG.22A
FIG.22B

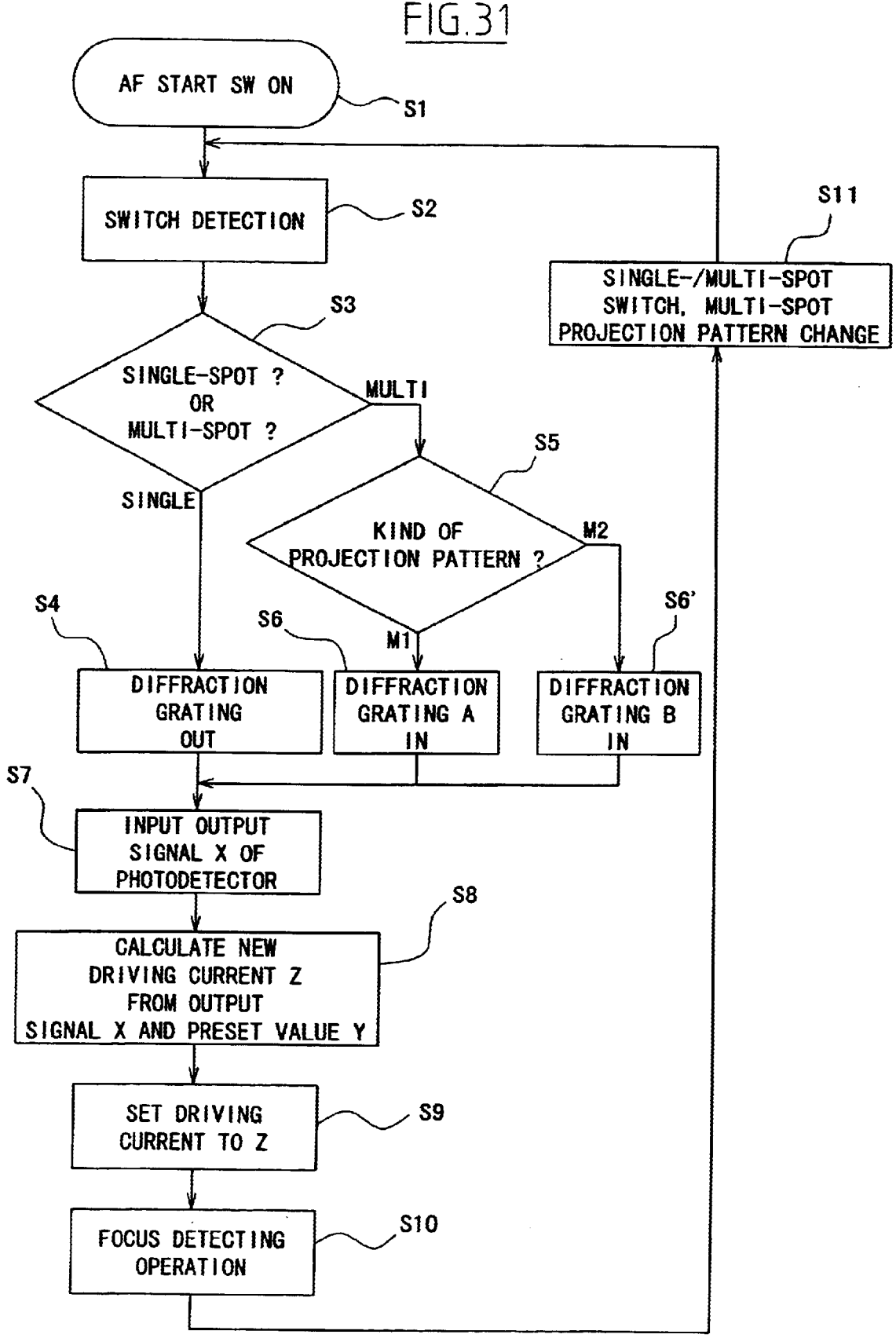

SAMPLE SURFACE

SAMPLE SURFACE

FOCUS DETECTING DEVICE FOR AN OPTICAL APPARATUS

BACKGROUND OF THE INVENTION

1. Field of the Invention

This invention relates to a focus detecting device used in an optical apparatus in which the observation, measurement, and examination of an object are carried out through an optical system.

2. Description of Related Art

In an optical apparatus in which the observation, measurement, and examination of an object are carried out through an optical system, for example, in an optical microscope, an observer must perform focusing, in order to observe a sharp image of the object, by moving the stage of the microscope vertically to adjust a distance between an objective lens and the object. In this case, if the objective lens has a high magnification, a depth of focus is small, and thus a focusing position cannot be found when the stage is widely moved. Hence, the observer must move the stage little by little and needs much time to find the focusing position. On the other hand, if the objective lens has a low magnification, the depth of focus is larger, and thus, sometimes, it becomes difficult that the observer determines an optimum position of the stage where the object is brought to a focus.

In order to solve such a problem, a focus detecting device has recently become combined with the optical apparatus. Various systems are available in focus detecting devices. One of them is an active system focus detecting device in which light is radiated toward an object and reflected light from the object is detected by a photodetector to determine an in-focus or out-of-focus state in accordance with the reflected light.

The arrangement of the active system focus detecting device is shown in FIG. 1. In this figure, reference numeral 4 represents a light source; 5, a collimator lens; 7, a light-blocking plate; 8, a polarization beam splitter; 11, a quarter-wave plate; 12, dichroic mirror; 3, an objective lens; 13, an imaging lens; and 14, a photodetector. Reference symbol S represents a sample which is an object.

The light source 4 is a semiconductor laser, which emits laser light in an infrared wavelength region. This light is linearly polarized. The laser light is changed by the collimator lens 5 into a parallel beam, which is incident on the polarization beam splitter 8. In this case, by the light-blocking plate 7 interposed between the collimator lens 5 and the polarization beam splitter 8, a half of the light beam is blocked. The polarization beam splitter 8 has the characteristics of reflecting the linearly polarized light of p polarization and of transmitting the linearly polarized light of s polarization. Thus, when the semiconductor laser is previously placed so that the orientation of polarization of the laser light coincides with that of the p polarization, all the laser light incident on the polarization beam splitter 8 is reflected by the reflecting surface of the polarization beam splitter 8, and hence the intensity (amount) of light is not lost.

The laser light reflected by the reflecting surface of the polarization beam splitter 8 is incident on the quarter-wave plate 11. The quarter-wave plate 11 is placed so that the linearly polarized light incident thereon is changed to circularly polarized light, which emerges therefrom. The laser light emerging from the quarter-wave plate 11 is reflected by the dichroic mirror 12 and is incident on the objective lens 3. The objective lens 3 converges the laser light on the sample S.

The laser light reflected by the sample S passes again through the objective lens 3. At this time, the laser light does not follow the same optical path as in the case of incidence, but takes an optical path on the opposite side with respect to the optical axis. The laser light is reflected by the dichroic mirror 12 and enters the quarter-wave plate 11. Here, the laser light which is the circularly polarized light is changed to the linearly polarized light and emerges therefrom. However, since the orientation of the linearly polarized light becomes identical with that of the s polarization, all the laser light incident on the polarization beam splitter 8 passes through the polarization beam splitter 8 and enters the imaging lens 13. The imaging lens 13 condenses the laser light incident thereon. The photodetector 14 is located at a position where the laser light is condensed, and produces an electric signal in accordance with the intensity of the laser light. The photodetector 14 is such that two independent light-receiving sections A and B are arranged closely adjacent to each other. For example, a binary photodiode could be used.

In the arrangement shown in FIG. 1, the laser light collected on the sample S through the objective lens 3 is practically circular in shape and assumes a convergent point having an extremely small area (which is hereinafter referred to as spot light or a spot beam). The spot light has one spot. Such a construction is hereinafter termed a single-spot projection system.

In the single-spot projection system, how in-focus and out-of-focus states are decided (detected) is explained below with reference to FIG. 2A and FIGS. 3A–5B. FIG. 2A shows a state where the spot light is radiated on a convex surface of a sample of irregular shape and is brought to a focus on the convex surface. Specifically, a position where the size of the spot light collected by the objective lens 3 is minimized (which is hereinafter referred to as the focal position of the objective lens) coincides with the convex surface of the sample S. In this case, the spot light reflected by the convex surface, as shown in FIG. 4A, is converged at the center of the photodetector 14. For reference, the intensity distribution of a convergent beam (the spot light) is shown on the right side of the photodetector 14.

The photodetector 14 is constructed with the two light-receiving sections A and B which are identical in shape. A slight space (simply indicated by a solid line in the figure) is provided between the light-receiving sections A and B and coincides with the optical axis.

As seen from FIG. 4A, in the in-focus state, reflected light from the sample S is collected on the optical axis, and thus the spot light formed on the photodetector 14 has an intensity distribution of bilateral symmetry with respect to the optical axis. Specifically, since half of the spot light is formed on the light-receiving section A and the remaining half is formed on the light-receiving section B, the areas (intensities) of the spot light formed on the light-receiving sections A and B are equal. Hence, in the in-focus state, electric signals produced from the two light-receiving sections A and B are also equal.

In out-of-focus states, there are cases where the sample S is located at a distance away from the objective lens 3 with respect to the focal position and at a distance closer to the objective lens 3. Here, the former case is called a rear focus state and the latter is called a front focus state. In the rear focus state, as shown in FIG. 3A, the laser light reflected from the sample S is collected in front of the photodetector 14, and thus a light beam of a larger diameter than in FIG. 4A is formed on the photodetector 14. Furthermore, the light beam formed over the two light-receiving sections A and B has no spot of bilateral symmetry, and a larger part of the light beam is formed on one light-receiving section, namely the light-receiving section B. In the rear focus state, therefore, the electric signal generated in the light-receiving section A is smaller than in the light-receiving section B. Conversely, in the front focus state, as shown in FIG. 5A, a larger part of the light beam is formed on the light-receiving section A, and thus the electric signal generated in the light-receiving section A is larger than in the light-receiving section B.

As mentioned above, since the magnitude of the electric signal changes with the space between the objective lens 3 and the sample S, it is possible to decide whether the in-focus state or the out-of-focus state is brought about or whether the front focus state or the rear focus state is brought about in accordance with the value of a signal of the difference between the magnitudes of different signals (which is hereinafter referred as to a focus error signal). Hence, when such a focus detecting device is combined with an optical apparatus such as a microscope and the stage is moved vertically so that the focus error signal becomes zero, the sample can be brought to a focus automatically.

Another active system focus detecting device is set forth, for example, in each of U.S. Pat. Nos. 5,714,749 and 5,892,622. In these Patents, an arrangement is made such that a cylindrical lens or a toric lens is placed in an optical system. In such an arrangement, as shown in FIG. 6A, the laser light collected on the sample S by the objective lens 3 assumes an elongated slit shape. Also, such a system is called a slit projection system.

In the single-spot projection system shown in FIG. 1, when the spot light, as in FIG. 2B, is radiated at the edge (boundary) between concave and convex portions or at the edge of a step, the light is scattered at the edge. Consequently, a problem arises that the intensity of the light turning back to the photodetector is materially reduced and the accuracy of focus detection is degraded. Moreover, there is another problem that the shape of the spot light formed on the photodetector 14 is changed and, for example, the in-focus state is erroneously decided as the out-of-focus state because the focus error signal does not become zero, irrespective of the fact that the position of the sample S coincides with the focal position of the objective lens 3.

As shown in FIG. 2C, when a sample has an irregular shape of a plurality of different heights, only a portion of a particular height in which the spot light is radiated is brought to a focus. Thus, for example, if the highest surface is in focus, other concave and convex portions will be quite blurred, and it becomes impossible to observe a plurality of steps of different heights at the same time and to measure the widths of a plurality of steps at the same time.

In the slit projection system, as shown in FIG. 6B, even though slit light is radiated at the edge between concave and convex portions or at the edge of a step, the area of the light radiated on the planes of the concave and convex portions is larger than that of the light radiated at the edge. Consequently, light scattered by the edge has little effect on the radiation, and an error is rarely caused to the focus error signal. As in FIG. 6C, when a sample has an irregular shape of a plurality of different heights, light reflected by the portions of different heights is collected on the photodetector 14 at the same time, and hence a portion of a particular height is not brought to a focus, but the portion of an average height comes to a focus. Therefore, various concave and convex portions can be observed simultaneously.

However, the cylindrical lens and the toric lens which are used in the slit projection system are expensive by themselves. Since positional adjustment on assembly is difficult, a complicated adjusting mechanism is required. Moreover, in the irregular shape of a plurality of different heights, the portion of the average height is always brought to a focus, and it is impossible to bring the portion of the particular height to a focus with accuracy as in the single-spot projection system.

For the slit projection system, the method that a stop with an elongated aperture is provided in a light beam to form it into a slit shape is also available, but there is the problem that most of the light beam is blocked by the stop and thus a great loss of the intensity of light is caused.

SUMMARY OF THE INVENTION

It is, therefore, an object of the present invention to provide a focus detecting device which is not affected by the scattering of light at the edge of a step.

It is another object of the present invention to provide a focus detecting device in which in an irregular shape of a plurality of different heights, not only can a portion of an average height be brought to a focus, but a portion of a particular height can also be brought to a focus.

It is still another object of the present invention to provide a focus detecting device in which a loss of the amount of light is small, cost is low, and adjustment on assembly is easily made.

It is a further object of the present invention to provide a focus detecting device which gives a strong probability of focusing.

The focus detecting device of the present invention includes a multi-beam producing member for emitting a plurality of light beams; a light-blocking member for blocking a part of the plurality of light beams; a beam splitting member having a surface for reflecting or transmitting an incident light beam; a light-condensing optical system for condensing the incident light beam; and a photodetector having at least two light-receiving sections. The multi-beam producing member and the light-blocking member are placed on a first optical path, and the light-condensing optical system and the photodetector are placed on a second optical path. The beam splitting member is located at the intersection of the optical axis of the first optical path with the optical axis of the second optical path, and the photodetector is located at a position where the light beam is condensed by the light-condensing optical system.

The focus detecting device has a first driving mechanism for moving the diffraction optical element, which is moved along the first optical path.

The focus detecting device further includes an intensity attenuation member for reducing the intensity of an incident light beam and a second driving mechanism for moving the intensity attenuation member. When the diffraction optical element is inserted in the first optical path, the intensity attenuation member is removed from the first optical path, and when the diffraction optical element is removed from the first optical path, the intensity attenuation member is inserted in the first optical path.

The focus detecting device also has a beam adjusting mechanism for changing the number of a plurality of light beams produced by the multi-beam producing member or the spacing between them.

These and other objects as well as features and advantages of the present invention will become apparent from the following detailed description of preferred embodiments when taken in conjunction with the accompanying drawings.

BRIEF DESCRIPTION OF THE DRAWINGS

FIG. 7 is a view showing a first embodiment of the focus detecting device according to the present invention;

FIG. 21 is a view showing a seventh embodiment of the focus detecting device according to the present invention;

FIGS. 22A and 22B are views for explaining the detection of the position of a diffraction grating moved in or out of the optical path;

FIG. 31 is a flowchart showing a procedure for adjustment of the amount of light and focus detection in the tenth embodiment;

DETAILED DESCRIPTION OF THE PREFERRED EMBODIMENTS

First Embodiment

Figure 1:
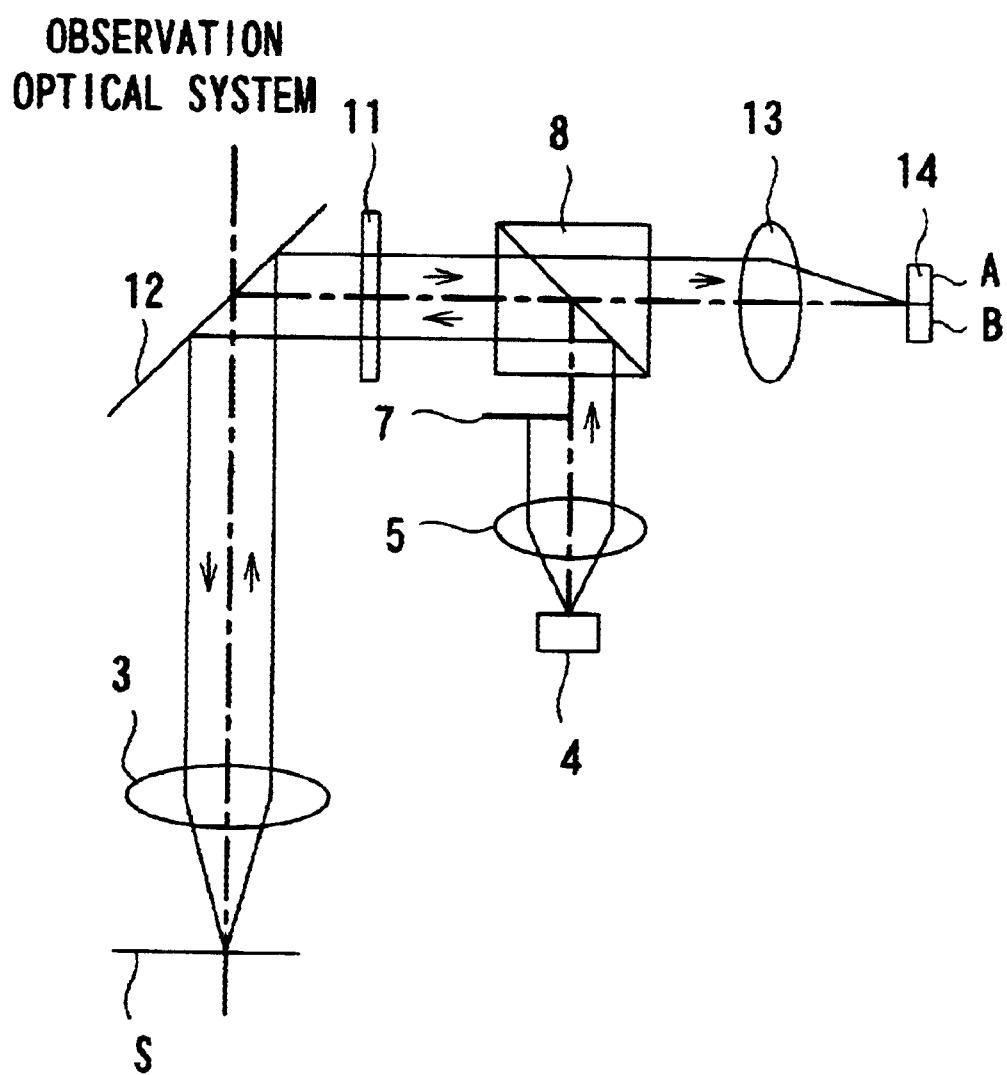
FIG. 1 is a view showing the arrangement of a conventional single-spot projection system.
Figure 2A:
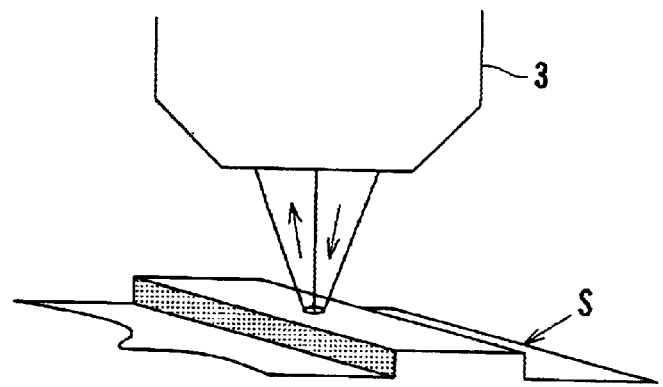
FIG. 2A is a view showing a case where spot light is radiated on the plane surface of a convex portion of a sample of irregular shape in a single-spot projection system.
Figure 2B:
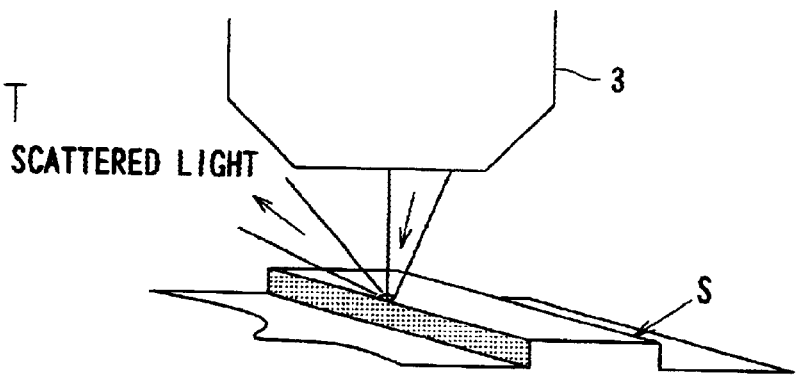
FIG. 2B is a view showing a case where spot light is radiated at the edge of a convex portion of a sample of irregular shape in the single-spot projection system.
Figure 2C:
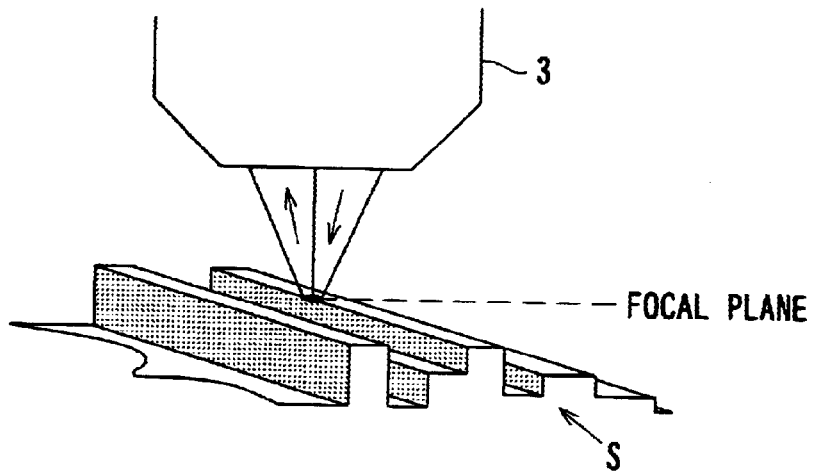
FIG. 2C is a view showing a case where spot light is radiated on a convex portion of a particular height of a sample of irregular shape in the single-spot projection system.

FIG. 7 shows the first embodiment of the focus detecting device of the present invention, combined with a microscope. Here, a stage 1 and a revolver 2 are attached to a microscope body, not shown, and objective lenses 3a and 3b are mounted to the revolver 2. The sample S is placed on the stage 1. The revolver 2 can be rotated, so that either one of the objective lenses 3a and 3b (or any one of objective lenses when more than two objective lenses are mounted to the revolver) is located above the sample S.

The revolver 2 may be rotated manually, but in FIG. 7, it is rotated electrically. Thus, a revolver motor 15 for rotating the revolver 2 is placed closed to the revolver 2, and a revolver motor driving section 17 for controlling the revolver motor 15 is provided. In order to set and detect which objective lens is mounted to the revolver hole of the revolver 2 or to detect which objective lens is located above the sample S, a revolver hole position detecting section 19 is provided. The revolver motor driving section 17 and the revolver hole position detecting section 19 are connected to a control section 23 so that they are controlled by the control section 23.

The focus detecting device is constructed with the light source 4, the collimator lens 5, a diffraction grating 6, the light-blocking plate 7, the polarization beam splitter 8, the imaging lens 13, and photodetector 14. Also, like numbers are used for like elements with respect to FIG. 1, and a detailed description of their functions and actions is omitted.

The light source 4 (here, a semiconductor laser) is connected to a laser driving section 20, which is connected to the control section 23. Consequently, control for oscillating (turning on) the light source 4 or stopping the oscillation (turning off the light source) can be carried out by the control section 23.

In the first embodiment, lenses 9 and 10 constituting a relay optical system, designed to introduce a laser light emitted from the light source 4 into the objective lens, are interposed between the polarization beam splitter 8 and the dichroic mirror 12. The lens 9 collects once a parallel beam emerging from the polarization beam splitter 8, and the lens 10 changes the collected light into a parallel beam, which emerges therefrom. The position where the light is collected by the lens 9 is conjugate with the focal position of the objective lens and corresponds to an intermediate imaging position where the intermediate image of the sample S is formed. Also, the quarter-wave plate 11 is interposed between the lens 10 and the dichroic mirror 12.

The photodetector 14 is connected to an amplifier 21. The amplifier 21 converts an electric current produced by photoelectric conversion in each of the light-receiving sections A and B of the photodetector 14 into a voltage, and has two circuits for amplifying electric signals. The electric signals amplified by the amplifier 21 are converted into digital data by an A/D converter 22 and are stored in a memory provided in the control section 23.

In addition, a pulse counter 24 is connected to the control section 23, and a JOG encoder 25 is connected to the pulse counter 24. The JOG encoder 25 is used when the stage 1 is moved vertically through a focusing motor 16. An operating section 26 is connected to the control section 23. The operating section 26 includes an objective exchange switch for replacing an objective lens by rotating the revolver 2, an AF control switch for indicating the execution and release of auto focus, and switches and inputs for setting various conditions before the execution.

The JOG encoder 25 has a rotating mechanism, and the direction and amount of rotation involved in rotation are detected by the pulse counter 24. Data of the direction and amount of rotation detected are read out by the control section 23, and on the basis of the data, drive data are transmitted to a focusing motor driving section 18. The focusing motor driving section 18 provides the focusing motor 16 with a driving signal on the basis of the drive data. As a result, the stage 1 is moved vertically along the optical axis. When the driving mechanism such as a motor is further provided, the stage can be moved in a direction normal to the optical axis, and it is possible that the movement of the stage in this case is also controlled by using the LOG encoder 25. Instead of moving the stage 1 along the optical axis, it is also possible to move the objective lens 3 by itself along the optical axis or to move the objective lens 3 integral with the revolver 2 along the optical axis.

Figure 8:
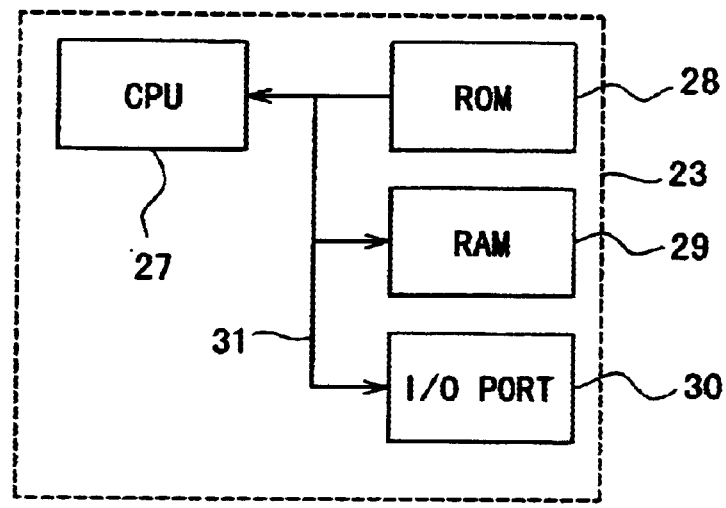
FIG. 8 is a diagram showing the construction of a control section in the first embodiment.

The details of the control section 23 are shown in FIG. 8. The control section 23 is basically constructed with a CPU 27, a ROM 28, a RAM 29, and an I/O port 30. They are connected to one another through a data bus 31, and a data exchange is made through the data bus 31. The ROM 28 stores a program for controlling an auto focus operation and the movement of the stage 1 or the rotation of the revolver 2. The RAM 29 stores, for example, the digital data from the A/D converter 22 mentioned above. The I/O port 30 inputs and outputs control signals of various driving sections.

Figure 9:
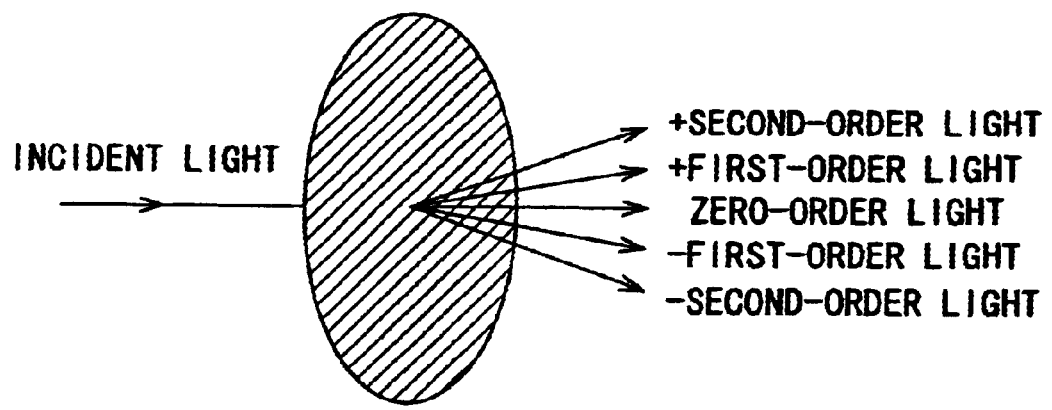
FIG. 9 is a view showing diffraction produced by a diffraction optical element.

In the first embodiment, the diffraction grating 6 is interposed between the collimator lens 5 and the light-blocking plate 7, and the light source 4 and the diffraction grating 6 constitute the multi-beam producing member. The diffraction grating 6 is constructed so that, for example, a periodic amplitude change or phase change is brought about on one surface of a plane-parallel plate, and allows incident light to emerge therefrom as a plurality of beams of different angles. FIG. 9 shows this state. A plurality of beams, such as zero-order light traveling in straight lines and emerging as in incident light, ±first-order light diffracted at a certain angle and emerging, and ±second-order light emerging at a larger angle, are produced from one incident beam. Also, although higher-order diffracted light than the ±second-order light is produced, such light is omitted from FIG. 9.

Figure 10:
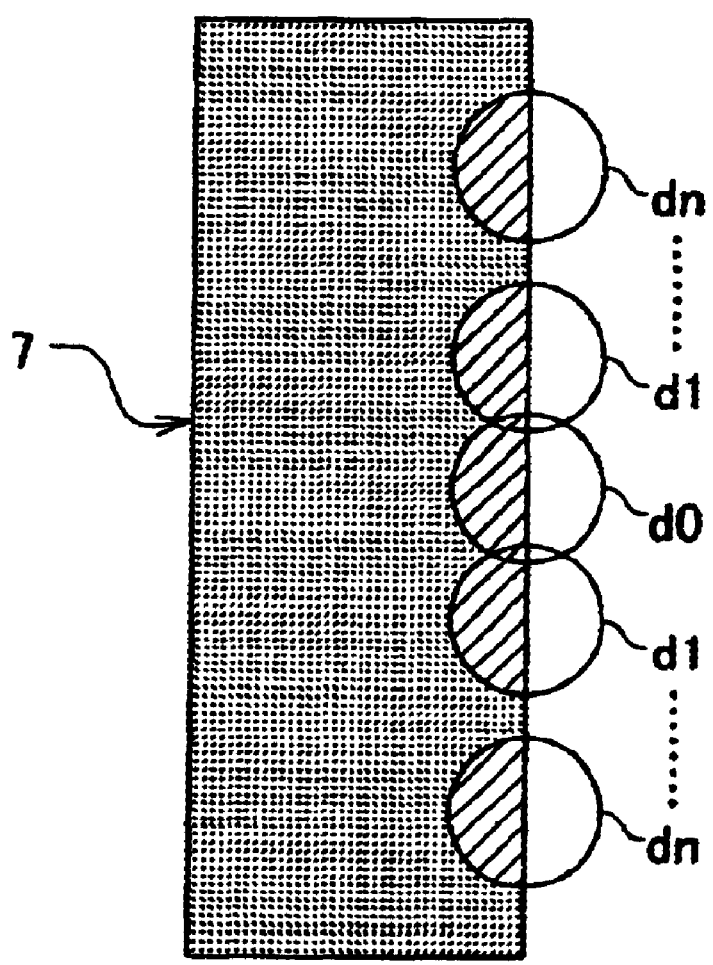
FIG. 10 is a view showing a state where a part of a light beam is blocked by a light-blocking member.

One light beam emitted from the light source 4, after passing through the diffraction grating 6, produces a large number of diffracted beams of different angles of emergence. FIG. 10 shows zero-–±n-order diffracted beams $d_0 \sim d_n$ at the position of the light-blocking plate 7. The diffracted beams $d_0 \sim d_n$ are such that respective halves of the beams, after being blocked by the light-blocking plate 7, are radiated on the sample S through the objective lens 3. In this way, the sample S is irradiated with a plurality of spot beams. The projection system in which the plurality of spot beams are radiated on the sample as in the first embodiment is referred to as a multi-spot projection system.

The plurality of spot beams reflected by the sample S follow an optical path on the opposite side of the optical axis in a reverse direction with respect to incidence and are collected on the photodetector 14. FIGS. 11A–13B illustrate states where reflected light is collected on the photodetector 14. Also, it is assumed that the plurality of spot beams are reflected on the same plane surface (of the same height) of the sample.

Figure 3A:
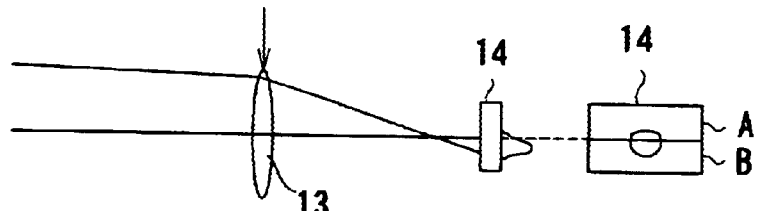
FIG. 3A is a view showing spot light projected on a photodetector in an out-of-focus state (front focus state) of the single-spot projection system.
Figure 3B:
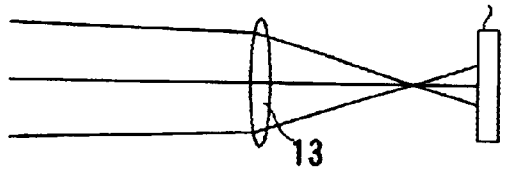
FIG. 3B is a view looking from the direction of an arrow of FIG. 3A.
Figure 4A:
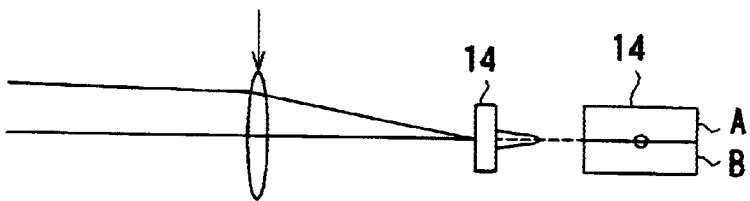
FIG. 4A is a view showing spot light projected on a photodetector in an in-focus state of the single-spot projection system.
Figure 4B:
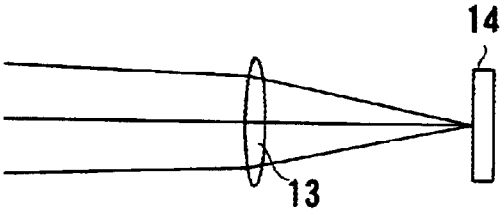
FIG. 4B is a view looking from the direction of an arrow of FIG. 4A.
Figure 5A:
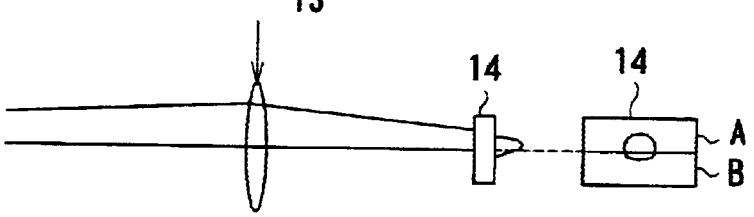
FIG. 5A is a view showing spot light projected on a photodetector in an out-of-focus state (rear focus state) of the single-spot projection system.
Figure 5B:
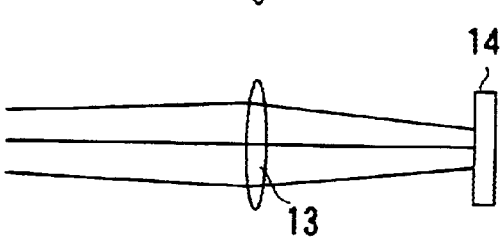
FIG. 5B is a view looking from the direction of an arrow of FIG. 5A.
Figure 6A:
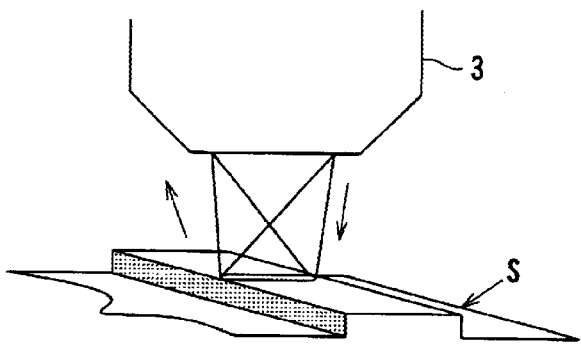
FIG. 6A is a view showing a case where slit-shaped light is radiated on the plane surface of a convex portion of a sample of irregular shape in a slit projection system.
Figure 6B:
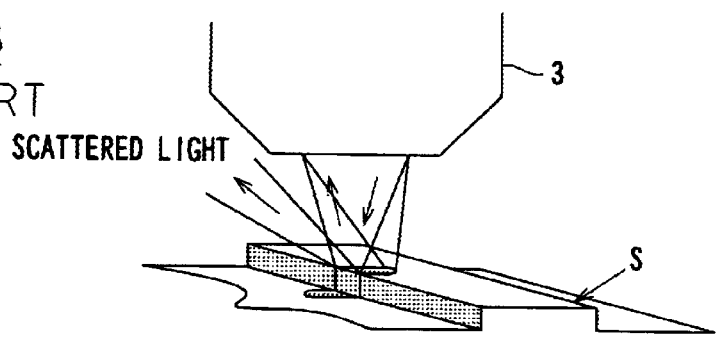
FIG. 6B is a view showing a case where slit-shaped light is radiated at the edge of a convex portion of a sample of irregular shape in the slit projection system.
Figure 6C:
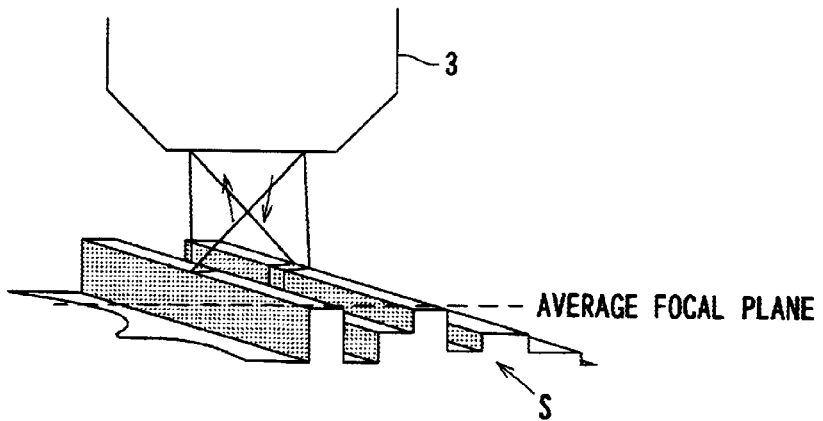
FIG. 6C is a view showing a case where slit-shaped light is radiated on concave and convex portions of different heights of a sample of irregular shape in the single-spot projection system.
Figure 11A:
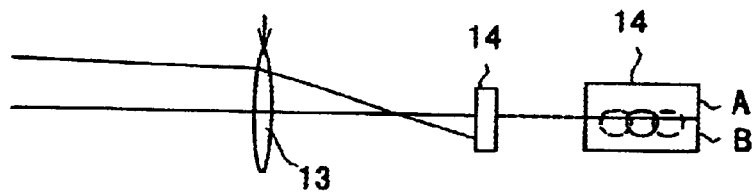
FIG. 11A is a view showing spot light projected on the photodetector in an out-of-focus state (front focus state) of a multi-spot projection system.
Figure 11B:
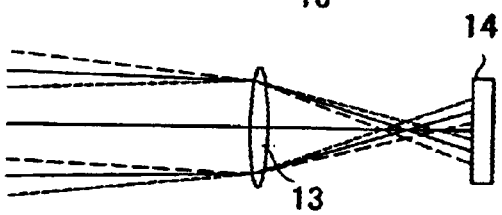
FIG. 11B is a view looking from the direction of an arrow of FIG. 11 A.
Figure 12A:
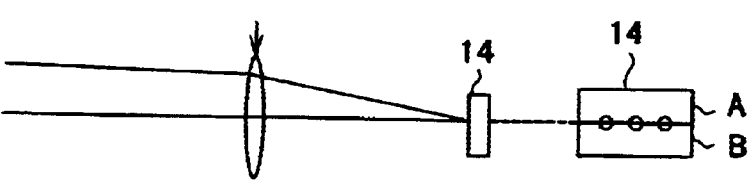
FIG. 12A is a view showing spot light projected on the photodetector in an in-focus state of the multi-spot projection system.
Figure 12B:
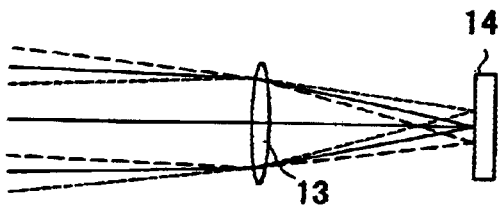
FIG. 12B is a view looking from the direction of an arrow of FIG. 12A.
Figure 13A:
FIG. 13A is a view showing spot light projected on the photodetector in an out-of-focus state (rear focus state) of the multi-spot projection system.
Figure 13B:
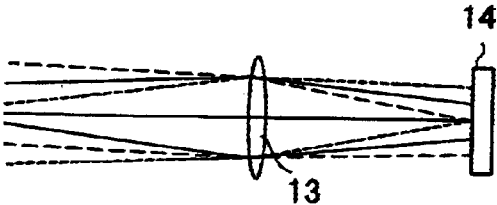
FIG. 13B is a view looking from the direction of an arrow of FIG. 13A.

FIGS. 11A, 12A, and 13A show rear focus, in-focus, and front focus states, respectively. As in FIGS. 3A, 4A, and 5A, in the rear focus state, the spot area of the light beam in the light-receiving section B is larger than in the light-receiving section A; in the in-focus state, the spot areas in the light-receiving sections A and B are identical; and in the front focus state, the spot area in the light receiving section A is larger than in the light-receiving section B.

As mentioned above, in the first embodiment, the focus error signal obtained by calculating electric signals from the light-receiving sections A and B is changed in accordance with the positional relationship between the objective lens 3 and the sample S. Thus, the in-focus or out-of-focus state or the front or rear focus state can be determined from the value of the focus error signal.

Figure 14A:
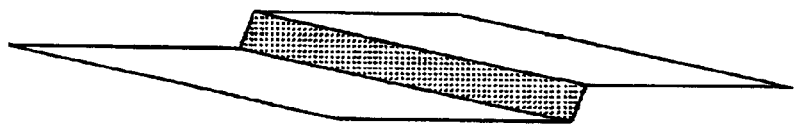
FIG. 14A is a view showing a sample which has a step.
Figure 14B:
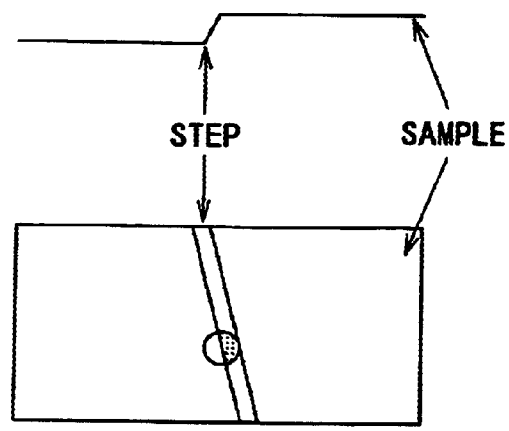
FIG. 14B is a view showing spot light radiated on the sample which has the step in the single-spot projection system.
Figure 14C:
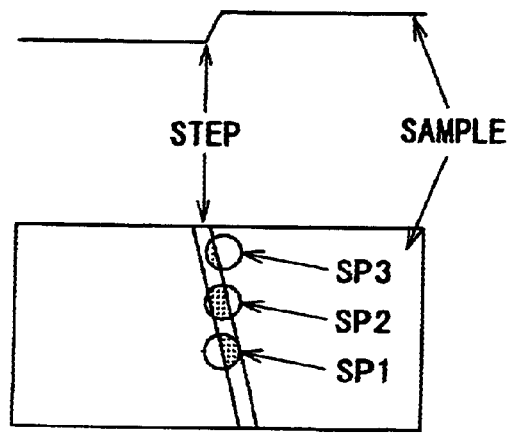
FIG. 14 C is a view showing spot light radiated on the sample which has the step in the multi-spot projection system.

Even though the sample has a step as shown in FIGS. 14A and 14B, the first embodiment, as shown in FIG. 14C, is such that three spot beams are radiated and thus there is little influence of the edge of the step. Specifically, for example, even though the spot beam at the middle is radiated at the edge and at least a half of the beam is scattered, at least a half of each of two spot beams on opposite sides of the middle beam is radiated on a flat portion, and hence reflected light of the two spot beams turns back to the photodetector 14. Consequently, an error is rarely caused to the focus error signal, and accurate and stable focusing becomes possible as in the slit projection system.

Figure 15A:
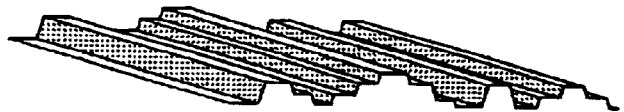
FIG. 15A is a view showing a sample of irregular shape of different heights.
Figure 15B:
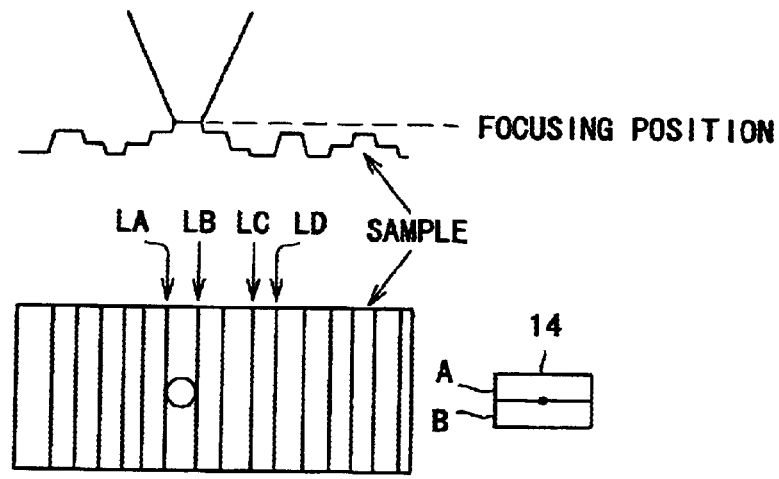
FIG. 15B is a view showing spot light radiated on the sample of FIG. 15A in the single-spot projection system.

As shown in FIG. 15, when a sample has an irregular shape of a plurality of different heights, it is possible to bring the portion of an average height to a focus. In FIG. 15B showing the case of the single-spot projection system, the highest convex portion comes to a focus. In this case, since only the portion where the spot light is radiated is brought to a focus, other concave and convex portions bring about out-of-focus states. In particular, where the objective lens has a high magnification, the lowest concave portion reaches a complete out-of-focus state (produces a so-called blurring), and cannot be entirely observed. Therefore, although a width between edges LA and LB can be measured, a width between edges LC and LD cannot be almost entirely measured.

Figure 15C:
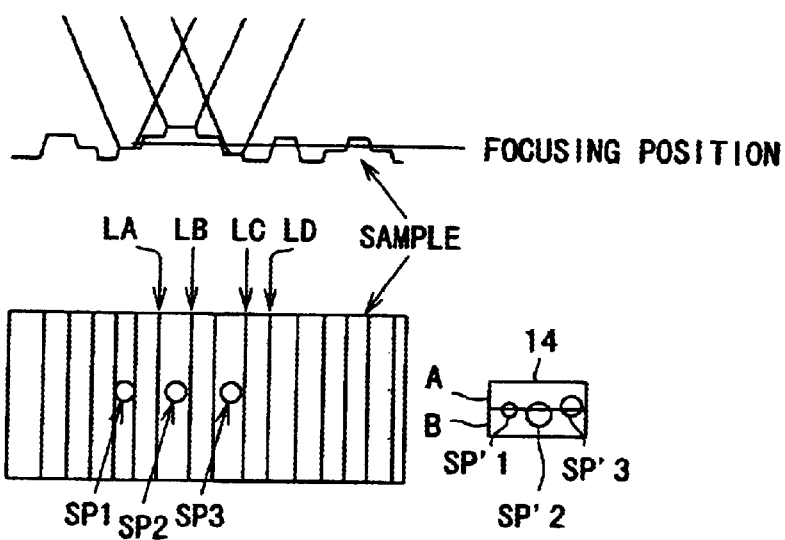
FIG. 15C is a view showing spot light radiated on the sample of FIG. 15A in the multi-spot projection system.

In contrast to this, in the first embodiment, as shown in FIG. 15C, a plurality of spots SP1, SP2, and SP3 are radiated on convex or concave portions of a plurality of different heights. Since spot light SP'1 in the in-focus state, spot light SP'2 in the rear focus state, and spot light SP'3 in the front focus state are formed at the same time on the light-receiving sections A and B of the photodetector 14, the focus error signal takes an average value with respect to these states. Hence, as in the slit projection system, the portion of an average height can be brought to a focus. In this case, the portions where the spot light is radiated are in the out-of-focus state, but they deviate slightly from the in-focus state and are not completely blurred. An image formed between the edges LA and LB or between the edges LC and LD is somewhat blurred, but can be observed. Thus, the measurement of the width between the edges LA and LB or between the edges LC and LD becomes possible.

In the first embodiment, as mentioned above, the diffraction grating 6 is disposed in the optical path, and thereby focusing of a high degree of accuracy which is not affected by scattering at the edge can be realized. In addition, the portion of an average height can be focused. The diffraction grating 6 is less expensive than the cylindrical lens, and adjustment on assembly is easy because its contour has the shape of a plane-parallel plate. A holding mechanism can be simplified. Furthermore, the diffraction grating is lighter in weight than the cylindrical lens and thus can be easily moved by a simple moving mechanism, which is favorable.

Second Embodiment

Figure 16:
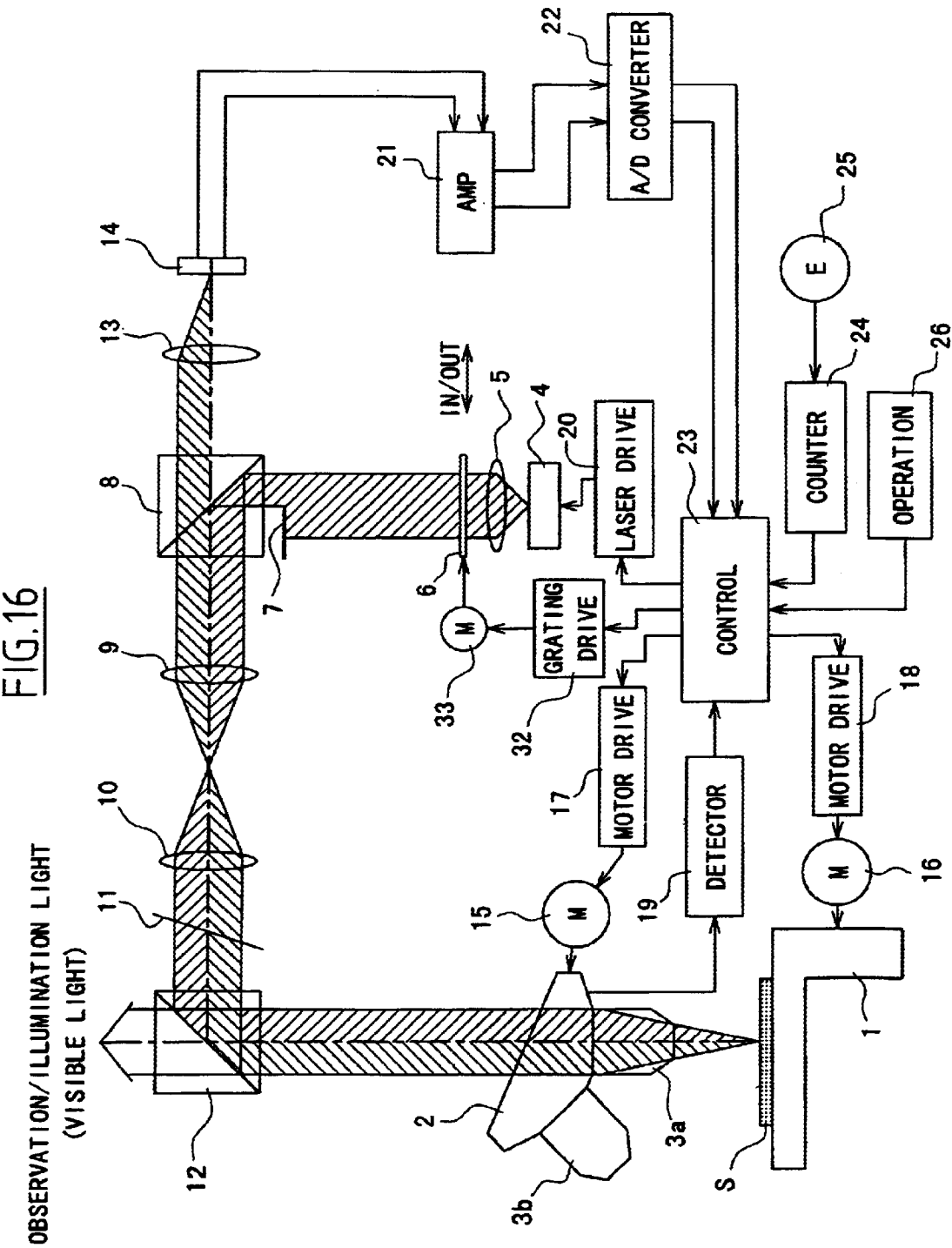
FIG. 16 is a view showing a second embodiment of the focus detecting device according to the present invention.

The second embodiment is shown in FIG. 16. Like numerals indicate like elements with respect to the first embodiment and their detailed description is omitted. The construction of the second embodiment is such that a diffraction grating driving section 32 and a diffraction grating driving motor 33 are added to the construction of the first embodiment. In the second embodiment, the diffraction grating 6 can be moved by the diffraction grating driving motor 33. When the diffraction grating 6 is inserted in the optical path, a plurality of light beams are produced by the diffraction grating and thus focus detection with the multi-spot projection system is carried out. On the other hand, when the diffraction grating 6 is not inserted in the optical path, only a single light beam is produced and thus focus detection with the single-spot projection system is carried out.

An operation for inserting or removing the diffraction grating 6 in or out of the optical path is performed by a projection system changeover switch, not shown, provided in the control section 23. It is assumed that, for example, in an initial state, the single-spot projection system is set and the diffraction grating 6 is located at a position where the light beam is not blocked (which is hereinafter referred to as a waiting position). When the projection system changeover switch is pushed once in order to change from this state to the multi-spot projection system, the control section 23 transmits drive instructions to the diffraction grating driving section 32. A driving signal is sent from the diffraction grating driving section 32 to the diffraction grating driving motor 33, and thereby the diffraction grating driving motor 33 is rotated. The rotation of the motor is transferred to a known moving mechanism, not shown, and the diffraction grating 6 mounted to the moving mechanism is moved along the optical path so that the multi-spot projection system is constructed. Where the single-spot projection system is set again, the projection system changeover switch is pushed and thereby the diffraction grating is moved to the waiting position. In this way, the changeover of the projection mode is completed.

The switch for the changeover of the projection system need not necessarily be single, and a switch for the single-spot projection system and a switch for the multi-spot projection system may be provided so that either of them is pushed to switch or select the projection system.

In the second embodiment, as discussed above, the switch for the single-spot projection system and the switch for the multi-spot projection system can be switched to each other. Consequently, it is possible that the single-spot projection system is used to bring a particular position (height) of the sample to a focus or the multi-spot projection system is used to focus without any influence of the edge or to bring an average position (height) of the sample of irregular shape to a focus. In this way, either the single-spot projection system or the multi-spot projection system can be used in accordance with the profile of the sample to perform the optimum focusing.

Third Embodiment

Figure 17:
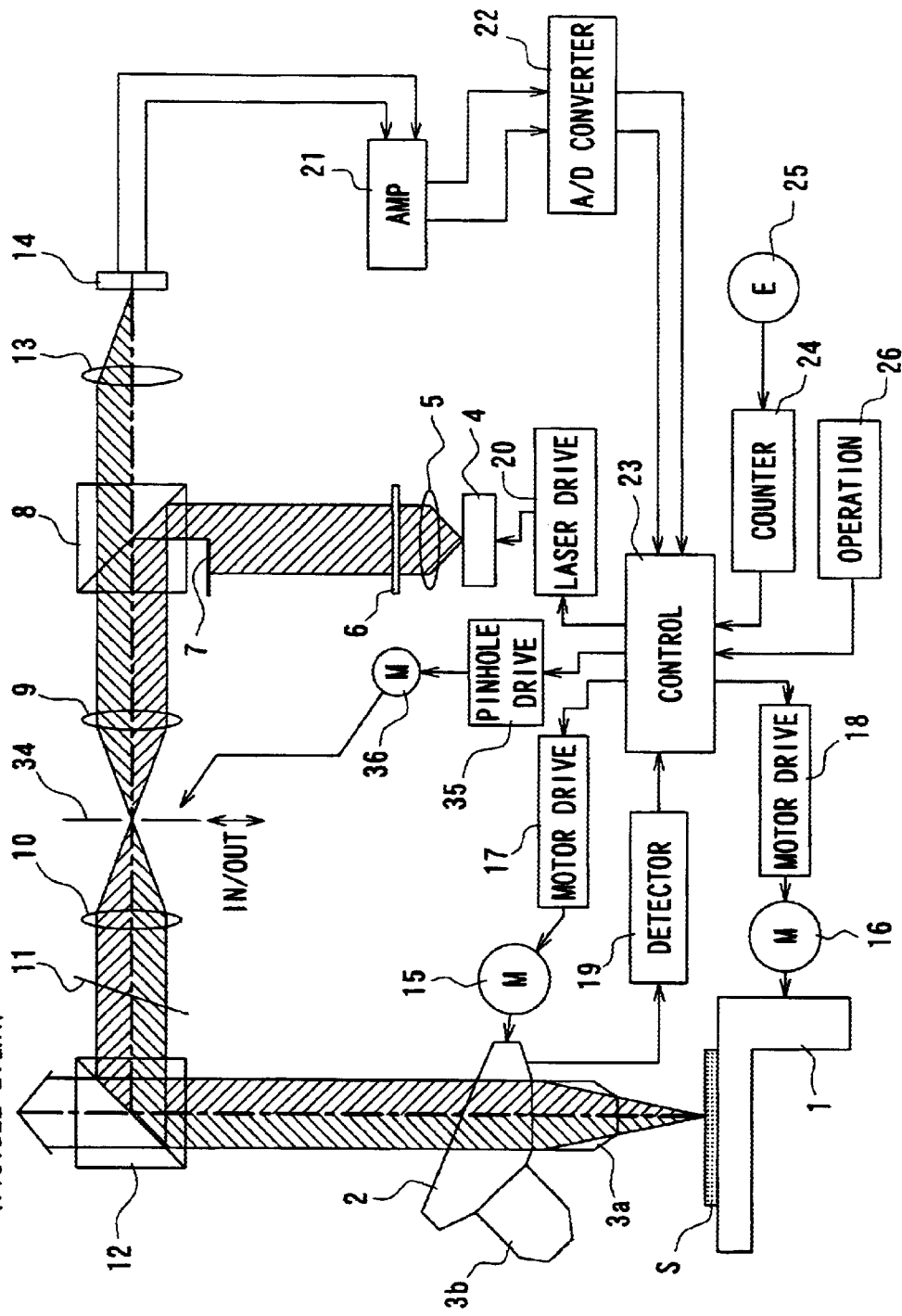
FIG. 17 is a view showing a third embodiment of the focus detecting device according to the present invention.

The third embodiment is shown in FIG. 17. Like numerals indicate like elements with respect to the first embodiment and their detailed description is omitted. In this embodiment, the diffracting grating 6 is always placed in the optical path to maintain a state where a plurality of light beams are produced. A pinhole 34 which is a beam restriction member is located at the intermediate imaging position between the lenses 9 and 10 constituting the relay optical system. The pinhole 34 is moved in or out of the optical path and thereby the changeover between the multi-spot projection system and the single-spot projection system is performed. In order to move the pinhole 34, a pinhole driving section 35 and a pinhole driving motor 36 are provided.

The pinhole 34 has a single minute aperture, which is situated on the optical axis when the pinhole 34 is inserted in the optical path. The position where the pinhole 34 is located, as mentioned above, is the intermediate imaging position. Also, although the pinhole 34 has a single aperture and thus should be called a single pinhole, it is referred to as the pinhole here for simplicity.

In the third embodiment, the pinhole 34 is moved in or out of the optical path and thereby the changeover between the single-spot projection system and the multi-spot projection system is performed. As in the second embodiment, the changeover between the single-spot projection system and the multi-spot projection system is performed by the projection system changeover switch.

When the single-spot projection system is selected, the control section 23 instructs the pinhole driving section 35 to place the pinhole 34 in the optical path. The pinhole driving section 35 provides the pinhole driving motor 36 with a driving signal in accordance with the instructions of the control section 23, so that the pinhole 34 is moved to the intermediate imaging position in the optical path by the rotation of the pinhole driving motor 36. The pinhole 34 stops at a position where the center of the aperture coincides with the optical axis of the optical path.

A plurality of light beams formed by the diffraction grating 6 are collected at the intermediate imaging position. Of these beams, zero-order light is collected on the optical axis, and higher-order light including ±first-order light is collected at positions separate from the optical axis. Since the aperture of the pinhole 34 transmits only light collected on the optical axis, it follows that the zero-order light passes through the aperture of the pinhole 34 and the higher-order light is blocked by a light-blocking portion other than the aperture. Consequently, only one spot beam is formed on the sample S.

When the multi-spot projection system is selected, on the other hand, the control section 23 instructs the pinhole driving section 35 to remove the pinhole 34 from the optical path. The pinhole driving section 35 provides the pinhole driving motor 36 with a driving signal in accordance with the instructions of the control section 23. The pinhole 34 is moved from the optical path to the waiting position, and removal from the optical path is completed. Although the plurality of light beams formed by the diffraction grating 6 are collected at the intermediate imaging position, all these light beams pass, and therefore, a plurality of spot beams are formed on the sample.

As discussed above, the third embodiment, like the second embodiment, is capable of using the single-spot projection system and the multi-spot projection system by the changeover from one to the other, and thus the same effect as in the second embodiment is brought about.

Fourth Embodiment

Figure 18:
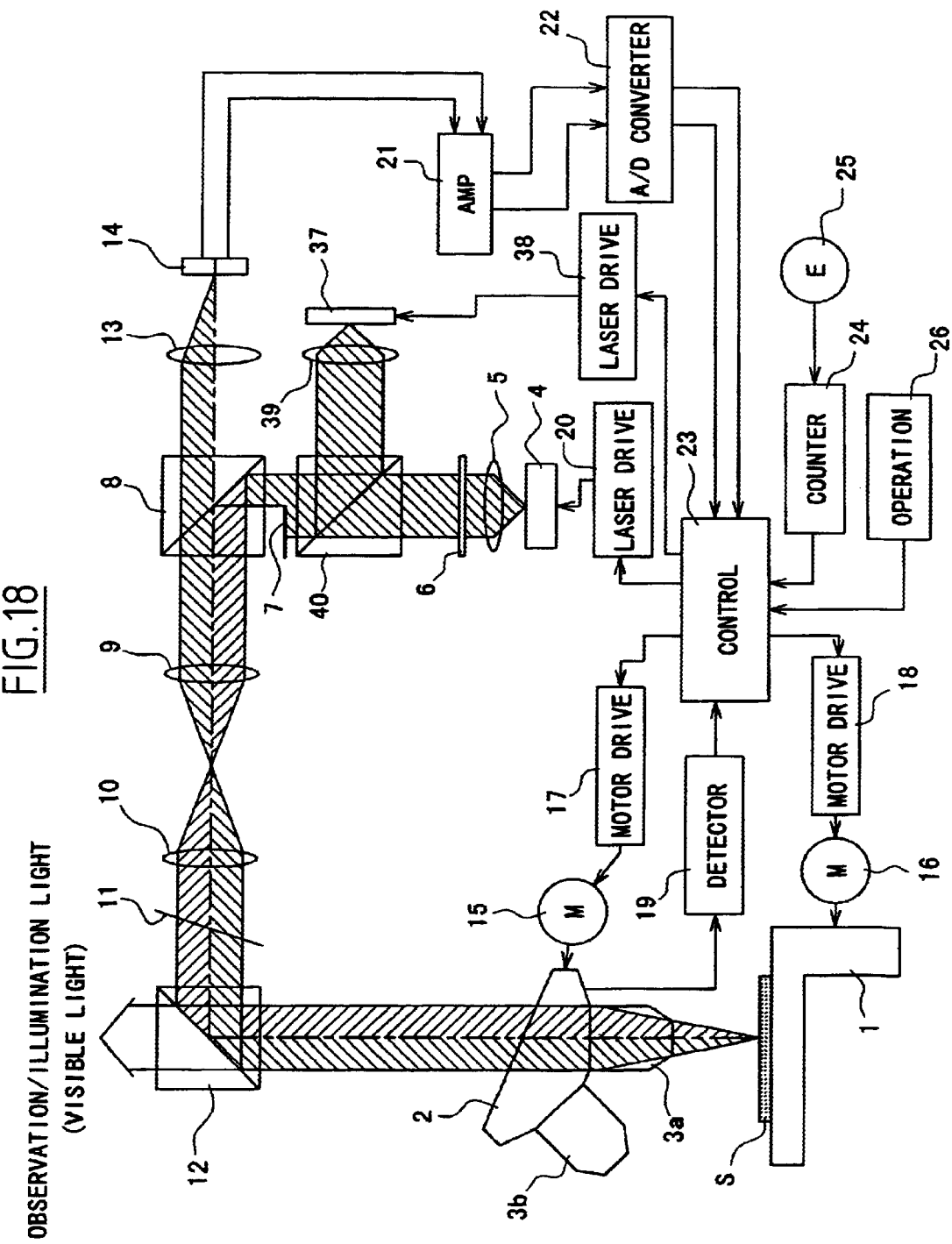
FIG. 18 is a view showing a fourth embodiment of the focus detecting device according to the present invention.

The fourth embodiment is shown in FIG. 18. Like numerals indicate like elements with respect to the first embodiment and their detailed description is omitted. In this embodiment, like the third embodiment, the diffracting grating 6 is always placed in the optical path to maintain a state where a plurality of light beams are produced. The fourth embodiment has a laser 37 which is a second light source, a laser driving section 38, a second collimator lens 39, and a half mirror 40. By oscillating (turning on) either the light source 4 or the light source 37, the changeover between the single-spot projection system and the multi-spot projection system is performed. As in the second embodiment, the changeover between the single-spot projection system and the multi-spot projection system is performed by the projection system changeover switch.

When the single-spot projection system is selected, the instructions of the start of oscillation are sent to only the laser driving section 38 from the control section 23, and laser light is emitted from a semiconductor laser of the light source 37. The laser light is converted into a parallel beam by the second collimator lens and is then incident on the half mirror 40. The laser light reflected by the half mirror 40 is such that half of the beam is blocked by the light-blocking plate 7. Here, since there is nothing, with the exception with the collimator lens 39, between the light source 37 and the half mirror 40, a single light beam is produced. On the other hand, the signal of the start of oscillation is not sent to the laser driving section 20 from the control section 23, and thus the laser light is not emitted from the light source 4 but emitted from the light source 37. It follows from this that only on spot beam is formed on the sample.

When the multi-spot projection system is selected, on the other hand, the instructions of the start of oscillation are issued from the control section 23 to only the laser driving section 20. In this case, since the diffraction grating 6, in addition to the collimator lens 5, exists between the light source 4 and the half mirror 40, a plurality of light beams are produced. For the light source 37, the instructions of oscillation stop are issued from the control section 23 to the laser driving section 38. As such, a plurality of spot beams are formed on the sample.

As discussed above, the fourth embodiment, like the second embodiment, is capable of using the single-spot projection system and the multi-spot projection system by the changeover from one to the other, and thus the same effect as in the second embodiment is brought about. Also, since the fourth embodiment does not require a mechanical drive for the changeover between the single-spot projection system and the multi-spot projection system, the changeover can be carried out at a short time. Moreover, the problem of vibration involved in the changeover is not raised.

Unless the changeover time and vibration offer problems, shutters are interposed between the light source 4 and the half mirror 40 and between the light source 37 and the half mirror 40, and the projection system can be switched by opening and closing the shutters. In this case, each of the shutters may be constructed with any one of a mechanical optical element, a liquid crystal optical element, and an optical element utilizing an electrooptical effect.

Fifth Embodiment

The fifth embodiment is related to a technique of increasing the probability that the sample is brought to a focus without imposing the burden of focusing operation on an observer. In a focus detecting operation, a failure in focusing relative to a sample is attributable to the fact that the reflectivity of the sample is low, the scattering of light is caused at the edge (when an objective lens of a high magnification is particularly used), or the diffraction and scattering of light are caused by the periodic structure of the sample (when an objective lens of a low magnification is particularly used). In this case, as mentioned above, focus detection with the multi-spot projection system is effective. However, whether the single-spot projection system is better or the multi-spot projection system is more effective may be determined when the focus detecting device is actually operated. However, if the changeover between the single-spot projection system and the multi-spot projection system is carried out by an observer (operator), the projection system must be executed manually. This is cumbersome and inconvenient.

Figure 19:
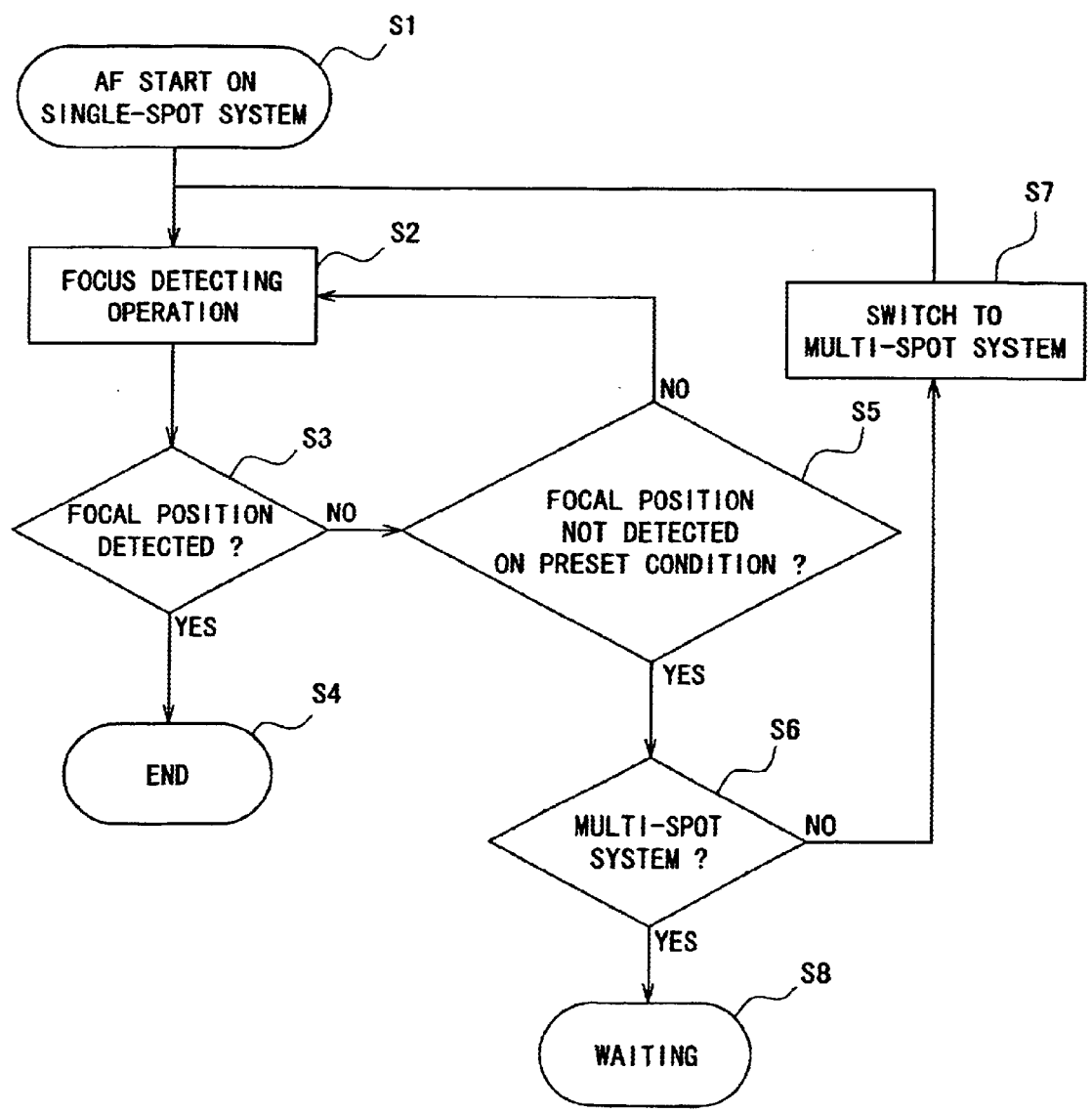
FIG. 19 is a flowchart showing a procedure for focus detection in a fifth embodiment of the focus detecting device according to the present invention.

Thus, in the fifth embodiment, the condition of focus detection is monitored by the control section 23 so that the projection mode is switched automatically in accordance with the condition. FIG. 19 shows a procedure for automatically switching the projection system, using a flowchart. Here, it is assumed that the single-spot projection system is first used for focusing. By the instructions of the start of focus detecting (AF) operation (Step S1), the focus detecting operation is performed (Step S2). When the focus detecting operation is started, the distance between the objective lens 3 and the sample S, and the focus error signal is generated. In accordance with the value of the focus error signal, the in-focus or out-of-focus state is decided (Step S3). When the value of the focus error signal becomes zero, it is decided that a focal position has been detected by the single-spot projection system, and the focus detecting operation by the single-spot projection system is completed (Step S4).

When the focus error signal is not zero, it is decided that the focal position is not yet detected, and the focus detecting operation by the single-spot projection system is continued. However, before that, the decision as to whether or not the focal position has not been detected on a preset condition (for example, the number of times for changing the distance between the objective lens 3 and sample S) (Step S5) is performed. Where the focal position has not been detected on the preset condition, steps of the focus detecting operation (Step S2), the decision of detection of the focal position (Step S3), and the decision as to whether or not the preset condition has been satisfied (Step S5) are repeated.

Where the focal position is not detected, irrespective of the fact that the preset condition is satisfied, it is decided that the focal position has not been detected by the single-spot projection system. Whether the projection mode is the multi-spot projection system is decided (Step S6). Here, since the focal position has not been detected by the single-spot projection system, the changeover to the multi-spot projection system is carried out (Step S7).

After the projection system has been switched to the multi-spot projection system, steps of the focus detecting operation (Step S2), the decision of detection of the focal position (Step S3), and the decision as to whether the preset condition has been satisfied (Step S5) are repeated. When it is decided that the focal position has been detected, the focus detecting operation by the multi-spot projection system is completed (Step S4). Where the focal position has not been detected even by the multi-spot projection system, it is decided that the focal position is not detected by the single-spot projection system, nor by the multi-spot projection system, a waiting state is entered (Step S8).

In the fifth embodiment, since the focus detecting operation by the single-spot projection system and the multi-spot projection system are performed by the procedure mentioned above, the burden of focusing operation on the observer can be lessened. Moreover, the focus detecting operation is attempted by the two projection systems and thus the probability of focusing becomes high.

Sixth Embodiment

The sixth embodiment is such that the focal position is detected once by the multi-spot projection system and then by the single-spot projection system.

Figure 20:
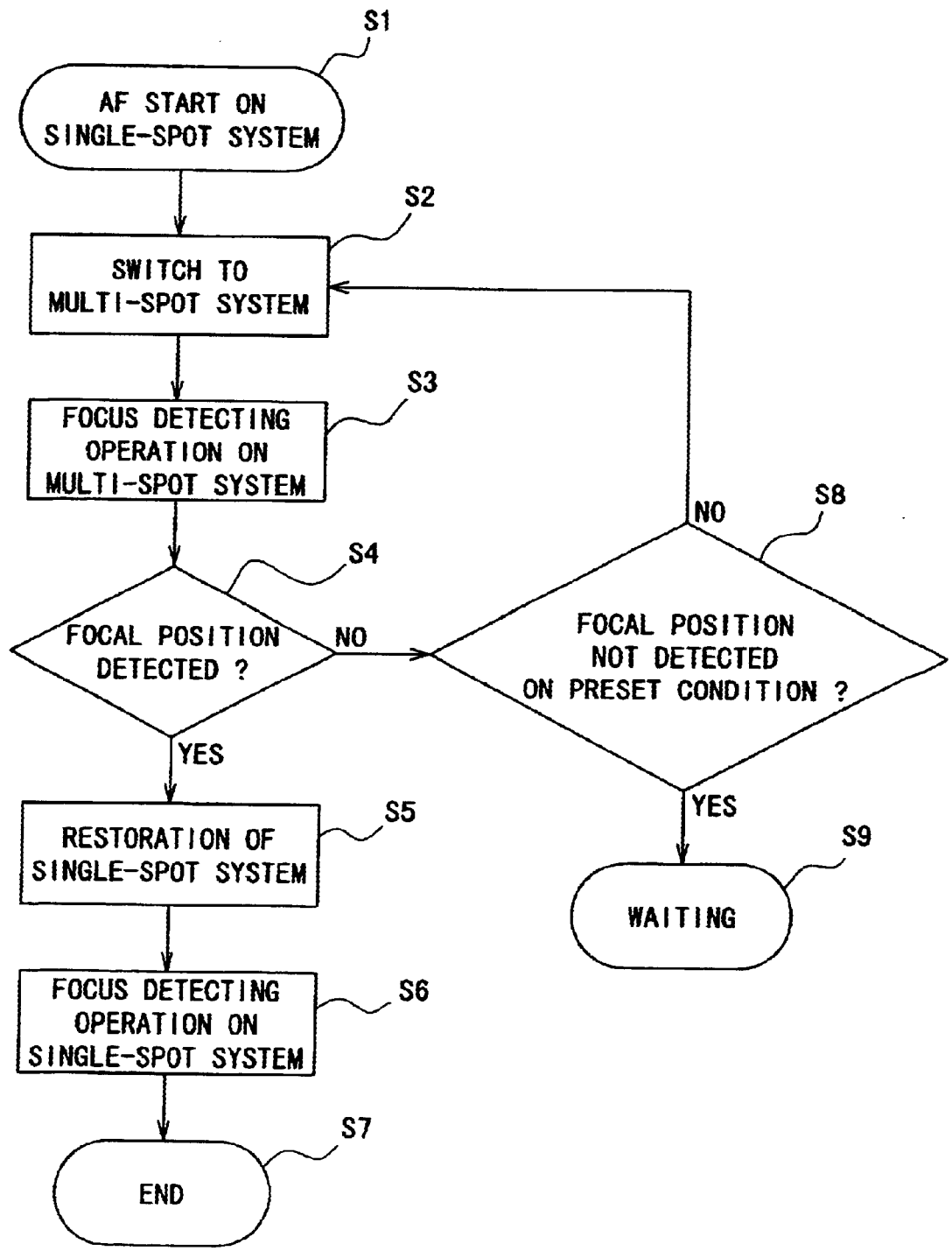
FIG. 20 is a flowchart showing a procedure for focus detection in a sixth embodiment of the focus detecting device according to the present invention.

This procedure is shown in the flowchart of FIG. 20. It is assumed that the single-spot projection system is first used for focusing. After the start of the focus detecting (AF) operation is instructed (Step S1), the projection mode is switched to the multi-spot projection system (Step S2). After the changeover of the projection mode is completed, the focus detecting operation is performed (Step S3). In the focus detecting operation, the distance between the objective lens 3 and sample S is changed and the focus error signal is generated. In accordance with the value of the focus error signal, the in-focus or out-of-focus state is decided (Step S4). When the focus error signal becomes zero, it is decided that the focal position has been detected by the multi-spot projection system, and the focus detecting operation by the multi-spot projection system is completed. The procedure where the focus error signal is not zero is the same as in the fifth embodiment.

After the focus detecting operation by the multi-spot projection system is completed, the projection mode is changed to the single-spot projection system (Step S5), and a high-precision focus detecting operation by the single-spot projection system (here, at two steps of the focus detecting operation and the decision of the in-focus or out-of-focus state) is performed (Step S6). When the focus error signal becomes zero, it is decided that the focal position has been detected by the single-spot projection system, and the focus detecting operation by the single-spot projection system is completed (Step S7).

Where the focal position cannot be detected by the multi-spot projection system, the waiting state is entered as in the fifth embodiment. Although not shown, even where the projection mode is switched from the multi-spot projection system to the single-spot projection system and the focal position is not detected by the single-spot projection system, the waiting state is entered.

In the sixth embodiment, by following the procedure mentioned above, the portion of an average height of the sample is brought to a focus by the multi-spot projection system, and then the projection mode is switched to the single-spot projection system so that focusing of a high degree of accuracy is performed. As such, the probability of focusing becomes higher than that of the single-spot projection system alone.

Seventh Embodiment

The seventh embodiment is shown in FIG. 21. Like numerals indicate like elements with respect to the first embodiment and their detailed description is omitted. The construction of this embodiment is such that a photosensor 41 for detecting the position of the diffraction grating 6, an ND (neutral density) filter 42 which is the intensity attenuation member, an ND driving section 43 for moving the ND filter 42, and an ND driving motor 44 are added to the construction of the second embodiment.

The seventh embodiment, like the second embodiment, is constructed so that the diffraction grating 6 is moved in or out of the optical path. As described above, when the diffraction grating 6 is inserted in the optical path, a plurality of light beams are produced by diffraction. In this case, the intensity of each of the light beams is lower than that of a light beam before incidence on the diffraction grating 6. Moreover, since the intensity of light is somewhat lost by the diffraction grating 6, the sum of the intensities of the light beams is considerably different from the intensity of a light beam before diffraction. Specifically, the single-spot projection system and the multi-spot projection system are different in the intensity of the light beam incident on the photodetector 14 (the sum of light beams in the case of the multi-spot projection system). When this difference of the intensity is large, the photodetector 14 or the amplifier 21 requires a wide dynamic range. Since the photodetector or amplifier of the wide dynamic range is expensive and requires a complicated amplifier circuit, it is favorable that the difference in intensity between both projection systems is minimized.

Thus, in the seventh embodiment, the intensity of light is adjusted by inserting or removing the ND filter 42 in or out of the optical path so that there is little difference in intensity between the single-spot projection system and the multi-spot projection system. Also, the ND filter is an optical filter in which the intensity of incident light is reduced in particular proportion.

In the seventh embodiment, the transmittance of the ND filter 42 is set so that the sum of the intensities of light radiated on the sample or the sum of those when the light is received by the photodetector 14 is almost the same with respect to the single-spot projection system and the multi-spot projection system. When the diffraction grating 6 is not inserted in the optical path, the ND filter 42 is inserted in the optical path, while when the diffraction grating 6 is inserted in the optical path, the ND filter 42 is removed from the optical path. By doing so, the intensities of light in both projection systems are practically equalized.

The seventh embodiment, as shown in FIGS. 22A and 22B, is provided with the photosensor 41 so that whether the diffraction grating 6 is inserted in the optical path or removed therefrom can be detected. The diffraction grating 6 has a sensor light-blocking section 6a in addition to a diffraction section in which a grating contour is configured. The sensor light-blocking section 6a may be configured integral with the diffraction section or may, after being configured independently, be integrated with the diffraction section. Also, the grating contour of the diffraction section refers to a configuration indicated by shading or irregularity provided on the diffraction grating 6, including various shapes such as concentric circles, not to speak of linearity.

As in the second embodiment, the diffraction grating 6 is moved in or out of the optical path by the switch, not shown, provided in the control section 23. In the seventh embodiment, it is only necessary to insert or remove the ND filter in or out of the optical path synchronously or asynchronously with the insertion or removal of the diffraction grating 6 in or out of the optical path. In this case, the position of the diffraction grating 6 must be detected, and therefore, as mentioned above, the photosensor 41 for detecting the position of the diffraction grating 6 is placed along the light beam.

The photosensor 41 is constructed with a light-emitting section 41a and a light-receiving section 41b so that sensor light emitted from the light-emitting section 41a is incident on the light-receiving section 41b. Since there is nothing between the light-emitting section 41a and the light-receiving section 41b, the sensor light from the light-emitting section 41a is always incident on the light-receiving section 41b. On the other hand, when a light-blocking member is inserted between the light-emitting section 41a and the light-receiving section 41b, the sensor light is blocked and ceases to be incident on the light-receiving section 41b. Thus, two states can be detected in accordance with whether the sensor light is incident on the light-receiving section 41b.

In the seventh embodiment, it is assumed that a state where the sensor light is incident on the light-receiving section 41b is referred to as "on", while a state where the sensor light is not incident is referred to as "off". Instead of using the photosensor shown in FIGS. 22A and 22B which is called a photointerrupter, it is possible to use a photosensor, called a photoreflector, receiving light radiated on and reflected from an object or a contact sensor detecting the contact state of a mechanical contact.

FIG. 22A shows the positional relationship between the diffraction grating 6 and the photosensor 41 in the single-spot projection system. When the single-spot projection system is selected, each of the diffraction grating 6 and the sensor light-blocking section 6a is located at the waiting position. Thus, an on signal is output from the photosensor 41 to the control section 23. Subsequently, when the focus detection mode is changed from the single-spot projection system to the multi-spot projection system, the diffraction grating 6, as illustrated in FIG. 22B, is moved from the waiting position and is placed in the light beam. In this case, the sensor light-blocking section 6a blocks the sensor light emitted from the light-emitting section 41a. As such, the sensor light ceases to be received by the light-receiving section 41b, and thus an off signal is output from the photosensor 41 to the control section 23.

The control section 23 issues driving instructions to the ND driving section 43 in accordance with the on or off signal from the photosensor 41. By the driving instructions, the ND motor 44 is rotated to move the ND filter 42. Consequently, the ND filter 42 is moved in or out of the optical path. In the seventh embodiment, when the output signal from the photosensor 41 is "on", the single-spot projection system is set and thus instructions for moving the ND filter 42 in the optical path are issued from the control section 23 to the ND driving section 43. When the ND filter is inserted in the optical path, instructions for maintaining this state are issued from the control section 23 to the ND driving section 43.

Conversely, when the output signal from the photosensor 41 is "off", the multi-spot projection system is set and thus instructions for moving the ND filter 42 to the waiting position are issued from the control section 23 to the ND driving section 43. When the ND filter 42 is located at the waiting position, instructions for maintaining this state are issued from the control section 23 to the ND driving section 43.

The photosensor for detecting the position of the ND filter 42 may be further provided. In this case, the control section 23 is capable of recognizing the position of the ND filter 42 through the signal from the photosensor. Thus, whether the movement of the ND filter 42 is required can be decided in accordance with the signal from the photosensor.

Subsequently, the operation procedure of the embodiment is explained with reference to a flowchart shown in FIG. 23. Here, it is assumed that whether the single-spot projection system or the multi-spot projection system is used is predetermined by an observer.

First, reference is made to the case where the single-spot projection system is selected. The observer pushes the AF starting switch (Step SI). The control section 23 reads the signal from the photosensor 41 (diffraction grating sensor) (Step S2) and ascertains whether the single-spot projection system is set (Step S3). When the signal from the photosensor 41 is "on", the single-spot projection system is set, and thus the control section 23 issues the driving signal to the ND driving section 43 to move the ND filter 42 into the optical path (Step S4). When the signal from the photosensor 41 is "off", the multi-spot projection system is set, and thus the control section 23 issues driving instructions for moving the diffraction grating 6 to the waiting position relative to the diffraction grating driving section 32. When the diffraction grating 6 is moved to the waiting position, the signal from the photosensor 41 becomes "on", and therefore, the control section 23, after receiving the on signal, issues the driving instructions to the ND driving section 43 to move the ND filter 42 into the optical path (Step S4).

On the other hand, when the multi-spot projection system is selected, the control section 23 receives the signal from the photosensor 41 (Step S2) and ascertains whether the multi-spot projection system is set (Step S3). When the signal from the photosensor 41 is "on", the single-spot projection system is set, and thus the control section 23 issues the driving instructions for moving the diffraction grating 6 into the optical path relative to the diffraction grating driving section 32. When the diffraction grating 6 is moved into the optical path, the signal from the photosensor 41 becomes "off". The control section 23, after receiving the off signal, issues the driving instructions to the ND driving section 43 to move the ND filter 42 to the waiting position (Step S5). When the signal from the photosensor 41 is "off", the multi-spot projection system is already set, and hence the control section 23 issues the driving instructions to the ND driving section 43 to move the ND filter 42 to the waiting position (Step S5). When the preparation of a selected projection system is completed, the focus detecting operation (AF operation) is started (Step S6).

Figure 23:
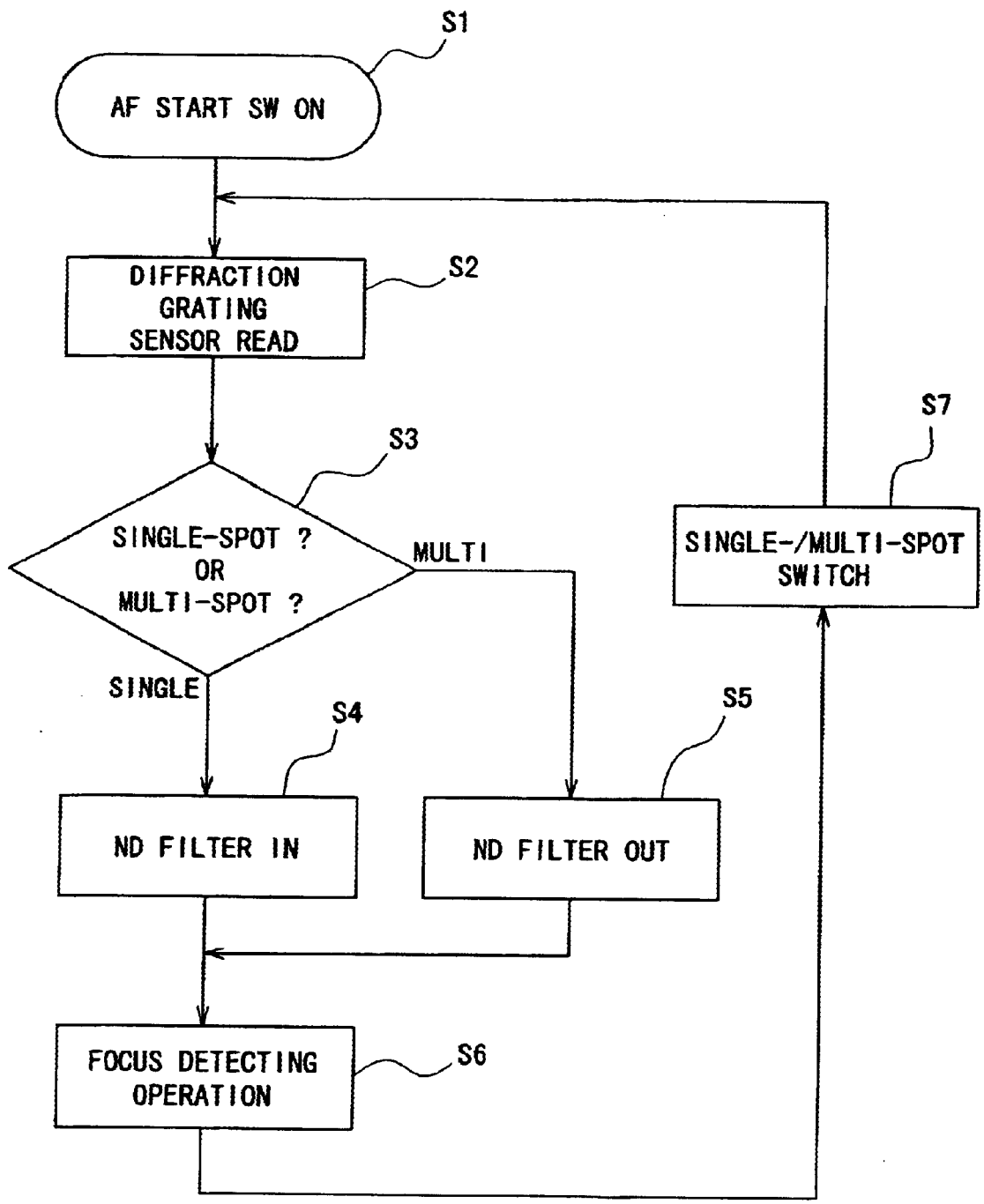
FIG. 23 is a flowchart showing a procedure for adjustment of the amount of light and focus detection in the seventh embodiment.

Also, although in the flowchart of FIG. 23 the process from the start of the focus detecting operation to the completion of detection of the focal position is not shown, Steps S3 and S5 in FIG. 19 are naturally followed. The seventh embodiment is designed so that after the focus detecting operation (Step S6) is started, the procedure capable of performing the changeover (choosing) between the single-spot projection system and the multi-spot projection system (Step S7) is followed. This procedure is conveniently provided in order to explain the improvement of operability. Hence, it is only necessary that this step (S7) is set so that it causes an interruption in the middle of the focus detecting operation or after being completed once, is performed again. The Step S7 need not necessarily be executed after the focus detecting operation (S6) is started.

Since the seventh embodiment, like the second embodiment, is designed so that the diffraction grating is movable in and out of the optical path, it brings about the same effect as in the second embodiment. The single-spot projection system and the multi-spot projection system have nearly the same intensity of light on the sample, and thus a photodetector or an amplifier of a wide dynamic range is not required. As such, it is possible to use an inexpensive photodetector and to construct an amplifier with simple circuitry. For example, when focus detection is determined by the intensities (sum) of reflected light from the sample, there is no need to set the ranges of different intensities of light in the single-spot projection system and the multi-spot projection system, and thus both systems can have various control parameters for focus detection in common.

Eighth Embodiment

Figure 24:
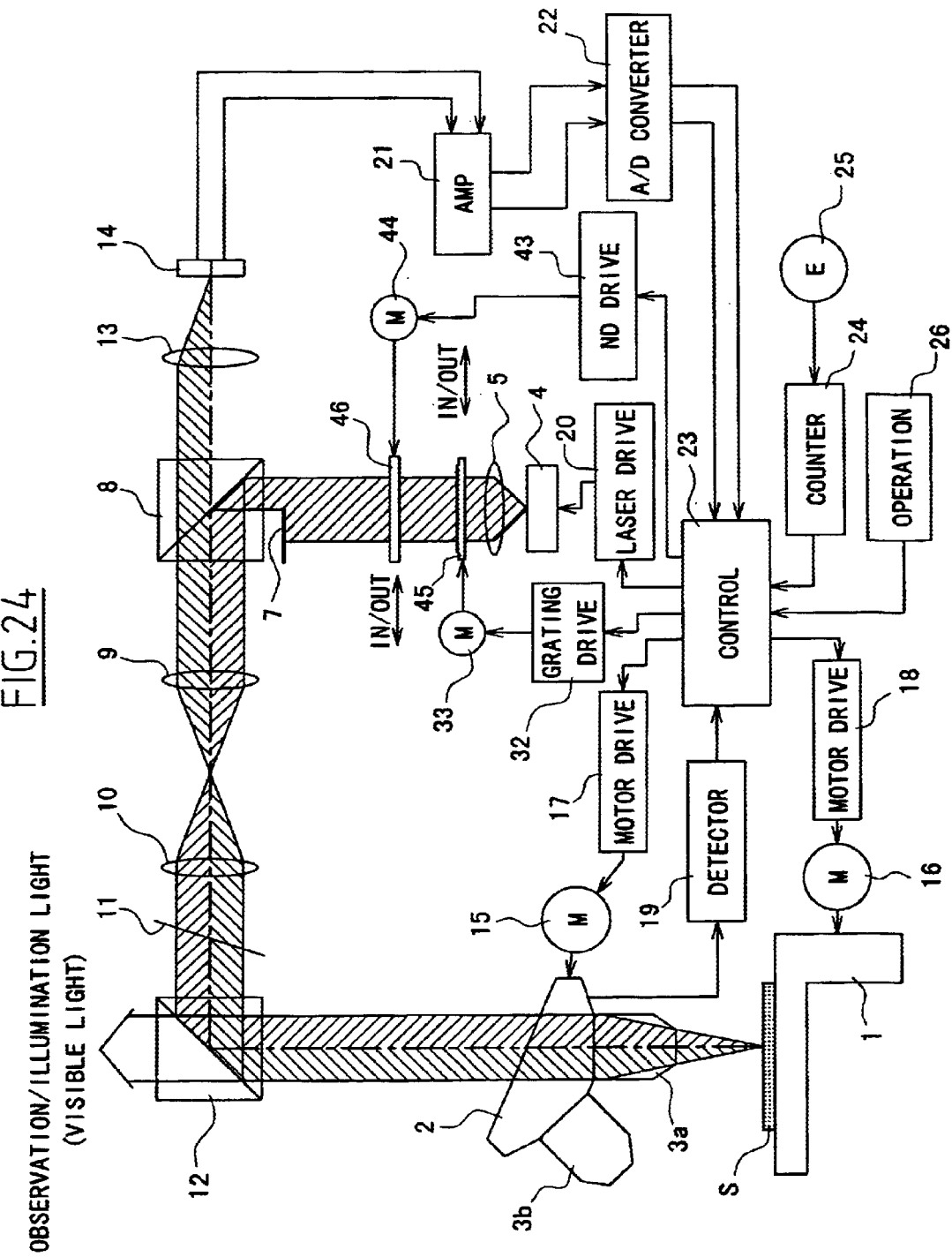
FIG. 24 is a view showing an eighth embodiment of the focus detecting device according to the present invention.
Figure 25A:
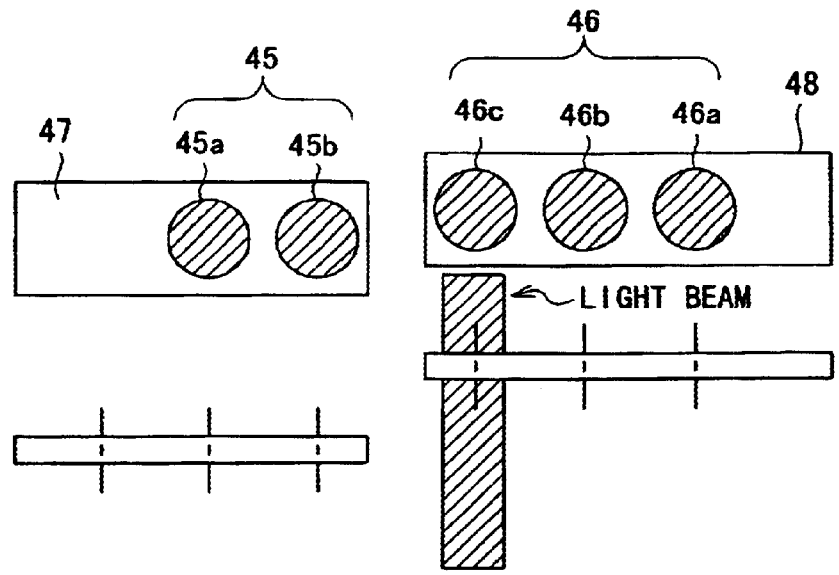
FIGS. 25A, 25B, and 25C are views for explaining a combination of a plurality of diffraction optical elements and a plurality of intensity attenuation members which are moved in or out of the optical path.
Figure 25B:
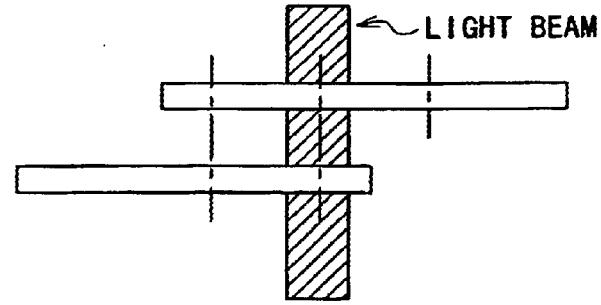
Figure 25C:
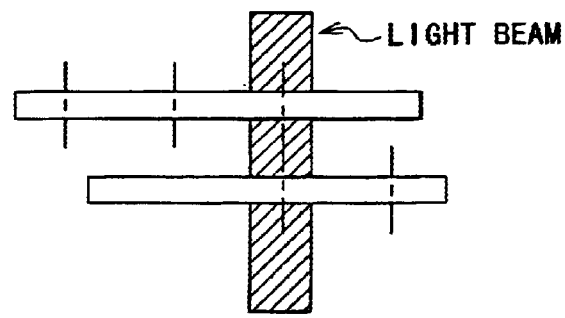

The eight embodiment is shown in FIG. 24. Like numerals indicate like elements with respect to the seventh embodiment and their detailed description is omitted. In the seventh embodiment, each of the diffraction grating 6 and the ND filer 42 is of a single kind, while the eighth embodiment, as shown in FIGS. 25A–25C, is provided with a diffracting grating group 45 including a plurality of diffraction gratings and a ND filter group 46 including a plurality of ND filters. The diffraction grating group 45 is constructed with diffraction gratings 45a and 45b of different grating shapes and a holding member 47 for holding these diffraction gratings (as shown in FIGS. 25A, 25B, 25 C). The ND filter group 46, on the other hand, is constructed with ND filters 46a, 46b, and 46c of different transmittances and a holding member 48 for holding these ND filters (as shown in FIGS. 25A, 25B, 25C).

Since the diffraction gratings 45a and 45b have different grating shapes, each of these is inserted in a light beam and thereby the sample S can be irradiated with a different projection pattern. On the other hand, each of the transmittances of the ND filters 46a, 46b, and 46c is selected so that the sum of the intensities of light on the sample S (or the photodetector 14) is constant in the case where the diffraction grating is inserted in the optical path or not, or in the case where any one of the plurality of diffraction gratings is inserted in the optical path.

Figure 26:
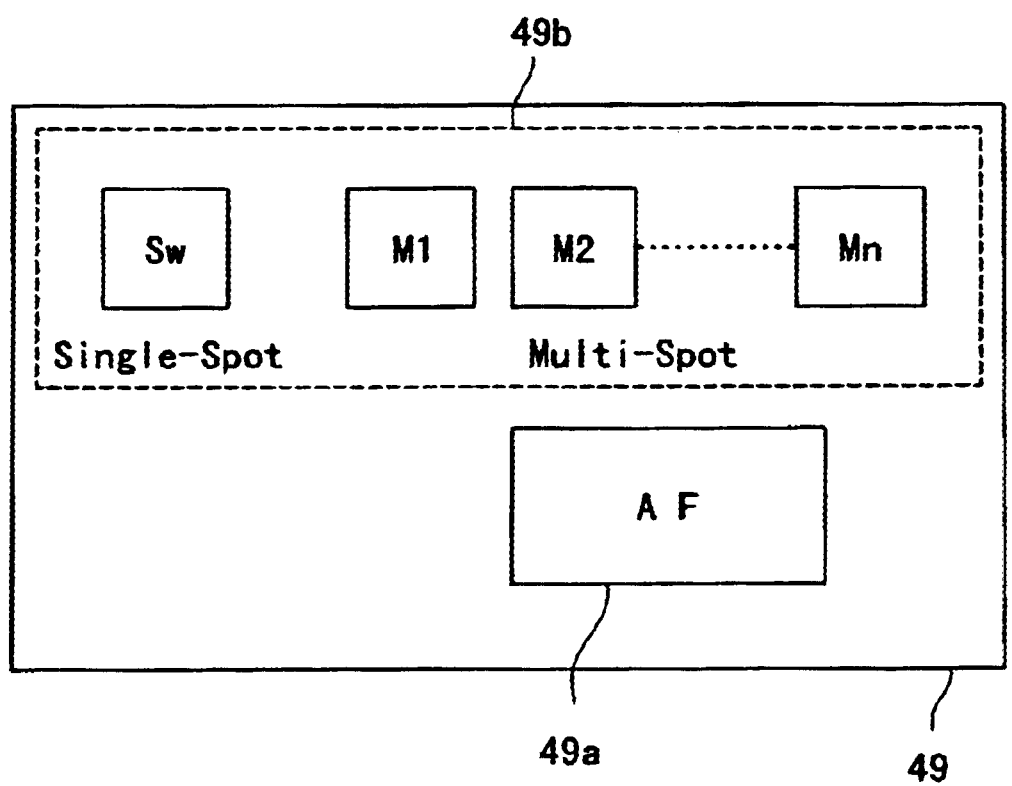
FIG. 26 is a view showing an operating section for choosing between a plurality of multi-spot projection systems and the single-spot projection system.

In the eighth embodiment also, each of the diffraction gratings 45a and 45b and each of the ND filters 46a, 46b, and 46c, as in the seventh embodiment, is moved in or out of the optical path through the control section 23. The control section 23 is provided with a control panel 49 such as that shown in FIG. 26. The control panel 49 has an AF starting switch 49a and a projection system selecting switch unit 49b. The projection system selecting switch unit 49b includes a switch Sw for selecting the single-spot projection system and a group of switches M1, M2, . . . , Mn for selecting the multi-spot projection system.

Figure 27:
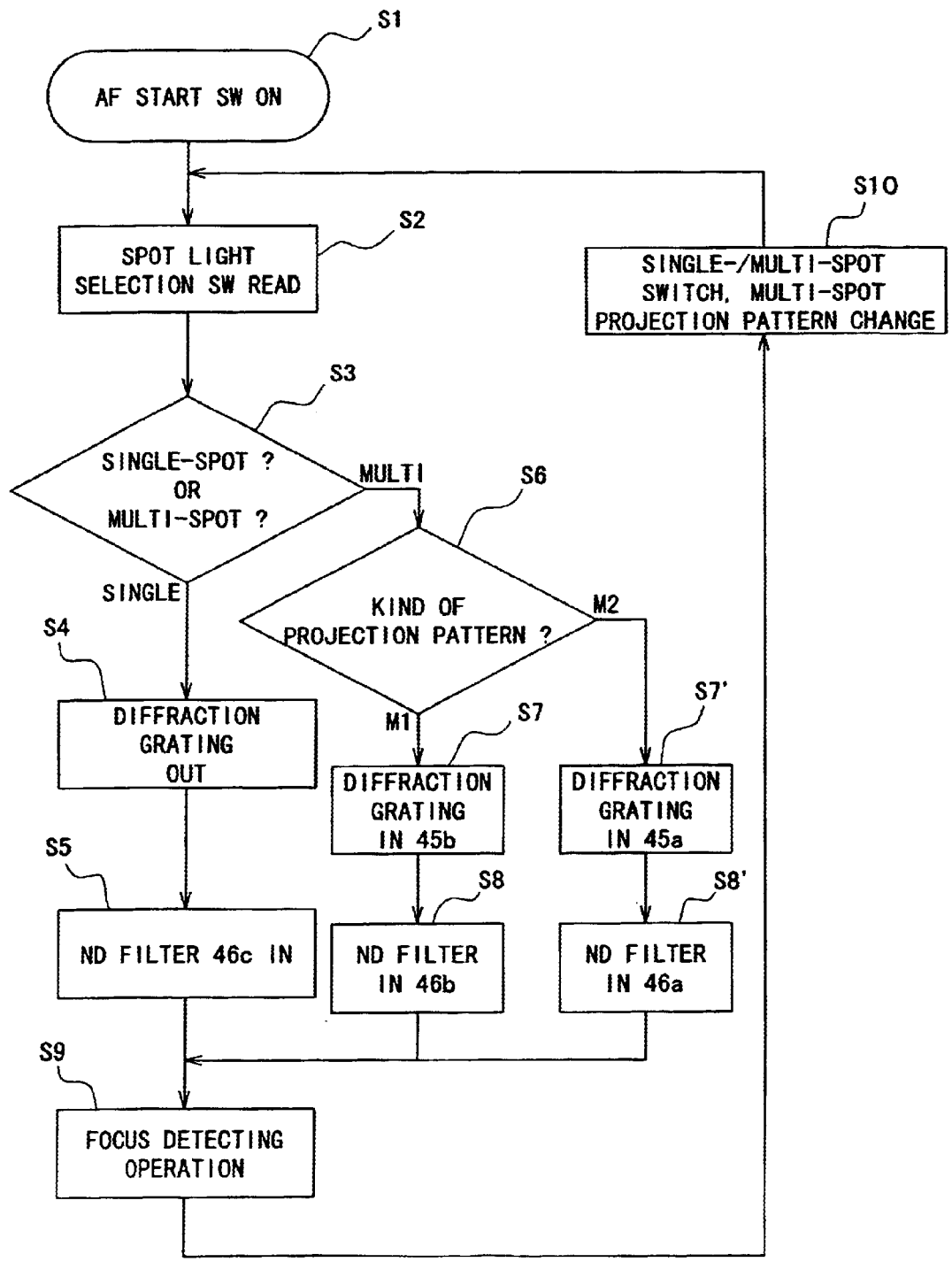
FIG. 27 is a flowchart showing a procedure for adjustment of the amount of light and focus detection in the eighth embodiment.

Subsequently, the operation procedure of the embodiment is explained with reference to a flowchart shown in FIG. 27. Although as in the seventh embodiment whether the single-spot projection system or the multi-spot projection system is used may be predetermined by the observer, it is assumed here that the selection between the single-spot projection system and the multi-spot projection system is determined in the middle of the operation.

First, the observer pushes the AF starting switch 49a (Step S1). The control section 23 makes inquiries as to whether the single-spot projection system or the multi-spot projection system should be selected. The observer pushes the switch of a desired projection system from the projection system selecting switch unit 49b. The control section 23 detects which switch of the projection system selecting switch unit 49b is pushed (Step S2). The control section 23 decides whether the single-spot projection system or the multi-spot projection system has been selected and takes a further step accordingly (Step S3).

Here, when the switch of the single-spot projection system is pressed, in order to set the single-spot projection system, the control section 23, as shown in FIG. 25A, removes the diffraction grating group 45 from the optical path (Step S4) and inserts the ND filter 46c in the optical path (Step S5). After that, the focus detecting operation is started (Step S9). Also, the transmittance of the ND filter 46c is set so that the intensity of spot light on the sample (or the photodetector 14) is substantially the same as the intensity of light in the multi-spot projection system to be described later.

When the multi-spot projection system is selected, the control section 23 decides which switch of the switches M1, M2, . . . Mn is pressed (Step S6). If the switch M1 is pressed, as shown in FIG. 25B, the diffraction grating 45b will be inserted in the optical path (Step S7) and the ND filter 46b will be placed in the optical path (Step S8) in order to set a first multi-spot projection system. Then, the focus detecting operation is started (Step S9). Also, the transmittance of the ND filter 46b is set so that the sum of the intensities of spot light on the sample is substantially the same as the intensity of spot light preset in the single-spot projection system.

If the switch M2 is pressed, as shown in FIG. 25C, the diffraction grating 45a will be inserted in the optical path (Step S7') and the ND filter 46a will be placed in the optical path (Step S8') in order to set a second multi-spot projection system. Then, the focus detecting operation is started (Step S9). Also, the transmittance of the ND filter 46b is set so that the sum of the intensities of spot light on the sample is substantially the same as the intensity of spot light preset in the single-spot projection system and is also substantially the same as the sum of the intensities of light in the first multi-spot projection system.

Here, combinations of the diffraction gratings and the ND filters are listed in Table 1.

TABLE 1

| Projection system | Diffraction grating | ND filter |
| --- | --- | --- |
| Single-spot S | — | 46c |
| Multi-spot M1 | 45b | 46b |
| Multi-spot M2 | 45a | 46a |

In the eighth embodiment, each of the diffraction grating 45a and 45b is used in combination with the ND filter, but the diffraction grating need not necessarily be combined with the ND filter. For example, where comparison between the diffraction gratings 45a and 45b for the sum of the intensities of diffracted beams shows that the intensity of light in the diffraction grating 45a is lower, only the diffraction grating 45a is placed in the optical path (that is, the ND filter is not used) and thereby loss of the intensity of light can be minimized. In this case, it is only necessary that the transmittance of each of the ND filters 46b and 46c is set to a value practically corresponding to the intensity of light where only the diffraction grating 45a is placed in the optical path.

In the eighth embodiment, like the seventh embodiment, a step (S10) is provided so that, in the middle of the focus detecting operation or after the completion thereof, the changeover between the single-spot projection system and the multi-spot projection system or between the projection patterns in the multi-spot projection system can be carried out. Whereby, the improvement of operability can be expected.

In the eighth embodiment, besides the fact that the same effect as in the seventh embodiment is brought about, samples of various shapes can be focused with high probability because the sample can be irradiated with different projection patterns.

In the eighth embodiment, a photosensor for detecting the positions of the diffraction grating group 45 and the ND filter group 46 is not provided. However, the focus detecting device is set so that when the power is initially supplied to the entire device (in an initial mode), the diffraction grating group 45 is located automatically at the waiting position and the ND filter 46c is inserted in the optical path, and then each time the switch of the projection system selecting switch unit 49b is pushed, the direction of rotation (clockwise or counterclockwise rotation) and the number of rotations of each of the diffraction grating driving motor 33 and the ND driving motor 44 are stored in the control section 23. By doing so, a desired combination of the diffraction grating and the ND filter can be provided in the optical path.

Although in the eighth embodiment the projection system selecting switch unit 49b includes a plurality of switches, the switch unit may be constructed with a single switch so that each time the switch is pressed, the projection system and the projection pattern are changed. Moreover, the eighth embodiment is such that the platelike holding members 47 and 48 for holding the diffraction gratings and the ND filters, respectively, are slid normal to the optical axis. However, the holding members can be shaped into disk forms so that they are rotated to combine a desired diffraction grating with a desired ND filter or a blank and the ND filter are placed in the optical path.

Ninth Embodiment

Figure 28:
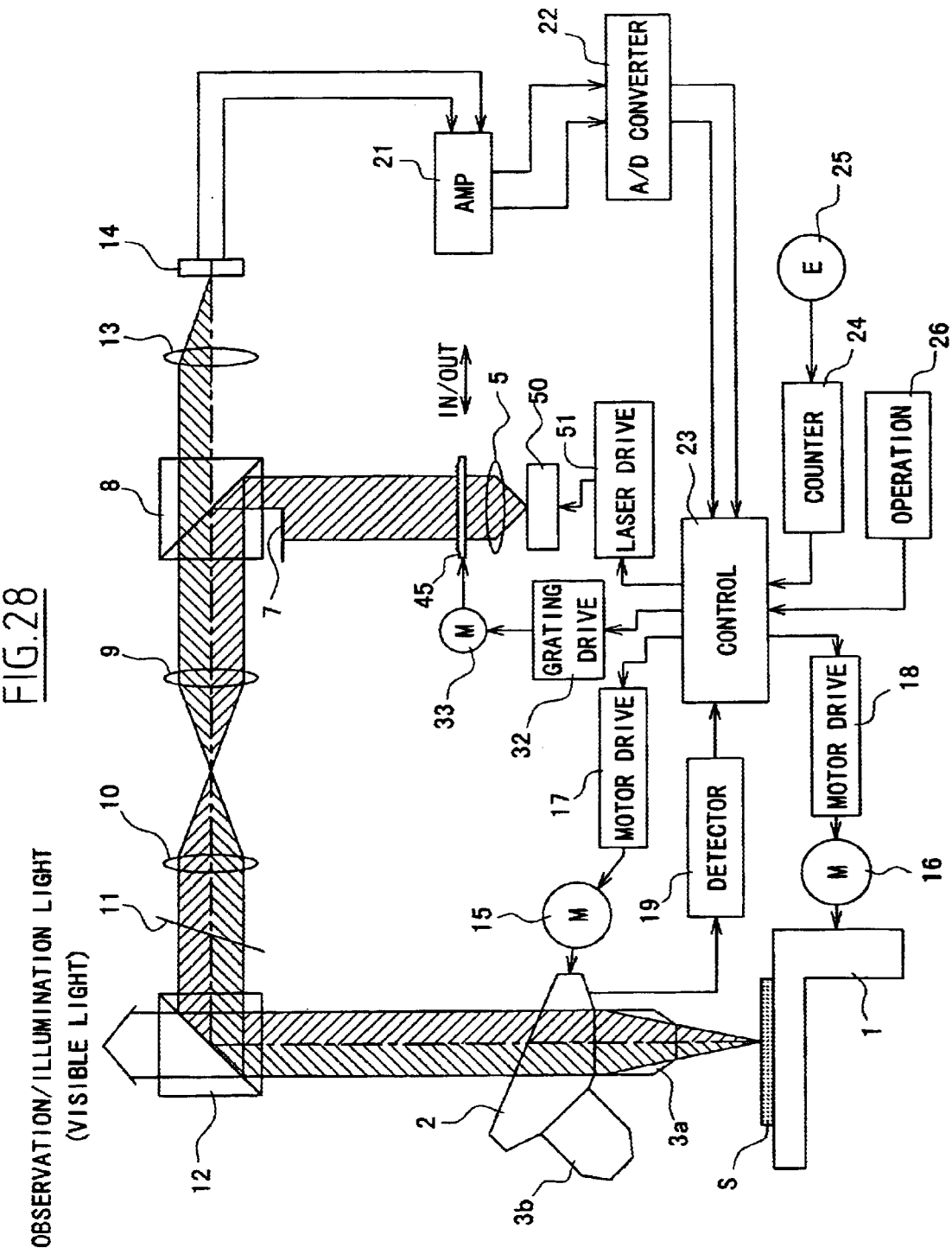
FIG. 28 is a view showing a ninth embodiment of the focus detecting device according to the present invention.

FIG. 28 shows the ninth embodiment. Like numerals indicate like elements with respect to the first embodiment and their detailed description is omitted. In the seventh and eighth embodiments, the intensity of light emitted from the light source is constant, but the ninth embodiment has a light source 50 capable of changing the intensity of light to be emitted. Thus, the ND filter group 46 of the eighth embodiment is not provided in the ninth embodiment.

The adjustment of the intensity of light emitted from the light source 50 is made by instructions issued from the control section 23. If the light source 50 is a semiconductor laser, a driving current supplied from a laser driving section 51 to the semiconductor laser is changed and thereby the intensity of light emitted from the semiconductor laser can be varied.

Figure 29:
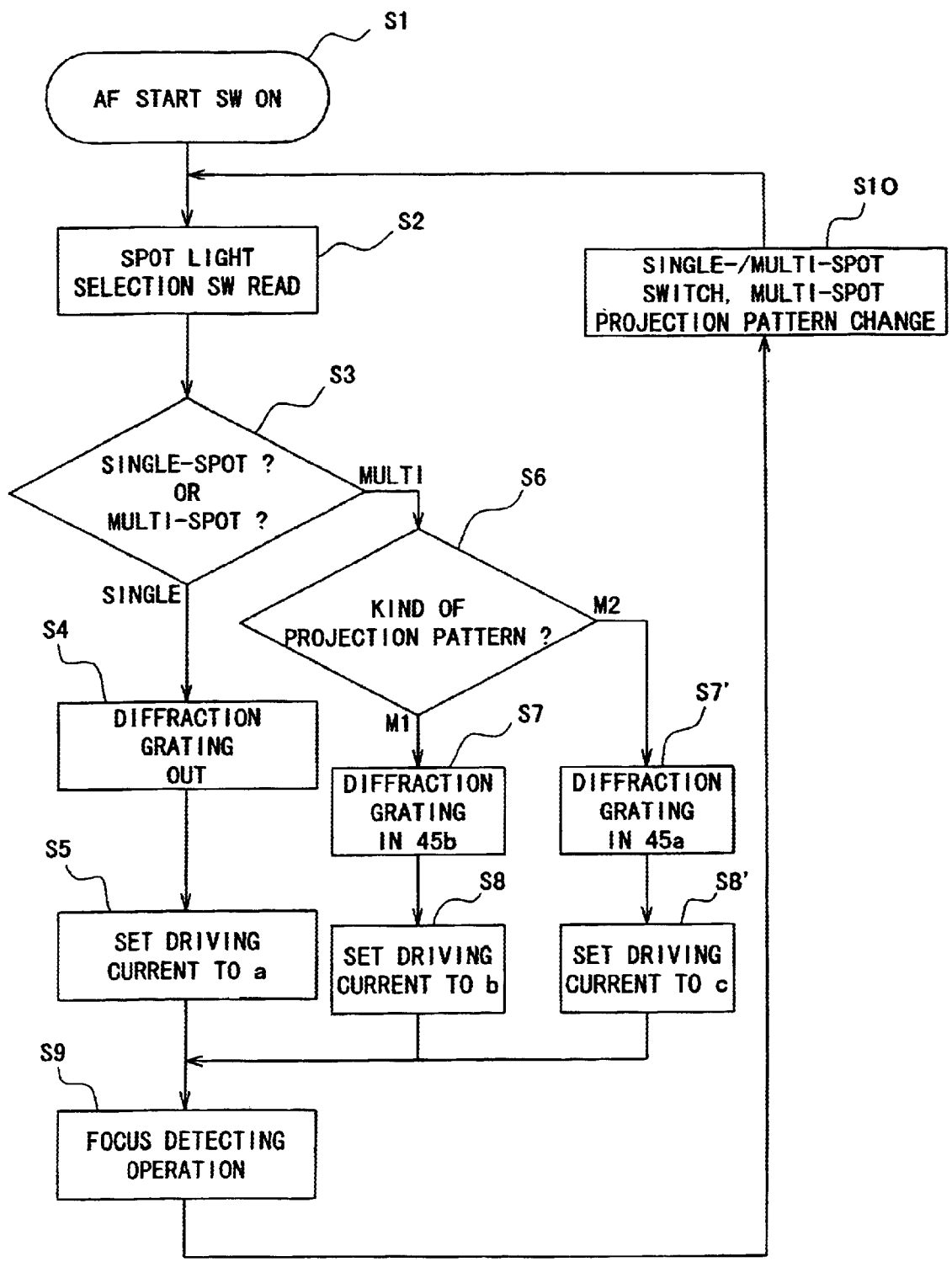
FIG. 29 is a flowchart showing a procedure for adjustment of the amount of light and focus detection in the ninth embodiment.

The operation procedure of the ninth embodiment is explained with reference to a flowchart shown in FIG. 29. The ninth embodiment follows the same procedure as the seventh embodiment with the exception that the ND filter is not replaced, but the driving current supplied to the light source 50 is changed to adjust the intensity of light.

First, the observer pushes the AF starting switch 49a (Step S1). The control section 23 makes inquiries as to whether the single-spot projection system or the multi-spot projection system should be selected. The observer pushes the switch of a desired projection system from the projection system selecting switch unit 49b. The control section 23 detects which switch of the projection system selecting switch unit 49b is pushed (Step S2). The control section 23 decides whether the single-spot projection system or the multi-spot projection system has been selected and takes a further step accordingly (Step S3).

When the switch of the single-spot projection system is pushed, the diffraction grating group 45 is removed from the optical path (Step S4) and at the same time, the driving current supplied to the light source 50 is set to a predetermined value a (Step S5). After that, the focus detecting operation is started (Step S9). Also, the driving current a supplied to the light source 50 is set so that the intensity of spot light on the sample (or the photodetector 14) is substantially the same as the intensity of light in the multi-spot projection system to be described later.

When the multi-spot projection system is selected, the control section 23 decides which switch of the switches M1, M2, ... Mn is pressed (Step S6). If the switch M1 is pressed, the diffraction grating 45b will be inserted in the optical path (Step S7) and the driving current supplied to the light source 50 will be set to a predetermined value b (Step S8). Then, the focus detecting operation is started (Step S9). The driving current b supplies to the light source 50 is set so that the sum of the intensities of spot light on the sample is substantially the same as a preset intensity of spot light in the single-spot projection system.

If the switch M2 is pressed, the diffraction grating 45c will be inserted in the optical path (Step S7') and the driving current supplied to the light source 50 will be set to a predetermined value c (Step S8'). Then, the focus detecting operation is started (Step S9). The driving current b supplies to the light source 50 is set to practically correspond to the intensity of spot light in the single-spot projection system and also to the sum of the intensities of light in the first multi-spot projection system.

Here, combinations of the diffraction gratings and the driving currents in the projection systems are listed in Table 2.

TABLE 2

| Projection system | Diffraction grating | Driving current |
|---|---|---|
| Single-spot S | — | a |
| Multi-spot M1 | 45b | b |
| Multi-spot M2 | 45a | c |

In the ninth embodiment, like the seventh embodiment, a step (S10) is provided so that, in the middle of the focus detecting operation or after the completion thereof, the changeover between the single-spot projection system and the multi-spot projection system or between the projection patterns in the multi-spot projection system can be carried out. Whereby, the improvement of operability can be expected.

In the ninth embodiment, besides the fact that the same effect as in the eighth embodiment is brought about, the construction of the device can be simplified because there is no need to use the ND filter 42 (or the ND filter group 46), the ND driving section 43, and the ND driving motor 44 in the seventh and eighth embodiments. Also, the light source 50 of the ninth embodiment may be used as a light source of each of the first to sixth embodiments.

The value of the electric signal from the photodetector 14 (the sum of the electric signals from the light-receiving sections A and B) changes with the reflectance of the sample. Thus, when the reflectance of the sample is low and the value of the electric signal from the photodetector 14 is small, the driving current supplied to the light source 50 can be increased to heighten the intensity of light incident on the photodetector 14. As a result, a focus error signal with a high S/N ratio (signal-to-noise ratio) can be obtained. Where the intensity of light radiated on the sample is extremely high, there is the possibility that the sample will be damaged, and in addition, scattered light must be blocked. As such, it is desirable that the intensity of light is reduced to some extent.

Tenth Embodiment

Figure 30:
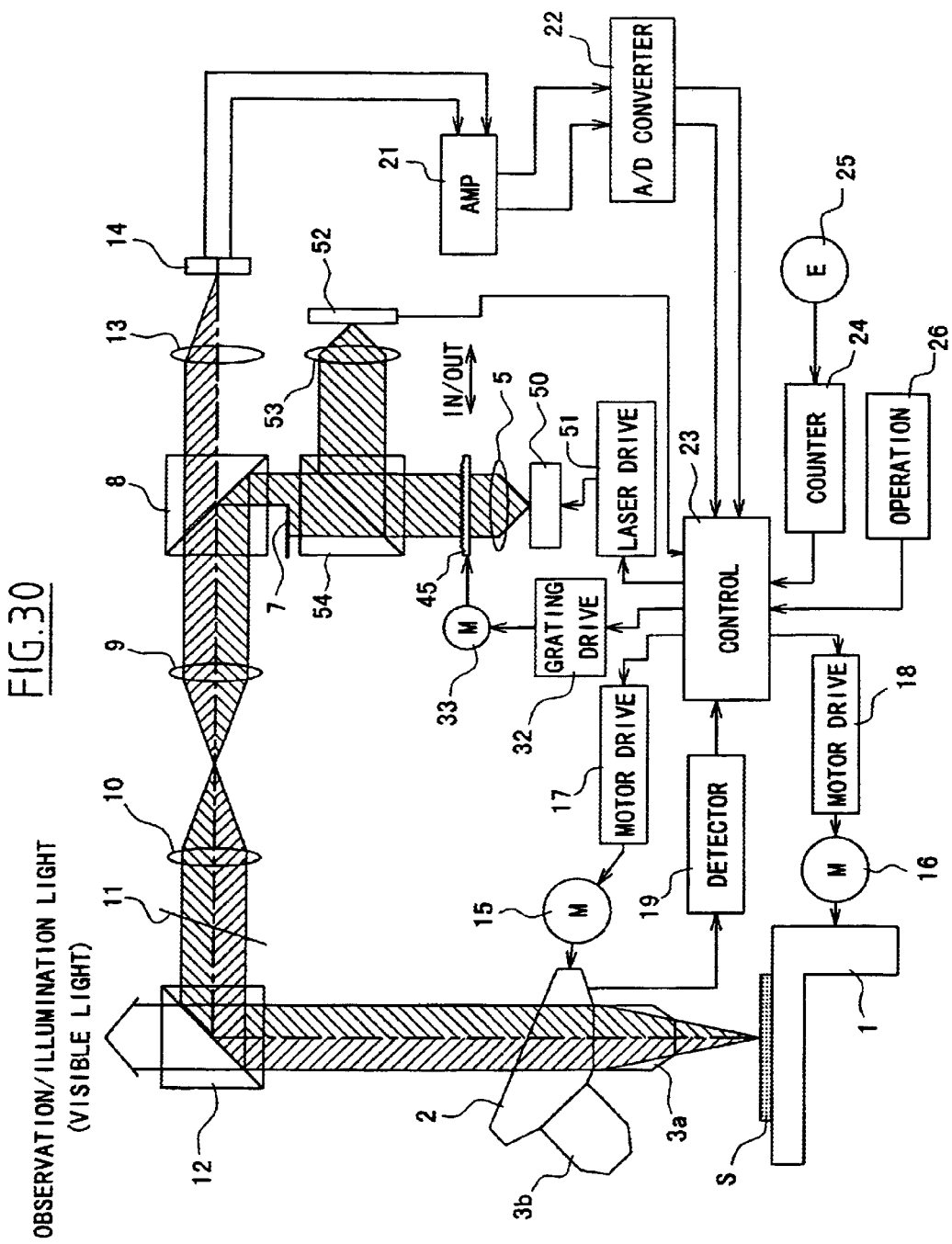
FIG. 30 is a view showing a tenth embodiment of the focus detecting device according to the present invention.

FIG. 30 shows the tenth embodiment. Like numerals indicate like elements with respect to the ninth embodiment and their detailed description is omitted. This embodiment, like the ninth embodiment, is provided with a light source 50 capable of changing the intensity of light to be emitted. The adjustment of the intensity of light emitted from the light source 50 is made by instructions issued from the control section 23. The tenth embodiment is the same as the ninth embodiment with the exception of a photodetector 52 for measuring the intensity of light emitted from the light source 50 and a converging optical element 53 and a half mirror 54 for introducing the light to the photodetector 52. The half mirror 54 may be located at any position if the light emitted from the light source 50 is split and taken out. However, from the viewpoint that reflected light from the sample is not influenced, it is favorable that the half mirror 54 is interposed between the diffraction grating group 45 and the polarization beam splitter 8.

In the ninth embodiment mentioned above, the driving current supplied to the light source 50 is preset. This is based on the premise that there is a mutual relation (for example, a proportional relation) between the driving current supplied to the light source 50 and the intensity of light emitted form the light source 50 and this mutual relation is always maintained. However, since the intensity of light radiated on the sample is not measured, whether the single-spot projection system and the multi-spot projection system are nearly equal in the intensity of light is not clear.

Thus, in the tenth embodiment, the intensity of light emitted from the light source 50 is detected by the photodetector 52, and the driving current supplied to the light source 50 is controlled so that an output signal (the intensity of light radiated on the sample) issued from the photodetector 52 is set to a predetermined value.

Subsequently, the operation procedure of the tenth embodiment is explained with reference to a flowchart shown in FIG. 31. The tenth embodiment follows the same procedure as the ninth embodiment with the exception that the current supplied to the light source 50 is changed in accordance with the output signal of the photodetector 52.

First, the observer pushes the AF starting switch 49a (Step S1). The control section 23 makes inquiries as to whether the single-spot projection system or the multi-spot projection system should be selected. The observer pushes the switch of a desired projection system from the projection system selecting switch unit 49b. The control section 23 detects which switch of the projection system selecting switch unit 49b is pushed (Step S2). The control section 23 decides whether the single-spot projection system or the multi-spot projection system has been selected and takes a further step accordingly (Step S3).

When the switch of the single-spot projection system is pushed, the diffraction grating group 45 is removed form the optical path (Step S4). An output signal X from the photodetector 52 is input in the control section 23 (Step S7).

Where the output signal X is different from a preset reference value Y, processing for changing the driving current little by little (what is called feedback processing) is executed so that the output signal X coincides with the reference value Y. Here, in the tenth embodiment, to reach the reference value Y as fast as possible, the relationship between the driving current supplied to the light source 50 and the output signal of the photodetector 52 relative to the driving current is previously measured in a state where the diffraction grating is not placed in the optical path so that a new driving current Z is calculated from the difference between the output signal X and the reference value Y in accordance with a function obtained from the result of measurement (Step S8).

When the new driving current Z is calculated, instructions for reducing the driving current to zero are issued to the laser driving section 51 (Step S9). If the output signal from the photodetector 52 in the case of the driving current Z fails to coincide with the reference value Y, the fine adjustment of the driving current is made through the feedback processing mentioned above. After that, the focus detecting operation is started (Step S10). Also, the reference value Y is set so that the intensity of spot light on the sample (or the photodetector 14) is nearly the same as the intensity of light in the multi-spot projection system to be described later.

When the multi-spot projection system is selected, the control section 23 decides which switch of the switches M1, M2, . . . , Mn is pressed (Step S5). If the switch M1 is pressed, the diffraction grating 45b (a diffraction grating A in the flowchart) will be inserted in the optical path (Step S6). The output signal from the photodetector 52 is read by the control section 23 (Step S7). Where the output signal X is different from the preset reference value Y, a new driving current Z' corresponding to the reference value Y, as in the single-spot projection system, is calculated in accordance with a function (Step S8), and the fine adjustment of the driving current is made as occasion demands. Also, this function refers to a function obtained from the result of measurement in a state where the diffraction grating 45b is placed in the optical path.

If the switch M2 is pressed, the diffraction grating 45a (a diffraction grating B in the flowchart) will be inserted in the optical path (Step S6'). Subsequent steps are the same as in the where the diffraction grating 45b is inserted in the optical path.

In the tenth embodiment, like the seventh embodiment, a step (S11) is provided so that, in the middle of the focus detecting operation or after the completion thereof, the changeover between the single-spot projection system and the multi-spot projection system or between the projection patterns in the multi-spot projection system can be carried out. Whereby, the improvement of operability can be expected.

In the ninth embodiment, besides the fact that the same effect as in the eighth embodiment is brought about, the intensities of light in individual projection systems can be equalized because the intensity of light emitted from the light source is detected.

Figure 32A:
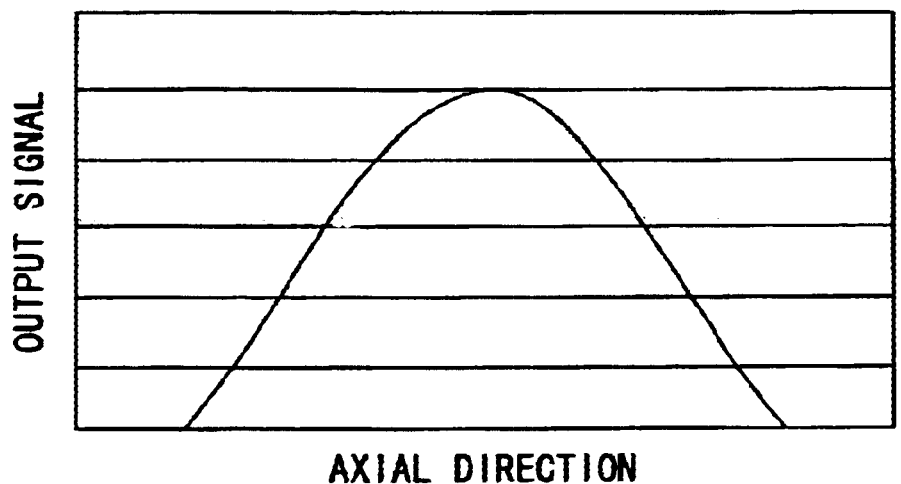
FIGS. 32A and 32B are diagrams for explaining a focus error signal.
Figure 32B:
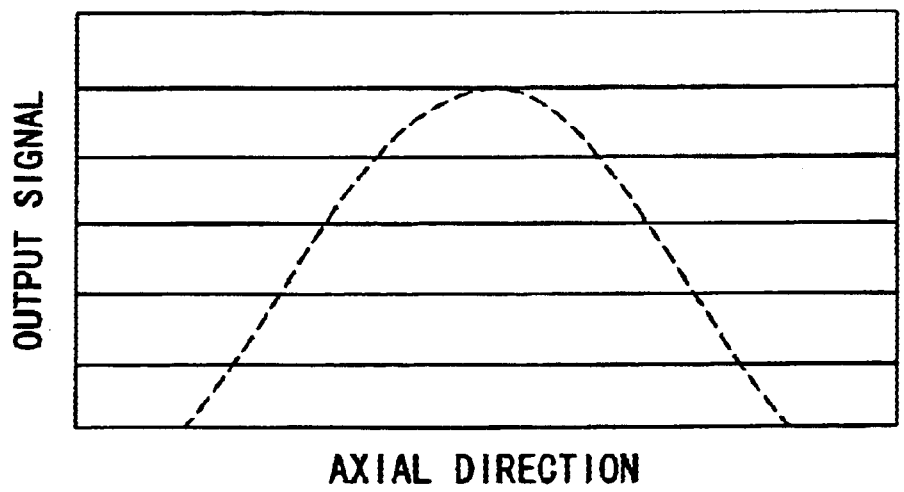

In each of the embodiments mentioned above, a plurality of spots produced by the multi-spot projection system are converged at positions of identical heights (identical in focal position). When a plane (for example, a mirror) is moved along the optical axis, across the focal position, plots of the position of the spot in an axial direction and the output signal from the photodetector at the position are given in the graph of FIG. 32A. FIG. 32B is a graph relative to the single-spot projection system. As seen from these graphs, a distance along the optical axis where the output of the photodetector reaches the maximum from zero and becomes zero again is almost the same with respect to the multi-spot projection system and the single-spot projection system.

Figure 33A:
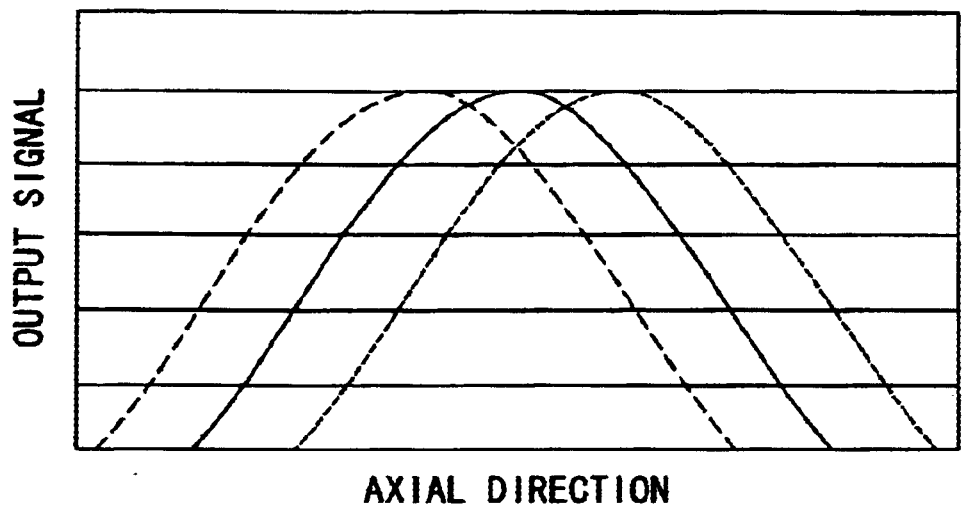
FIGS. 33A and 33B are diagrams for explaining a focus error signal in another case.
Figure 33B:
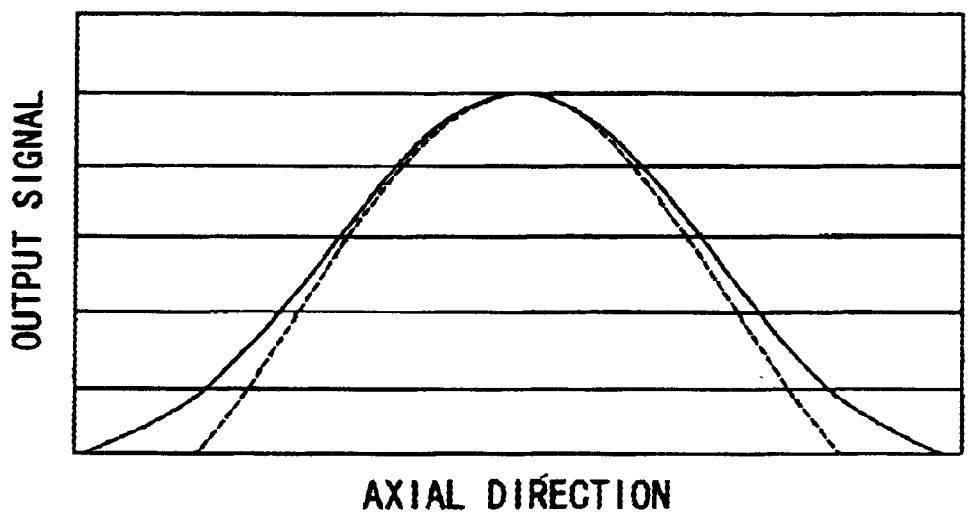

However, if an attempt is made to vary the converging positions (focal positions) of individual spots in regard to the beams of zero-order light, ±first-order light, ±second-order light, . . . , emerging from the diffraction grating, as shown in FIG. 33A, the distance along the optical axis where the output of the photodetector reaches the maximum from zero and becomes zero again varies with individual spots. Thus, when the plurality of spots are detected by a single photodetector, as shown in FIG. 33B, it is found that the multi-spot projection system indicated by a solid line has a wider focusing range than in the single-spot projection system indicated by a dotted line.

Figure 34:
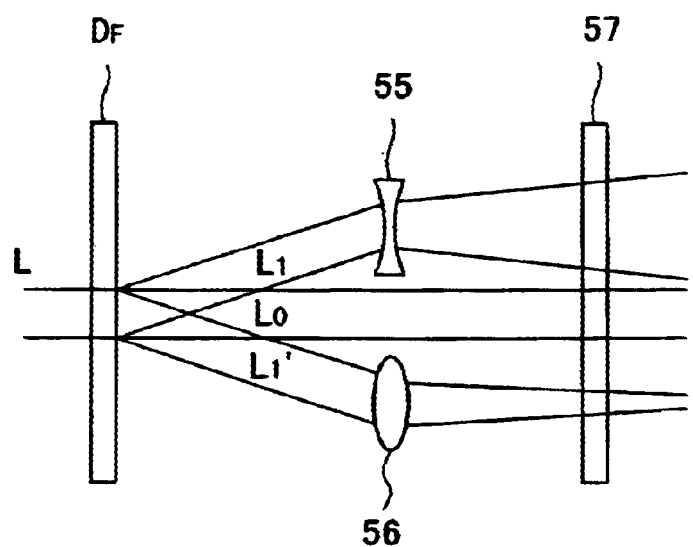
FIG. 34 is a view showing an optical system for collecting spot light at different focal positions in the multi-spot projection system.

FIG. 34 illustrates an example of an arrangement for varying the converging positions of individual spots. A parallel beam L incident on a diffraction grating $D_F$ is separated into zero-order light $L_0$, +first-order light $L_1$, and −first order light $L_1'$ to emerge therefrom. Also, higher-order light than ±first-order light is omitted. The zero-order light $L_0$ travels in a state of the parallel beam and reaches a light-blocking plate 57. The +first-order light $L_1$ is incident on a negative lens 55 placed on the emergence side of the diffraction grating $D_F$, namely between the diffraction grating $D_F$ and the light-blocking plate 57. The light is slightly refracted by the negative lens 55 into a divergent beam to emerge therefrom. The −first order light $L_1'$, on the other hand, is incident on a positive lens 56 located at a position similar to that of the negative lens 55. The light is slightly refracted by the positive lens 56 into a convergent beam to emerge therefrom. As mentioned above, since the individual beams of the zero-order light $L_0$, the +first-order light $L_1$, and the −first order light $L_1'$ are different, individual spots can be converged at different positions.

Also, the positive lens and the negative lens, instead of being placed separately, can be placed as a lens array. A diffraction optical element (diffraction lens) shaped into a grating form which has a lens function can also be used. In this case, if a plurality of gratings are configured on a single planar plate, a compact grating unit can be constructed.

Eleventh Embodiment

Figure 35A:
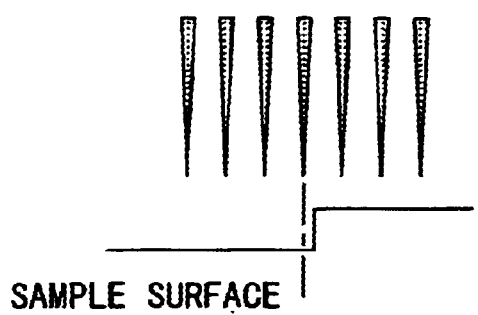
FIGS. 35A and 35B are views showing cases where the number of a plurality of spot beams is changed in the multi-spot projection system of an eleventh embodiment of the present invention.
Figure 35B:
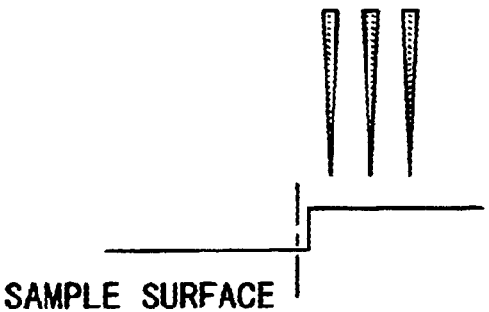

The eleventh embodiment is adapted to adjust the number of spots, the spacing between the spots, or projection positions with respect to the patterns of the spots radiated on the sample. In order to adjust the projection position, it is merely necessary that each of the diffraction gratings of different shapes is moved in or out of the optical path as described in the eighth embodiment. For example, as shown in FIG. 35A, the spots are radiated on both the upper surface and the lower surface of the step in regard to a stepped sample. In this case, even though the observer wants to bring the upper surface to a focus, the spots will be focused at the middle position between the upper and lower surfaces, as mentioned above, or at a position somewhat closer to the lower position because the number of spots radiated on the lower surface is larger than in the case of the upper surface. Thus, as shown in FIG. 35B, when four spots radiated on the lower surface are eliminated and only three spots radiated on the upper surface are used, the upper surface can be brought to a focus as the observer desires.

Figure 36A:
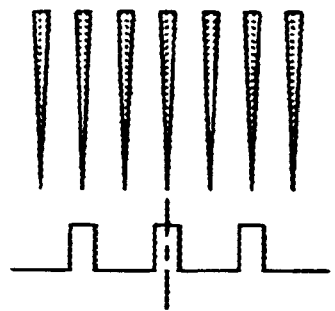
FIGS. 36A and 36B are views showing cases where the number of a plurality of spot beams and spaces between them are changed in the eleventh embodiment.
Figure 36B:
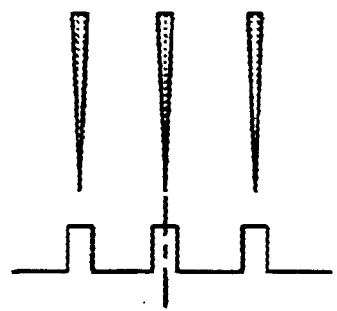

In FIG. 36A, since three of seven spots are radiated on the upper surface and the remaining four spots are radiated on the lower surface, the spots are focused at a position somewhat closer to the lower surface. In contrast, as shown in FIG. 36B, every other spot is eliminated from a state of FIG. 36A so that three spots radiated on the upper surface remain, thereby bringing the upper surface to the focus.

Figure 37A:
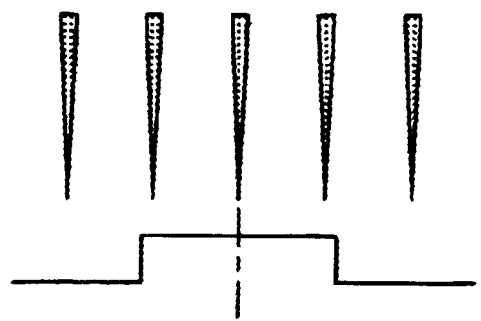
FIGS. 37A and 37B are views showing cases where spaces between a plurality of spot beams are changed in the eleventh embodiment.
Figure 37B:
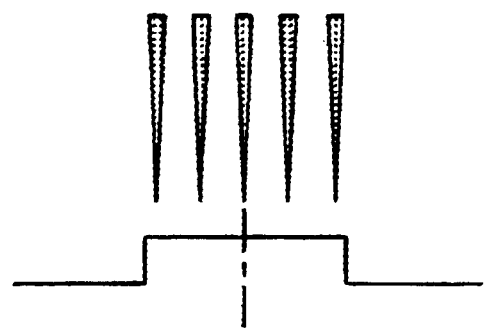

In FIG. 37A, since three of five spots are radiated on the upper surface and the remaining two spot are radiated on the lower surface, the spots are focused at a position somewhat closer to the upper position. However, as shown in FIG. 37B, when the spacing between the spots is narrowed so that all the five spots can be radiated on the upper surface, the spots can be brought to a focus on the upper surface.

Figure 38A:
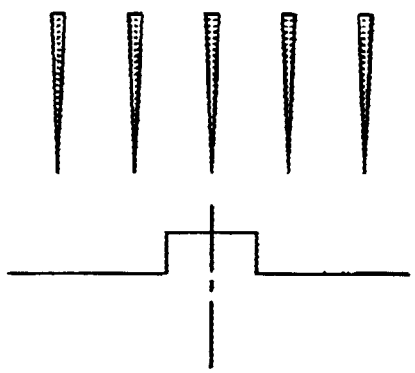
FIGS. 38A and 38B are views showing other cases where spaces between a plurality of spot beams are changed in the eleventh embodiment.
Figure 38B:
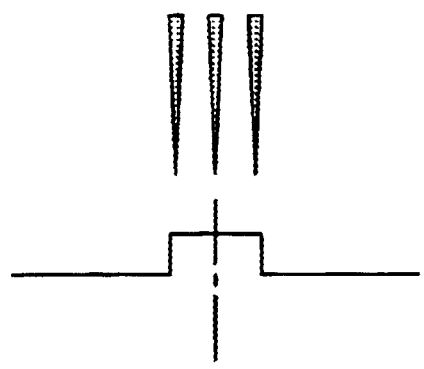

In FIG. 38A, since one of five spots is radiated on the upper surface and the remaining four spots are radiated on the lower surface, the spots are focused at a position somewhat closer to the lower surface. However, as shown in FIG. 38B, when the five spots are reduced to three and the spacing between the spots is narrowed so that all the three spots are radiated on the upper surface, the spots can be brought to a focus on the upper surface.

In the eleventh embodiment, as described above, the number of spots radiated and the spacing between them are adjusted, and thereby the spots can be radiated at a desired position on the sample. Therefore, the spots can be focused at the position of the observer's desire. Furthermore, the multi-spot projection system is set, and thus even though one spot is scattered by the edge of the step, accurate focusing can be performed by the reflected light of other spots.

Twelfth Embodiment

Figure 39A:
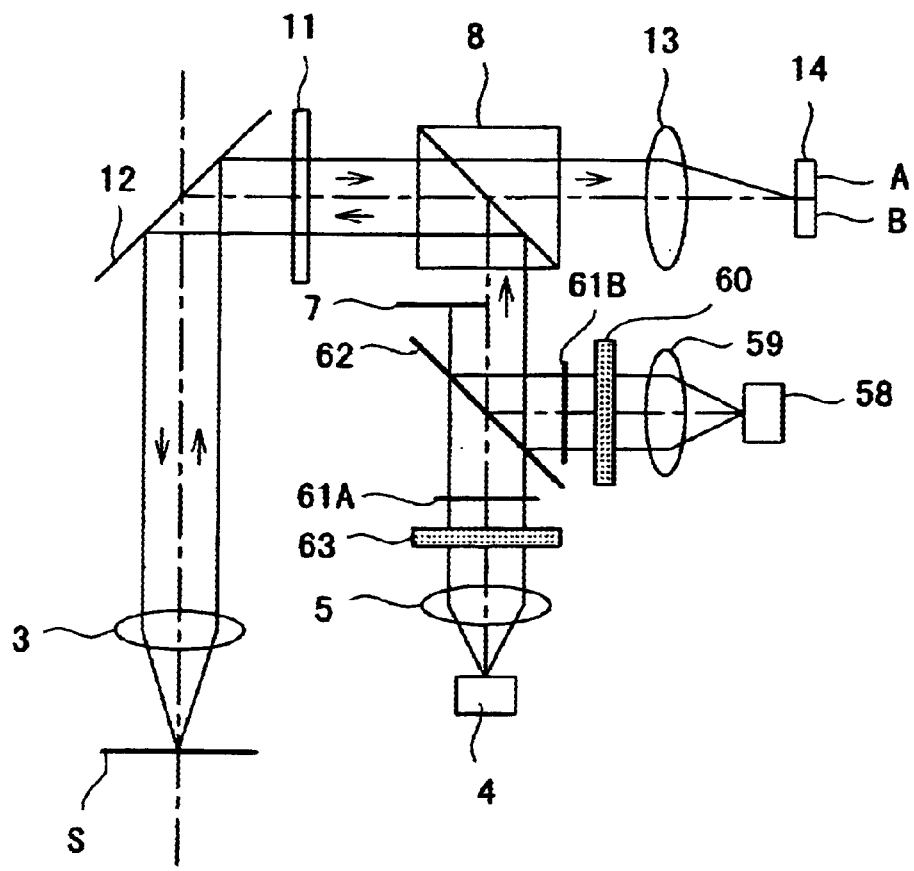
FIGS. 39A, 39B, and 39C are views showing a twelfth embodiment of the focus detecting device according to the present invention and spot patterns.
Figure 39B:
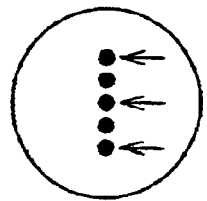
Figure 39C:
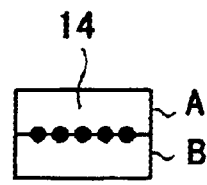

The twelfth embodiment is shown in FIGS. 39A–39C. Like numerals indicate like elements with respect to the first embodiment and their detailed description is omitted. This embodiment, like the eighth embodiment (or the eleventh embodiment), is such that spots with different patterns can be radiated on the sample. In the eighth embodiment, different diffraction gratings are moved in or out of one optical path and thereby the sample is irradiated with spots of different patterns, while in the twelfth embodiment, a plurality of light beams producing different patterns are provided to select one from optical paths corresponding to these light beams, and thereby the sample is irradiated with spots of different patterns.

In FIG. 39A, the light source 4, the collimator lens 5, and a diffraction grating 63 constitute a first optical path, and a light source 58, a collimator lens 59, and a diffraction grating 60 constitute a second optical path. The first optical path is combined with the second optical path to form one optical path through a half mirror 62. In the twelfth embodiment, the diffraction gratings 63 and 60 have different shapes. Thus, a light beam emerging from the diffraction grating 63 is different in diffraction pattern from that emerging from the diffraction grating 60. Light beams leaving individual optical paths are combined to travel one optical path through the half mirror 62, and then a combined light beam is radiated on the sample S through the objective lens 3.

A radiation pattern on the sample, as illustrated in FIG. 39B, is such that five spots are arranged in a row. Of these spots, three spots indicated by arrows are produced by the diffraction grating 63 placed in the first optical path, and the remaining two spots are produced by the diffraction grating 60 placed in the second optical path. FIG. 39C shows the case where light reflected by the sample S is reimaged on the photodetector 14 and is brought to a focus.

When the radiation pattern is changed, either a shutter 61A placed in the first optical path or a shutter 61B placed in the second optical path is actuated to block the light beam. For example, if the shutter 61A is actuated to block the light beam in the first optical path, two spots will be formed on the sample S by the light beam in the second optical path. Conversely, if the shutter 61B is actuated to block the light beam in the second optical path, three spots will be formed on the sample S by the light beam in the first optical path.

Thus, in the twelfth embodiment, like the eleventh embodiment, the number of spots radiated and the spacing between them can be adjusted. Therefore, the spots can be focused at the position of the observer's desire. Furthermore, the multi-spot projection system is set, and thus even though one spot is scattered by the edge of the step, accurate focusing can be performed by the reflected light of other spots.

For the shutter, a conventional mechanical shutter may be used, but a liquid crystal shutter may also be used. The liquid crystal shutter, in addition to the advantage that vibration involved in changeover is not caused, has the further advantage that a high-speed changeover can be performed.

Even when the focus detecting device, instead of actuating the shutters 61B and 61B, is designed to turn on or off the light sources 4 and 58, the same effect can be brought about. In this case, semiconductor lasers are favorable for the light sources. The optical paths need not necessarily be limited to two, as more than two optical paths may be provided. In this case, the radiation pattern can be made more complicated.

Thirteenth Embodiment

Figure 40A:
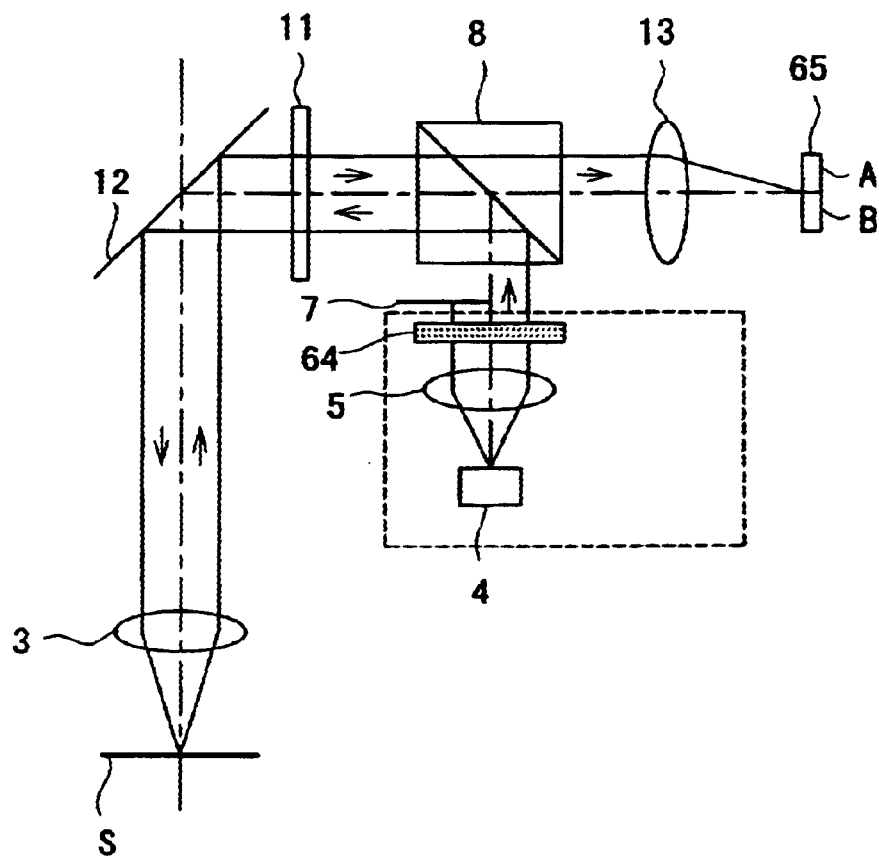
FIGS. 40A, 40B, and 40C are views showing a thirteenth embodiment of the focus detecting device according to the present invention and spot patterns.
Figure 40B:
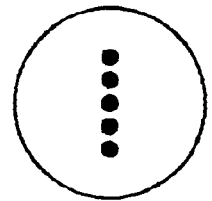
Figure 40C:
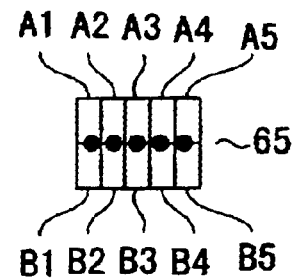

The thirteenth embodiment is shown in FIGS. 40A–40C. Like numerals indicate like elements with respect to the twelfth embodiment and their detailed description is omitted. In this embodiment, not only is the photodetector separated into two light-receiving sections A and B, but also each of the two light-receiving sections A and B is separated into a plurality of light-receiving elements. The thirteenth embodiment, as shown in 40A, is provided with only the first optical path including the light source 4, the collimator lens 5, and a diffraction grating 64, so that a light beam leaving the first optical path is radiated on the sample S through the objective lens 3. The radiation pattern on the sample, as shown in FIG. 40B, is such that five spots are arranged in a row. FIG. 40C shows the case where light reflected by the sample S is reimaged on a photodetector 65 and is brought to a focus.

Here, the photodetector 65 is provided with the light-receiving sections A and B so that reimaged spots can be received at two places, and each of the light-receiving sections A and B is constructed with a plurality of light-receiving elements. In the thirteenth embodiment, five boundaries in neighboring light-receiving elements are formed normal to the boundary between the light-receiving sections A and B, and the light-receiving section A includes light-receiving elements A1–A5 with smaller light-receiving areas. Similarly, the light-receiving section B also includes light-receiving elements B1–B5.

The focus error signal finally selected is obtained as the sum of focus error signals generated by combinations of individual light-receiving elements, such as a focus error signal generated by the light-receiving elements A1 and B1, a focus error signal by the light-receiving elements A2 and B2, . . . Hence, when the focus error signal is obtained, for example, by the light-receiving elements A1 and B1, the light receiving elements A3 and B3, and the light-receiving elements A5 and B5, the result is the same as the case where the spots are radiated on the sample through only the first optical path in the twelfth embodiment to obtain the focus error signal.

The focus error signal can also be obtained by the light-receiving elements A1 and B1, the light-receiving elements A2 and B2, and the light-receiving elements A3 and B3. If an attempt is made to realize the same in the twelfth embodiment, the diffraction grating placed in the optical path must be replaced with another diffraction grating with different shape. Therefore, the thirteenth embodiment excels over the twelfth embodiment in that the radiation pattern can be substantially changed without replacing the diffraction grating.

As mentioned above, the thirteenth embodiment has the photodetector with the plurality of light-receiving elements and thus the same effect as in the twelfth embodiment can be brought about. In addition, unlike the twelfth embodiment, the radiation pattern can be substantially changed without replacing the diffraction grating. Moreover, since a single optical path is satisfactory to the placement of the diffraction grating and the changeover mechanism such as the shutter is not required, compactness of the device can be achieved.

In the thirteenth embodiment, the size of each of the light-receiving elements A1–A5 and B1–B5 is almost the same as the diameter of a spot reimaged at the focal position. However, the spot diameter in the out-of-focus state is larger than that in the in-focus state, and hence it is desirable that each of the light-receiving elements A1–A5 and B1–B5 has such a size that the spot in the out-of-focus state can be received.

The light-receiving sections A and B may be constructed with minute light-receiving elements, for example, as in the CCD. In this case, each of the light-receiving elements A1–A5 and B1–B5 in the thirteenth embodiment is constructed with a plurality of light-receiving elements. Of course, the size of each of the minute light-receiving elements is smaller than that of the spot in the in-focus state.

Fourteenth Embodiment

Figure 41A:
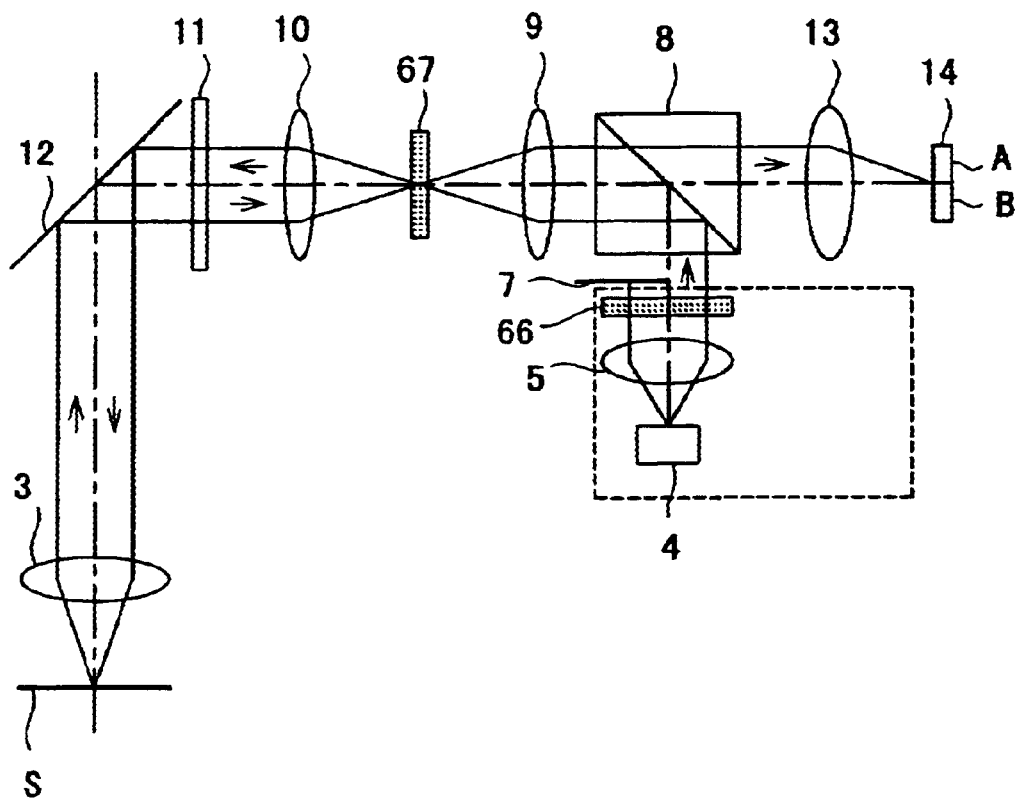
FIGS. 41A, 41B, and 41C are views showing a fourteenth embodiment of the focus detecting device according to the present invention and spot patterns.
Figure 41B:
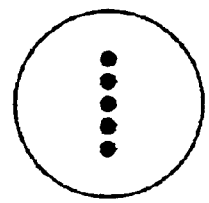
Figure 41C:
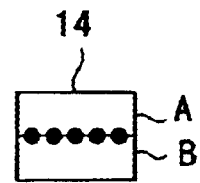

The fourteenth embodiment is shown in FIGS. 41A–41C. Like numerals indicate like elements with respect to the first embodiment and their detailed description is omitted. This embodiment, like the third embodiment, is such that a beam restriction member is placed at the intermediate imaging position between the lenses 9 and constituting the relay optical system. In the third embodiment, the beam restriction member (pinhole) in which an aperture is formed at the center is moved in or out of the optical path in order to perform the changeover between the single-spot projection system and the multi-spot projection system. In the fourteenth embodiment, however, a multi-pinhole 67 which has a plurality of apertures as the beam restriction member is placed at the converging position in order to switch the radiation pattern of spots in the multi-spot projection system.

The fourteenth embodiment, like the third embodiment, as shown in FIG. 41A, is provided with only the first optical path including the light source 4, the collimator lens 5, and a diffraction grating 66. A light beam leaving the first optical path is radiated on the sample S through the objective lens 3. The radiation pattern on the sample, as shown in FIG. 41B, is such that five spots are arranged in a row. FIG. 41C shows the case where light reflected by the sample S is reimaged on the photodetector 14 and is brought to a focus.

Figure 42:
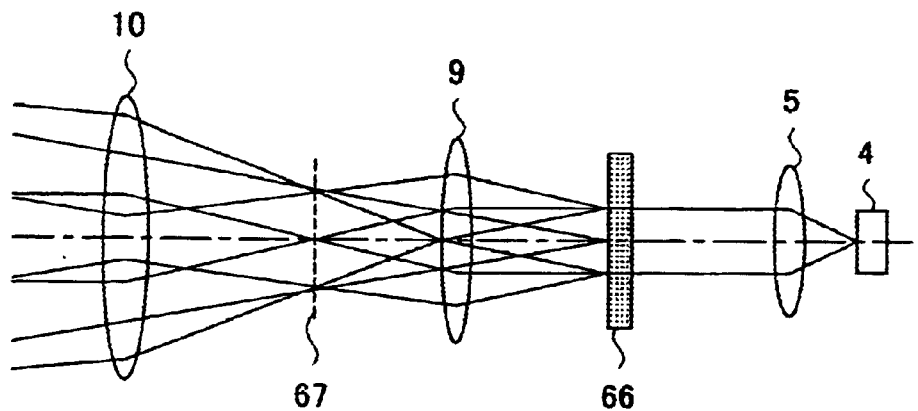
FIG. 42 is a view showing light beams at the position of a beam restriction member.

FIG. 42 shows the case where the multi-pinhole 67 is placed at the intermediate imaging position. The optical path from the light source 4 to the relay optical system is shown straight here, and the polarization beam splitter 8 and the light-blocking plate 7 in FIG. 41A are omitted. The multi-pinhole 67 has three apertures, which are provided at the position where each of three of five beams diffracted and produced by the diffraction grating 66 is converged. Thus, the multi-pinhole 67 is moved in or out of the optical path and thereby the radiation pattern on the sample can be changed.

Figure 43:
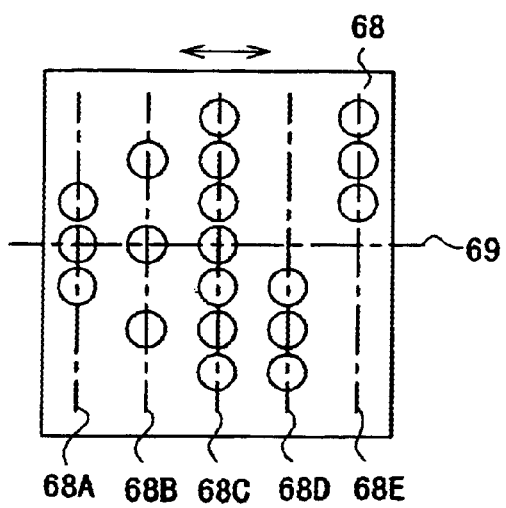
FIG. 43 is a view showing apertures of a beam restriction member.
Figure 44:
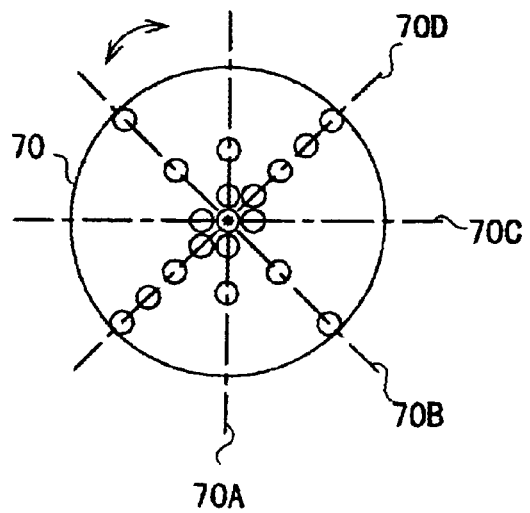
FIG. 44 is a view showing apertures of another beam restriction member.

In a state where the multi-pinhole 67 is not moved in or out of the optical path and is placed in the optical path, the radiation pattern on the sample can be changed. Such examples are shown in FIGS. 43 and 44. FIG. 44 illustrates the multi-pinhole which is moved normal to the optical axis in the optical path to change the radiation patter on the sample. A multi-pinhole 68 is a rectangular, plane-parallel plate and has a plurality of aperture rows 68A–68E straight provided vertically.

The aperture row 68A is located at the left end of the multi-pinhole 68 and has three apertures: one provided on the center line 69 and two provided close to it, one on each of the upper and lower sides thereof. The aperture row 68B is located at the right side of the aperture row 68A and has three apertures: one provided on the center line 69 and two provided at some distance from it (at intervals longer than in the aperture row 68A), one on each of the upper and lower sides thereof.

The aperture row 68C is located at the vertical center line of the plate and has the seven apertures: one provided on the center line 69 and six provided close to it, three on each of the upper and lower sides thereof. The aperture row 68D is located on the right side of the aperture row 68C and has three apertures closely spaced on the lower side of the center line 69. The aperture row 68E is located on the right end of the multi-pinhole 68 (on the right side of the aperture row 68D) and had three apertures closely spaced on the upper side of the center line 69.

As mentioned above, the multi-pinhole 68 has a plurality of aperture rows comprised of apertures which are different in spacing and number, provided at different positions in the lateral direction. Hence, the multi-pinhole 68 is moved normal to the optical axis, and thereby the number of light beams passing through the apertures and the spacing between them can be varied. Consequently, the radiated pattern (the number of spot beams and the spacing between them) on the sample can be changed.

FIG. 44 shows a multi-pinhole 70 which is rotated about the optical axis as a rotary axis to change the radiation pattern on the sample. The multi-pinhole 70 is a circular, plane-parallel plate and has a plurality of aperture rows 70A–70D radially provided from the center of the circle toward the periphery.

The aperture row 70A is located on a straight line passing through the center of the circle and extending vertically and has five apertures: one provided at the center of the circle and four provided close to it, two on each of the upper and lower sides thereof. The aperture row 70B, inclined at about 45° with respect to the aperture row 70A, is located on a straight line extending from the lower-right hand to the upper-left hand and has five apertures: one provided at the center of the circle and four provided at some distance from it (at intervals longer than in the aperture row 70A), two on each of the upper and lower sides thereof.

The aperture row 70C is located on a straight line extending in a direction normal to the aperture row 70A (namely in a lateral direction) and has three apertures; one provided at the center of the circle and two provided close to it, one on each of the left and right sides thereof. The aperture row 70D is located on a straight line extending in a direction normal to the aperture row 70B and has nine apertures: one provided at the center of the circle and eight provided lose to it, four on each of the upper and lower sides.

As describe above, since the multi-pinhole 70 has a plurality of aperture rows comprised of apertures which are different in spacing and number, provided on straight lines passing through the center of the circle at different angles.

Hence, by rotating the multi-pinhole 70 about the optical axis, the number of light beams passing through the apertures and the spacing between them can be varied. Consequently, the radiated pattern (the number of spot beams and the spacing between them) on the sample can be changed.

Thus, in the fourteenth embodiment, like the eleventh embodiment, the number of spots radiated and the spacing between them can be adjusted. Therefore, the spots can be focused at the position of the observer's desire. Furthermore, the multi-spot projection system is set, and thus even though one spot is scattered by the edge of the step, accurate focusing can be performed by the reflected light of other spots.

Also, where the beam restriction member, as in the fourteenth embodiment and the third embodiment, is placed at the intermediate imaging position of the relay lens system, both the radiation beam emitted from the light source 4 and the reflected beam from the sample S pass through the aperture section provided in the beam restriction member. Thus, it is necessary that the diameter of each of pinholes or the apertures of the aperture rows has such a size that a light beam in the out-of-focus state can pass therethrough.

Fifteenth Embodiment

Figure 45:
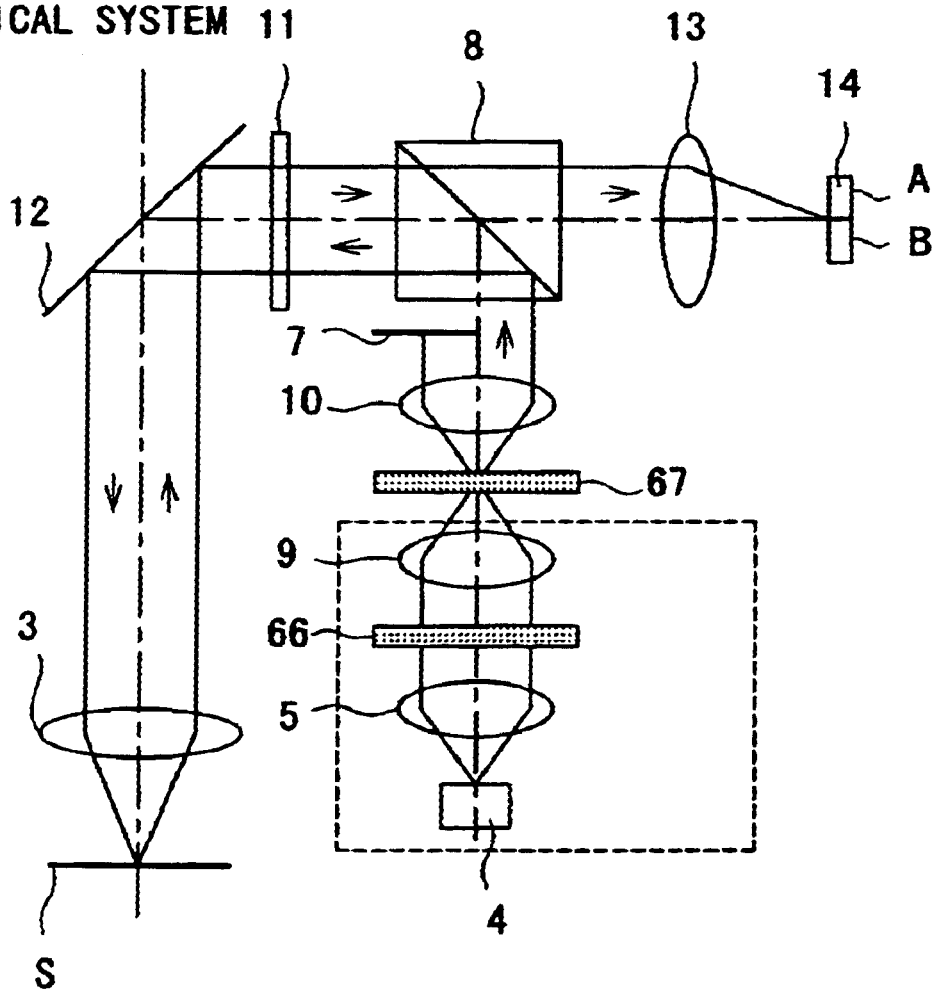
FIG. 45 is a view showing a fifteenth embodiment of the focus detecting device according to the present invention.

The fifteenth embodiment is shown in FIG. 45. Like numerals indicate like elements with respect to the thirteenth embodiment and their detailed description is omitted. The fifteenth embodiment, like the fourteenth embodiment, is such that the beam restriction member is placed at the intermediate imaging position between the lenses 9 and 10 constituting the relay lens system. In the fourteenth embodiment, the relay optical system is arranged between the polarization beam splitter 8 and the dichroic mirror 12, while in the fifteenth embodiment, the relay optical system is arranged between the light source 4 and the polarization beam splitter 8 (more specifically, between the diffraction grating 66 and the light-blocking plate 7).

In this embodiment also, the number of spots radiated and the spacing between them can be adjusted. Therefore, the spots can be focused at the position of the observer's desire. Furthermore, the multi-spot projection system is set, and thus even though one spot is scattered by the edge of the step, accurate focusing can be performed by the reflected light of other spots.

In the fifteenth embodiment, light passing through the multi-pinhole 67 (or 68 or 70) is only the radiation beam emitted from the light source 4. Hence, as in the thirteenth embodiment, each of the pinholes or the apertures of the aperture rows can be set to have nearly the same size as the diameter of each of the spots produced when the light emitted from the light source 4 is collected by the lens 9. As such, the spacing between the apertures of the aperture rows adjacent to one another can be made narrower than in the fourteenth embodiment, and the number of degrees of freedom in which the number of spots radiated on the sample and the spacing between them can be adjusted is increased.

Sixteenth Embodiment

Figure 46:
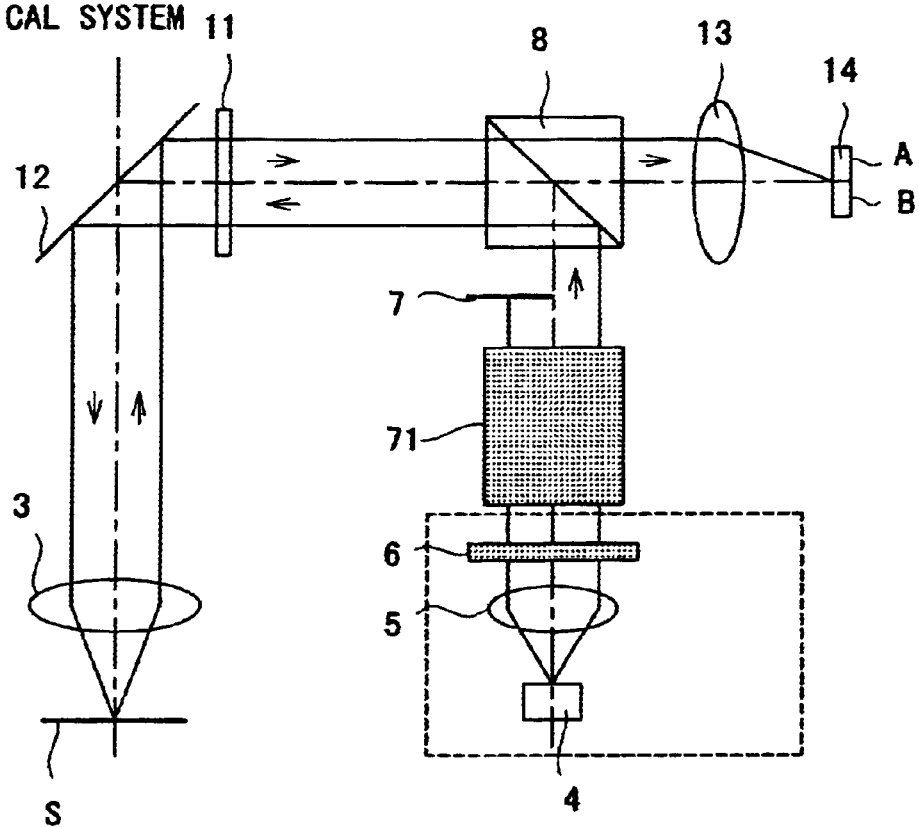
FIG. 46 is a view showing a sixteenth embodiment of the focus detecting device according to the present invention.

The sixteenth embodiment is shown in FIG. 46. Like numerals indicate like elements with respect to the fifteenth embodiment and their detailed description is omitted. In this embodiment, instead of the relay optical system and the multi-pinhole 67 which are arranged between the light source 4 and the polarization beam splitter 8 (more specifically, between the diffraction grating 66 and the light-blocking plate 7) in the fifteenth embodiment, a variable magnification optical system 71 is placed.

In the sixteenth embodiment, the variable magnification optical system 71 is an a focal optical system and has the function that an incident parallel beam is converted into a parallel beam of a different diameter to emerge therefrom. The angle of each of beams of the zero-order light and the higher-order light, emerging from the diffraction grating 6, can be changed in accordance with the magnification of the variable magnification optical system 71. For example, if the magnification of the variable magnification optical system 71 is increased, the spacing between the spot beams radiated on the sample will also be increase. In this case, a part of (high-order) light beams misses the objective lens and the relay optical system (namely, a light beam is located out of a lens diameter), depending on the magnification, and thus the number of spot beams is reduced. If the magnification is made low, the above phenomenon will reverse.

In this embodiment also, the number of spots radiated and the spacing between them can be adjusted. Therefore, the spots can be focused at the position of the observer's desire. Furthermore, the multi-spot projection system is set, and thus even though one spot is scattered by the edge of the step, accurate focusing can be performed by the reflected light of other spots.

Seventeenth Embodiment

Figure 47:
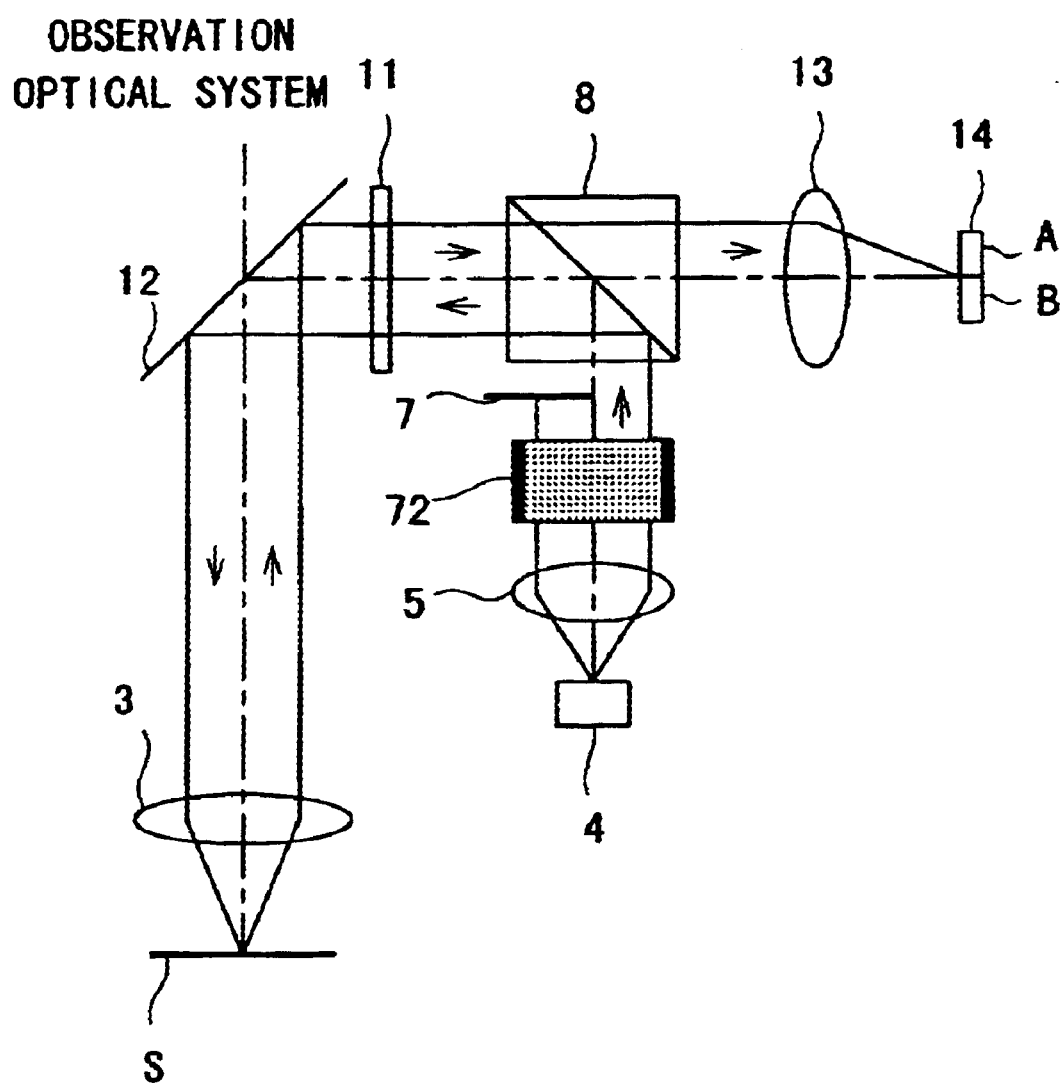
FIG. 47 is a view showing a seventeenth embodiment of the focus detecting device according to the present invention.

The seventeenth embodiment is shown in FIG. 47. Like numerals indicate like elements with respect to the sixteenth embodiment and their detailed description is omitted. In this embodiment, instead of the diffraction grating 6 interposed between the light source 4 and the polarization beam splitter 8, an acoustic optical element 72 is placed.

The acoustic optical element 72 is such that a high-frequency signal is supplied to a piezoelectric element provided on one surface of crystal to generate an ultra-sound in the crystal. Since the ultrasound travels as a compression wave in the crystal, a diffraction grating due to the difference of the refractive index is formed in the crystal. The grating width of the diffraction grating can be changed by varying the frequency of the high-frequency signal. Thus, by providing the high-frequency signals of various frequencies to the acoustic optical element 72 through a driving source, not shown, from the control section 23, the diffraction gratings of various grating shapes can be formed in the crystal. Consequently, the angle of the high-order light emerging from the acoustic optical element 72 can be changed.

In this embodiment also, the number of spots radiated and the spacing between them can be adjusted. Therefore, the spots can be focused at the position of the observer's desire. Furthermore, the multi-spot projection system is set, and thus even though one spot is scattered by the edge of the step, accurate focusing can be performed by the reflected light of other spots. Since the construction of the seventeenth embodiment dispenses with a mechanical driving section, the device is not affected by vibration. Moreover, compactness of the device can be achieved.

Eighteenth Embodiment

Figure 48:
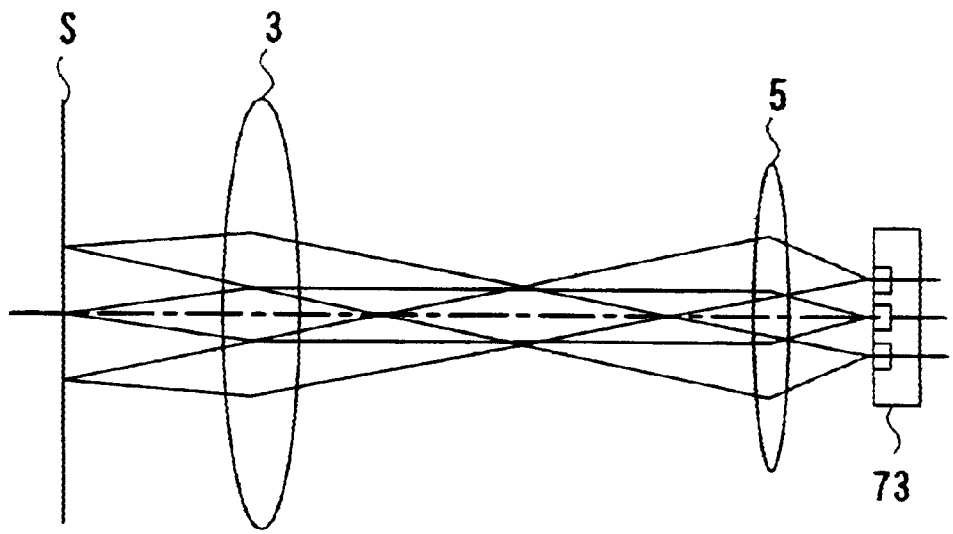
FIG. 48 is a view showing an eighteenth embodiment of the focus detecting device according to the present invention.

The eighteenth embodiment is shown in FIG. 48. The light source constituting the multi-beam producing member of each of the first to sixteenth embodiment has only one light-emitting section, from which one light beam is produced. In contrast to this, the multi-beam producing member of this embodiment is a light source in which a plurality of minute light-emitting sections are integrally configured and each of the minute light-emitting sections emits one light beam. Hence, in each of the first to sixteenth embodiments, only one light beam is emitted from the light source, but in the eighteenth embodiment, a plurality of light beams are emitted from the light source at the same time.

As mentioned above, the light source of the eighteenth embodiment is a multi-beam light source for emitting a plurality of light beams at the same time, for example, such as a surface light-emitting semiconductor laser or a multi-beam semiconductor laser. Thus, in the eighteenth embodiment, as shown in FIG. 48, individual light beams emitted from a light source 73 which is the multi-beam producing member are converted by the collimator lens 5 into parallel beams, which are converged at different positions on the sample S through the objective lens 3. Here, if it is possible that the turning on and off of the minute light-emitting sections of the multi-beam light source 73 are separately controlled, the sample can be irradiated with light spots of various patterns. However, if they cannot be controlled, it is only necessary to place the beam restriction member, such as that of the thirteenth embodiment, at any position between the light source 73 and the objective lens 3.

Consequently, in this embodiment also, the number of spots radiated and the spacing between them can be adjusted. Therefore, the spots can be focused at the position of the observer's desire. Furthermore, the multi-spot projection system is set, and thus even though one spot is scattered by the edge of the step, accurate focusing can be performed by the reflected light of other spots.

The multi-beam light source 73 of the eighteenth embodiment can be replaced with the section surrounded by a broken line in each of the thirteenth embodiment (FIG. 40A), the fourteenth embodiment (FIG. 41A), the fifteenth embodiment (FIG. 45), and the sixteenth embodiment (FIG. 46). Thus, in each of these embodiments, compactness of the device can be achieved.

Nineteenth Embodiment

Figure 49:
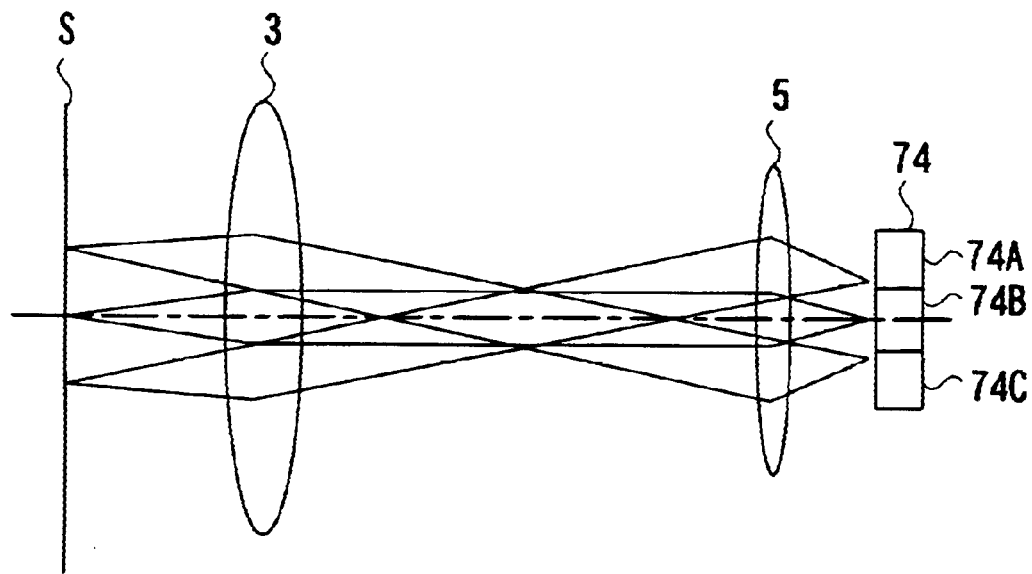
FIG. 49 is a view showing a nineteenth embodiment of the focus detecting device according to the present invention.

The nineteenth embodiment is shown in FIG. 49. This embodiment, like the seventeenth embodiment, has the multi-beam light source for emitting a plurality of light beams simultaneously. In the seventeenth embodiment, one light source has minute light-emitting sections, but in the nineteenth embodiment, a plurality of light sources, each of which is the same as the light source used in each of the first to sixteenth embodiments, are arranged one- or two-dimensionally.

In the nineteenth embodiment, as shown in FIG. 49, individual beams emitted from light sources 74A, 74B, and 74C (any of which is a semiconductor laser, here) of the multi-beam light source 74 are converted by the collimator lens 5 into parallel beams, which are converged at different positions on the sample S through the objective lens 3. Here, the turning on and off of the light sources 74A, 74B, and 74C of the multi-beam light source 74 are separately controlled, and thereby the sample is irradiated with light spots of various patterns. The light sources 74A, 74B, and 74C may be turned always on so that the beam restriction member, such as that of the fourteenth embodiment, is placed at any position between the light source 74 and the objective lens 3.

As mentioned above, in this embodiment also, the number of spots radiated and the spacing between them can be adjusted. Therefore, the spots can be focused at the position of the observer's desire. Furthermore, the multi-spot projection system is set, and thus even though one spot is scattered by the edge of the step, accurate focusing can be performed by the reflected light of other spots.

The multi-beam light source 74 of the nineteenth embodiment can also be replaced with the section surrounded by a broken line in each of the thirteenth embodiment (FIG. 40A), the fourteenth embodiment (FIG. 41A), the fifteenth embodiment (FIG. 45), and the sixteenth embodiment (FIG. 46). Thus, in each of these embodiments, compactness of the device can be achieved.

In each of the embodiments which have been described above, the diffraction grating 6 can be placed at any position between the light source 4 and the polarization beam splitter 8. However, it is desirable that the diffraction grating 6, as in the nineteenth embodiment, is interposed between the collimator lens 5 and the light-blocking plate 7, preferably at the position conjugate with the pupil position of the objective lens or in the proximity of this position.

Figure 50A:
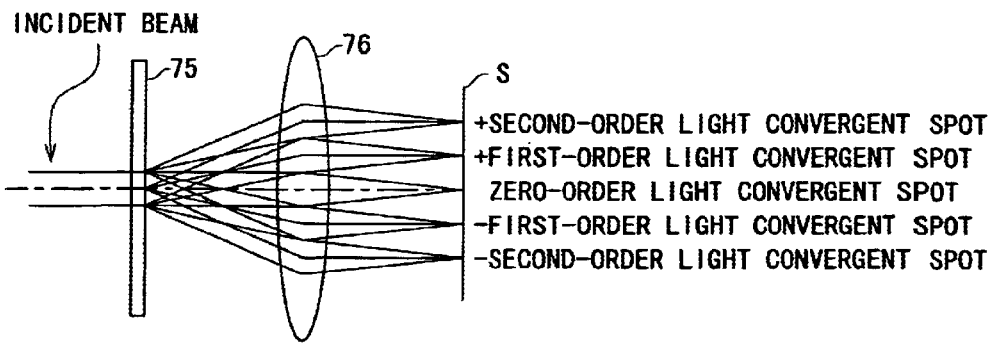
FIGS. 50A, 50B, and 50C are views for explaining the position of the diffraction optical element.

This respect will be described below in regard to FIGS. 50A–50C. For simplicity, the relay optical system is omitted from these figures. The higher-order diffraction light than the ±second-order light is also omitted.

In a microscope or an examination apparatus using the focus detecting device of the present invention, the objective lens is often designed as a telecentric optical system on the object side. When a diffraction grating 75, as shown in FIG. 50A, is located at the pupil position of an objective lens 76 (here, at the rear focal position of the objective lens 76), the center ray (principal ray) of each of the beams of the zero-order light, the ±first-order light, and the ±second-order light is incident normal to the sample S. Hence, light (a convergent spot of each order) reflected by the sample S follows the same optical path as in the case of incidence in a reverse direction and reaches the photodetector.

Figure 50B:
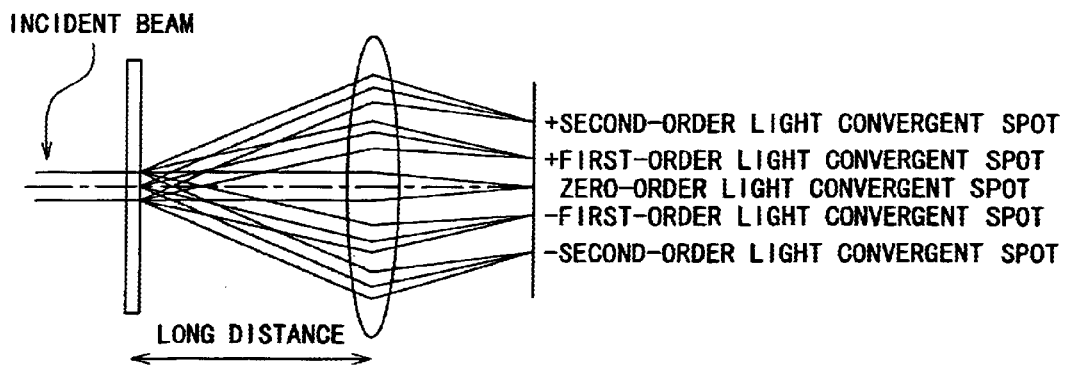
Figure 50C:
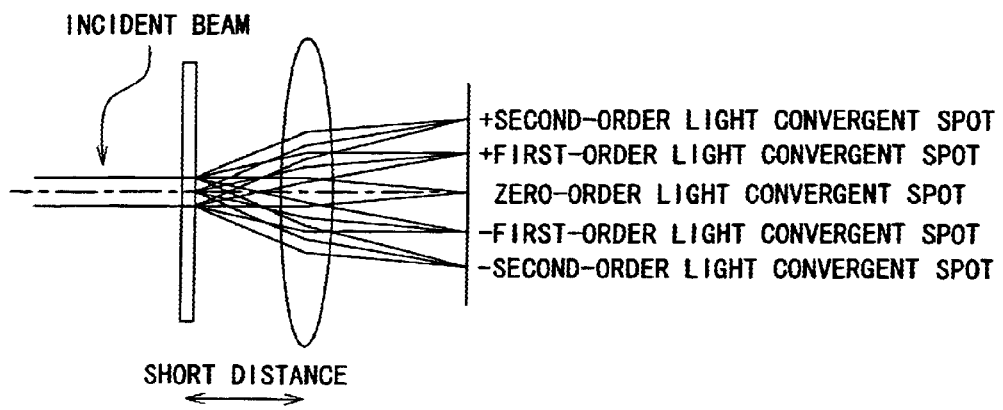

However, when the diffraction grating 75, as shown in FIG. 50B, is located separate from the pupil position of the objective lens 76 (at a long distance), the center ray (principal ray) of each of the beams of the zero-order light, the ±first-order light, and the ±second-order light is obliquely incident on the sample S (so as to approach the optical axis in this case). Hence, light reflected by the sample S follows an optical path different from the case of incidence. Consequently, the problem arises that the light is eclipsed by the optical system until it reaches the photodetector and the intensity of light is reduced to deteriorate focusing accuracy. When the diffraction grating 75, as in FIG. 50C, is located closer than the pupil position of the objective lens 76 (at a short distance), the same problem as in FIG. 50B is caused.

The diffraction gratings used in the embodiments described above can be fabricated to have various grating shapes at present by the development of a fabrication technique and can be made more easily than cylindrical lenses. The diffraction grating, because of its shape of a thin plane-parallel plate, is lighter in weight than the cylindrical lens and is easily held. Furthermore, the diffraction efficiency thereof is as high as 60% and thus a loss of the intensity of light is smaller than in a slit frame. As diffraction gratings suitable for the nineteenth embodiment, for example, diffractive optics beam splitters (model No. 1001-1039, by MEMS OPICAL INC.) are available.

What is claimed is:

1. A focus detecting device for a microscope comprising:
   a beam splitting member that has a surface for reflecting or transmitting an incident light beam, said beam splitting member being located at an intersection of an optical axis of a first optical path with an optical axis of a second optical path;
   a multi-beam producing member for emitting a plurality of light beams, said multi-beam producing member being placed in the first optical path;
   a light-blocking member that is placed in the first optical path at a position between said beam splitting member and said multi-beam producing member, said light-blocking blocks a part of each of said plurality of light beams, the plurality of light beams with the part thereof being blocked by said light-blocking member pass said beam splitting member to enter the microscope;

a light-condensing optical system that is placed in the second optical path at a position on an exit side of said beam splitting member, said light-condensing optical system condenses the plurality of light beams, which have been reflected at a sample surface of the microscope and have passed said beam-splitting member; and a photodetector having at least two light-receiving sections, said photodetector being placed in the second optical path at a position on which a light beam is converged by said light-condensing optical system, wherein said position is on an exit side of said light-condensing optical system.

2. A focus detecting device for a microscope according to claim 1, wherein said multi-beam producing member has a light source and a diffraction optical element, said light source being provided with only one light-emitting section for emitting a single light beam.

3. A focus detecting device for a microscope according to claim 1, wherein said multi-beam producing member is a light source having a plurality of minute light-emitting sections, each of said light-emitting sections emitting one light beam and said light-emitting sections being integrally configured.

4. A focus detecting device for a microscope according to claim 1, wherein said multi-beam producing member includes a plurality of light sources, each of said light sources having only one light-emitting section for emitting a single light beam.

5. A focus detecting device for a microscope according to claim 2, further comprising a first driving mechanism configured and arranged to move said diffraction optical element so that said diffraction optical element is movable in said first optical path.

6. A focus detecting device for a microscope according to claim 5, wherein said diffraction optical element is only one diffraction optical element included in the focus detecting device and is movable in and out of said first optical path.

7. A focus detecting device for a microscope according to claim 5, further comprising at least another one diffraction optical element said diffraction optical element and said at least another one diffraction element being movable in said first optical path.

8. A focus detecting device for a microscope according to claim 1, further comprising a relay optical system configured and arranged to collect said plurality of light beams, a beam restriction member located at a position on which light is converged by said relay optical system, and a second driving mechanism constructed and arranged to move said beam restriction member, said beam restriction member being movable in an optical path.

9. A focus detecting device for a microscope according to claim 8, wherein said relay optical system and said beam restriction member are placed on a side where said plurality of light beams emerge from said beam splitting member.

10. A focus detecting device for a microscope according to claim 8, wherein said relay optical system and said beam restriction member are placed on a side where said plurality of light beams are incident on said beam splitting member.

11. A focus detecting device for a microscope according to claim 8, wherein said beam restriction member has a single aperture, and when inserted in said optical path, said beam restriction member is located at a position where only a light beam converged on an optical axis is transmitted.

12. A focus detecting device for a microscope according to claim 1, further comprising a second light source for producing one light beam, placed in a third optical path, and a second beam splitting member having a surface for reflecting or transmitting an incident light beam, said second beam splitting member being located at an intersection of the optical axis of said first optical path with an optical axis of said third optical path and said second light source being provided with only one light-emitting section that produces one light beam.

13. A focus detecting device for a microscope according to claim 12, wherein only one light beam is emitted from said second light source and is incident on said second beam splitting member.

14. A focus detecting device for a microscope according to claim 2, further comprising a second light source configured and arranged to produce one light beam, placed in a third optical path, at least another one diffraction optical element disposed in said third optical path, and a second beam splitting member having a surface for reflecting or transmitting an incident light beam, wherein said second beam splitting member is located at an intersection of the optical axis of said first optical path with an optical axis of said third optical path, and said second light source is provided with only one light-emitting section that produces one light beam.

15. A focus detecting device for a microscope according to claim 12, wherein said first light source and said second light source have power sections, and when one power section is turned on, a remaining power section is turned off.

16. A focus detecting device for a microscope according to claim 12, wherein said first optical path and said third optical path are provided with light-blocking members, and when one light-blocking member blocks a light beam emanating from one light source, a remaining light-blocking member transmits a light beam emanating from a remaining light source.

17. A focus detecting device for a microscope according to claim 5, further comprising an intensity attenuation member configured and arranged to reduce an intensity of an incident light beam and a third driving mechanism constructed and arranged to move said intensity attenuation member, wherein when said diffraction optical element is inserted in said first optical path, said intensity attenuation member is removed from said first optical path, and when said diffraction optical element is removed from said first optical path, said intensity attenuation member is inserted in said first optical path.

18. A focus detecting device for a microscope according to claim 5, wherein said light source has a power section, to which different values of energies are supplied depending on whether said diffraction optical element is inserted in or removed out of said first optical path.

19. A focus detecting device for a microscope according to claim 18, wherein said values of energies are determined such that intensities of light beams incident on said beam splitting member are substantially the same irrespective of whether said diffraction optical element is inserted in or removed out of said first optical path.

20. A focus detecting device for a microscope according to claim 1, further comprising a beam adjusting mechanism for changing an amount of a plurality of light beams produced by said multi-beam producing member and a spacing between said light beams.

21. A focus detecting device for a microscope according to claim 20, wherein said multi-beam producing member is provided with a plurality of diffraction optical elements, and said beam adjusting mechanism has a moving mechanism for placing one of said plurality of diffraction optical elements in said first optical path.

22. A focus detecting device for a microscope according to claim 1, wherein a plurality of multi-beam producing members are provided, and one of said plurality of multi-beam producing members is used.

23. A focus detecting device for a microscope according to claim 1, wherein each of said two light-receiving sections is constructed with a plurality of light-receiving elements.

24. A focus detecting device for a microscope according to claim 20, wherein said beam adjusting mechanism has a beam restriction member and a moving mechanism for moving said beam restriction member to a position where a light beam is converged.

25. A focus detecting device for a microscope according to claim 20, wherein said beam adjusting mechanism is a variable magnification optical system.

26. A focus detecting device for a microscope according to claim 20, wherein said beam adjusting mechanism is an acoustic optical system.

27. A focus detecting device for a microscope according to claim 7, wherein said diffraction optical element and said another at least one diffraction optical element are movable in and out of said first optical path.

28. A focus detecting device for a microscope comprising:
   a multi-beam producing member for emitting a plurality of light beams;
   a light-blocking member for blocking a part of said plurality of light beams;
   a beam splitting member having a surface for reflecting or transmitting an incident light beam;
   a light-condensing optical system for condensing an incident light beam;
   a photodetector having at least two light-receiving sections; and
   a beam adjusting mechanism for changing an amount of the plurality of light beams produced by said multi-beam producing member and a spacing between said light beams,
   wherein said beam adjusting mechanism has a beam restriction member and a moving mechanism for moving said beam restriction member to a position where a light beam is converged, and
   wherein said multi-beam producing member and said light-blocking member are placed on a first optical path, said light-condensing optical system and said photodetector are placed on a second optical path, said beam splitting member is located at an intersection of an optical axis of said first optical path with an optical axis of said second optical path, said photodetector is located at a position on which a light beam is converged by said light-condensing optical system.

29. A focus detecting device for an optical apparatus comprising:
   a multi-beam producing member for emitting a plurality of light beams, said multi-bam producing member being placed in a first optical path and having a light source and a diffraction optical element;
   a light-blocking member that is placed in the first optical path and blocks a part of said plurality of light beams;
   a beam splitting member that has a surface for reflecting or transmitting an incident light beam and is located at an intersection or an optical axis of the first optical path with an optical axis of a second optical path;
   a light-condensing optical system that is placed in the second optical path and condenses an incident light beam;
   a photodetector that has at least two light-receiving sections and is placed in the second optical path at a position on which a light beam is converged by said light-condensing optical system;
   a first driving mechanism configured and arranged to move said diffraction optical element so that said diffraction optical element is movable in said first optical path; and
   at least another one diffraction optical element,
   wherein said light source is provided with only one light-emitting section for emitting a single light beam,
   wherein said light-condensing optical system is disposed between said beam splitting member and said photodetector, and
   wherein said diffraction optical element and said at least another one diffraction element are movable in said first optical path.

30. A focus detecting device for an optical apparatus according to claim 29, wherein said diffraction optical element and said at least another one diffraction optical element are movable in and out of said first optical path.

31. A focus detecting device for an optical apparatus comprising:
   a multi-beam producing member for emitting a plurality of light beams;
   a light blocking member for blocking a part of said plurality of light beams;
   a beam splitting member having a surface for reflecting or transmitting an incident light beam;
   a light-condensing optical system for condensing an incident light beam;
   a photodetector having at least two light-receiving sections;
   a relay optical system configured and arranged to collect said plurality of light beams;
   a beam restriction member located at a position on which light is converged by said relay optical system; and
   a second driving mechanism constructed and arranged to move said beam restriction member in an optical path,
   wherein said multi-beam producing member and said light-blocking member are placed in a first optical path, said light-condensing optical system and said photodetector are placed on a second optical path, said beam splitting member is located at an intersection of an optical axis of said first optical path with an optical axis of said second optical path, said photodetector is located at a position on which a light beam is converged by said light-condensing optical system, and said light-condensing optical system is disposed between said beam splitting member and said photodetector.

32. A focus detecting device for an optical apparatus according to claim 31, wherein said relay optical system and said beam restriction member are placed on a side where said plurality of light beams emerge from said beam splitting member.

33. A focus detecting device for an optical apparatus according to claim 31, wherein said relay optical system and said beam restriction member are placed on a side where said plurality of light beams are incident on said beam splitting member.

34. A focus detecting device for an optical apparatus according to claim 31, wherein said beam restriction member has a single aperture, and when inserted in said optical path, said beam restriction member is located at a position where only a light beam converged on an optical axis is transmitted.

35. A focus detecting device for an optical apparatus comprising:
- a multi-beam producing member for emitting a plurality of light beams, said multi-beam producing member being placed in a first optical path and having a light source and a diffraction optical element;
- a light-blocking member that is placed in the first optical path and blocks a part of said plurality of light beams;
- a beam splitting member that has a surface for reflecting or transmitting an incident light beam and is located at an intersection of an optical axis of the first optical path with an optical axis of a second optical path;
- a light-condensing optical system that is placed in the second optical path and condenses an incident light beam;
- a photodetector that has at least two light-receiving sections and is placed in the second optical path at a position on which a light beam is converged by said light-condensing optical system;
- a first driving mechanism configured and arranged to move said diffraction optical element so that said diffraction optical element is movable in said first optical path;
- an intensity attenuation member configured and arranged to reduce an intensity of an incident light beam; and
- a third driving mechanism constructed and arranged to move said intensity attenuation member,
- wherein said light source is provided with only one light-emitting section for emitting a single light beam,
- wherein said light-condensing optical system is disposed between said beam splitting member and said photodetector, and
- wherein when said diffraction optical element is inserted in said first optical path, said intensity attenuation member is removed from said first optical path, and when said diffraction optical element is removed from said first optical path, said intensity attenuation member is inserted in said first optical path.

36. A focus detecting device for an optical apparatus comprising:
- a multi-beam producing member for emitting a plurality of light beams;
- a light-blocking member for blocking a part of said plurality of light beams;
- a beam splitting member having a surface for reflecting or transmitting an incident light beam;
- a light-condensing optical system for condensing an incident light beam;
- a photodetector having at least two light-receiving sections; and
- a beam adjusting mechanism for changing an amount of a plurality of light beams produced by said multi-beam producing member or a spacing between said light beams,
- wherein said multi-beam producing member and said light-blocking member are placed in a first optical path, said light-condensing optical system and said photodetector are placed in a second optical path, said beam splitting member is located at an intersection of an optical axis of said first optical path with an optical axis of said second optical path, said photodetector is located at a position on which a light beam is converged by said light-condensing optical system, and said light-condensing optical system is disposed between said beam splitting member and said photodetector, and
- wherein said multi-beam producing member is provided with a plurality of diffraction optical elements, and said beam adjusting mechanism has a moving mechanism for placing one of said plurality of diffraction optical elements in said first optical path.

37. A focus detecting device for an optical apparatus comprising:
- a multi-beam producing member for emitting a plurality of light beams;
- a light-blocking member for blocking a part of said plurality of light beams;
- a beam splitting member having a surface for reflecting or transmitting an incident light beam;
- a light-condensing optical system for condensing an incident light beam;
- a photodetector having at least two light-receiving sections; and
- a beam adjusting mechanism for changing an amount of a plurality of light beams produced by said multi-beam producing member or a spacing between said light beams,
- wherein said multi-beam producing member and said light-blocking member are placed in a first optical path, said light-condensing optical system and said photodetector are placed in a second optical path, said beam splitting member is located at an intersection of an optical axis of said first optical path with an optical axis of said second optical path, said photodetector is located at a position on which a light beam is converged by said light-condensing optical system, and said light-condensing optical system is disposed between said beam splitting member and said photodetector, and
- wherein said beam adjusting mechanism has a beam restriction member and a moving mechanism for moving said beam restriction member to a position where a light beam is converged.

* * * * *